United States Patent
Andersen et al.

(10) Patent No.: US 11,836,439 B2
(45) Date of Patent: Dec. 5, 2023

(54) WEBSITE PLUGIN AND FRAMEWORK FOR CONTENT MANAGEMENT SERVICES

(71) Applicant: Siteimprove A/S, Copenhagen (DK)

(72) Inventors: Nicolai Munch Andersen, Frederiksværk (DK); Asbjørn Clemmensen, Copenhagen (DK); Cavit Ilker, Hareskovby (DK)

(73) Assignee: SiteImprove A/S, Copenhagen (DK)

( * ) Notice: Subject to any disclaimer, the term of this patent is extended or adjusted under 35 U.S.C. 154(b) by 0 days.

(21) Appl. No.: 17/672,222

(22) Filed: Feb. 15, 2022

(65) Prior Publication Data

US 2023/0144009 A1 May 11, 2023

Related U.S. Application Data

(60) Provisional application No. 63/277,937, filed on Nov. 10, 2021.

(51) Int. Cl.
*G06F 40/166* (2020.01)
*G06F 40/14* (2020.01)

(52) U.S. Cl.
CPC ............ *G06F 40/14* (2020.01); *G06F 40/166* (2020.01)

(58) Field of Classification Search
CPC .............................. G06F 40/14; G06F 40/166
USPC ......................................................... 715/237
See application file for complete search history.

(56) References Cited

U.S. PATENT DOCUMENTS

| | | | |
|---|---|---|---|
| 6,360,235 B1 | 3/2002 | Tilt | |
| 7,062,492 B1 * | 6/2006 | Graham | ................ G06F 16/958 715/255 |
| 7,231,606 B2 | 6/2007 | Miller et al. | |
| 7,475,067 B2 | 1/2009 | Clary et al. | |
| 7,558,795 B2 | 7/2009 | Malik et al. | |
| 7,584,435 B2 | 9/2009 | Bailey et al. | |

(Continued)

FOREIGN PATENT DOCUMENTS

| CN | 106227742 A | 12/2016 |
|---|---|---|
| WO | WO 2012/027022 | 3/2012 |

OTHER PUBLICATIONS

U.S. Appl. No. 63/279,063, filed Nov. 12, 2021, Jacobsen et al.

(Continued)

*Primary Examiner* — Kavita Stanley
*Assistant Examiner* — Tionna M Burke
(74) *Attorney, Agent, or Firm* — Barnes & Thornburg LLP

(57) ABSTRACT

Described are systems and methods for checking webpage content. The method can include receiving, by a computing system, webpage content rendered in a webpage editing tool provided by a content management services (CMS) server and presented in a graphical user interface (GUI) display at a user device, transmitting the webpage content to web analysis services to (i) analyze the webpage content as part of a content check, (ii) generate information about the webpage content based on the content check, and (iii) store the information in association with a content ID in a data store, polling the web analysis services for processing status updates and the generated information, receiving the generated information, populating predefined sections in a CMS plugin with at least a portion of the received information, and returning the CMS plugin to be presented, at the user device, in the webpage editing tool concurrently with the webpage content.

20 Claims, 25 Drawing Sheets

(56) References Cited

U.S. PATENT DOCUMENTS

| | | | |
|---|---|---|---|
| 7,797,200 | B2 | 9/2010 | Patrawala |
| 7,805,428 | B2 | 9/2010 | Batista Reyes et al. |
| 8,065,410 | B1 | 11/2011 | Breen et al. |
| 8,196,104 | B2 | 6/2012 | Cohrs et al. |
| 8,447,751 | B2 | 5/2013 | Stouffer et al. |
| 8,533,684 | B2 | 9/2013 | Brunet et al. |
| 8,554,698 | B2 | 10/2013 | Bando et al. |
| 8,613,039 | B2 | 12/2013 | Chen et al. |
| 8,972,379 | B1 | 3/2015 | Grieselhuber et al. |
| 9,009,784 | B2 | 4/2015 | Chen et al. |
| 9,087,035 | B1 | 7/2015 | Bandaru et al. |
| 9,152,729 | B2 | 10/2015 | Ajoku et al. |
| 9,537,732 | B2 | 1/2017 | Mukherjee et al. |
| 9,563,422 | B2 | 2/2017 | Cragun et al. |
| 10,114,902 | B2 | 10/2018 | Byakod et al. |
| 10,169,188 | B2 | 1/2019 | Belekar et al. |
| 10,534,512 | B2 | 1/2020 | Jadhav et al. |
| 10,706,122 | B2 | 7/2020 | Sabbavarpu |
| 10,831,831 | B2 | 11/2020 | Greene |
| 10,860,594 | B2 | 12/2020 | Jamshidi |
| 10,963,470 | B2 | 3/2021 | Jamshidi |
| 10,970,294 | B2 | 4/2021 | Jamshidi |
| 11,113,276 | B2 | 9/2021 | Zhao |
| 11,262,979 | B2 | 3/2022 | Deshmukh et al. |
| 2003/0149742 | A1* | 8/2003 | Bollerud ............. H04L 67/565 709/217 |
| 2004/0039734 | A1 | 2/2004 | Judd et al. |
| 2006/0253345 | A1 | 11/2006 | Herber |
| 2008/0133500 | A1 | 6/2008 | Edwards |
| 2009/0113287 | A1 | 4/2009 | Yee |
| 2010/0042608 | A1 | 2/2010 | Kane |
| 2010/0250593 | A1* | 9/2010 | Matsuo ............. H04L 67/1065 707/E17.014 |
| 2010/0262780 | A1* | 10/2010 | Mahan ............... G06F 16/9574 711/E12.017 |
| 2010/0312822 | A1* | 12/2010 | Howell ............... G06F 16/958 715/273 |
| 2011/0271149 | A1* | 11/2011 | Roussel ............. H04L 41/0253 714/E11.178 |
| 2012/0010927 | A1 | 1/2012 | Attenberg et al. |
| 2012/0017281 | A1 | 1/2012 | Bannerjee et al. |
| 2012/0047120 | A1 | 2/2012 | Connolly |
| 2012/0254405 | A1 | 10/2012 | Ganesh et al. |
| 2012/0254723 | A1 | 10/2012 | Kasa et al. |
| 2013/0282691 | A1 | 10/2013 | Stouffer et al. |
| 2014/0164345 | A1 | 6/2014 | Connolly et al. |
| 2014/0304578 | A1 | 10/2014 | Parkinson et al. |
| 2015/0039746 | A1 | 2/2015 | Mukherjee et al. |
| 2015/0317132 | A1 | 11/2015 | Rempell et al. |
| 2015/0348071 | A1 | 12/2015 | Cochrane et al. |
| 2016/0055490 | A1 | 2/2016 | Keren et al. |
| 2016/0210360 | A9 | 7/2016 | Stouffer et al. |
| 2016/0353148 | A1 | 12/2016 | Prins et al. |
| 2017/0316108 | A1 | 11/2017 | Sakata et al. |
| 2018/0210965 | A1 | 7/2018 | Grigoryan et al. |
| 2019/0073365 | A1 | 3/2019 | Jamshidi |
| 2020/0151187 | A1 | 5/2020 | Jamshidi |
| 2020/0394200 | A1 | 12/2020 | Jamshidi |
| 2021/0326348 | A1 | 10/2021 | Jamshidi |

OTHER PUBLICATIONS

EP Supplementary Search Report in European Application No. EP18853482, dated Mar. 29, 2020, 9 pages.
Gustafsdottir [online], "CMS Plugin: Frequently Asked Questions," Siteimprove.com, Jul. 9, 2020, 3 pages.
Gustafsdottir [online], "How to navigate the Siteimprove CMS Plugin," Siteimprove.com, Sep. 10, 2020, 7 pages.
International Preliminary Report on Patentability in PCT Appln. No. PCT/US2018/049809, dated Mar. 10, 2020, 13 pages.
International Search Report and Written Opinion in Application No. PCT/US2018/049809, dated Nov. 19, 2018, 13 pages.
Kamal, "Evaluating web accessibility metrics for Jordanian Universities," International Journal of Advanced Computer Science and Applications, 2016, 7(7):113-122.
Needham [online], "CMS Plugin: Security FAQ," Siteimprove.com, Aug. 9, 2020, 2 pages.
Needham [online], "On which CMS is the Siteimprove plugin available?," Siteimprove.com, May 7, 2020, 11 pages.
Sergio Pedercini [online], "How to code a responsive circular percentage chart with SVG and CSS", retrieved from URL: https://nnediunn.conn/@pppped/how-to-code-a-responsive-circular-percentage-chart-with-svg-and-css-3632f8cd7705, May 17, 2017, 5 pages.
Silktide.com [online], "Silktide," available on or before Feb. 8, 2017, via Internet Archive: Wayback Machine URL <https://web.archive.org/web/20170208112649/https://silktide.com/>, retrieved on May 7, 2020, URL<http://www.silktide.comt>, 2 pages.
Sitebeam.net [online], "Sitebeam," available on or before Feb. 4, 2017, via Internet Archive: Wayback Machine URL <https://web.archive.org/web/20170204162753/http://sitebeam.net/>, retrieved on May 7, 2020, URL<http://www.sitebeam.net>, 4 pages.
Siteimprove.com [online], "Adobe Experience Manager: Siteimprove provided plugin," available on or before Aug. 12, 2020, via Internet Archive: Wayback Machine URL <https://web.archive.org/web/20200812065134/https:/siteimprove.com/en/core-platform/integrations/cms-plugin/adobe-experience-manager/>, retrieved on Mar. 21, 2022, URL<https://siteimprove.com/en/core-platform/integrations/cms-plugin/adobe-experience-manager/>, 18 pages.
Siteimprove.com [online], "Adobe Experience Manager: Siteimprove provided plugin," available on or before Sep. 20, 2020, via Internet Archive: Wayback Machine URL <https://web.archive.org/web/20200920011517/https:/siteimprove.com/en/core-platform/integrations/cms-plugin/adobe-experience-manager//>, retrieved on Mar. 21, 2022, URL<https://siteimprove.com/en/core-platform/integrations/cms-plugin/adobe-experience-manager/>, 18 pages.
Siteimprove.com [online], "Aug. & Sep. 2021 Release Highlights," Oct. 8, 2021, retrieved on Mar. 21, 2022, retrieved from URL<https://help.siteimprove.com/support/solutions/articles/80000946947-august-september-2021-release-highlights>, 2 pages.
Siteimprove.com [online], "Drupal," available on or before Aug. 12, 2020, via Internet Archive: Wayback Machine URL <https://web.archive.org/web/20200812071254/https:/siteimprove.com/en/core-platform/integrations/cms-plugin/drupal/>, retrieved on Mar. 21, 2022, URL<https://siteimprove.com/en/core-platform/integrations/cms-plugin/drupal/>, 12 pages.
Siteimprove.com [online], "Feb. 2021 Release Highlights," Sep. 23, 2021, retrieved on Mar. 21, 2022, retrieved from URL<https://help.siteimprove.com/support/solutions/articles/80000863866#h_01F0GCPTWX5H3ZS558V1GVEQQN>, 3 pages.
Siteimprove.com [online], "Feb. 2021 Release Highlights," Sep. 23, 2021, retrieved on Mar. 21, 2022, retrieved from URL<https://help.siteimprove.com/support/solutions/articles/80000863866-february-2021-release-highlights>, 3 pages.
Siteimprove.com [online], "Jan. 2021 Release Highlights," Oct. 1, 2021, retrieved on Mar. 21, 2022, retrieved from URL<https://help.siteimprove.com/support/solutions/articles/80000863867-january-2021-release-highlights>, 3 pages.
Siteimprove.com [online], "Jul. 2021 Release Highlights," Sep. 23, 2021, retrieved on Mar. 21, 2022, retrieved from URL<https://help.siteimprove.com/support/solutions/articles/80000863850-july-2021-release-highlights>, 4 pages.
Siteimprove.com [online], "Oct. & Nov. 2021 Release Highlights," Dec. 7, 2021, retrieved on Mar. 21, 2022, retrieved from URL<https://help.siteimprove.com/support/solutions/articles/80000958280-october-november-2021-release-highlights>, 3 pages.
Siteimprove.com [online], "Oct. 2020 Release Highlights," Nov. 16, 2021, retrieved on Mar. 21, 2022, retrieved from URL<https://help.siteimprove.com/support/solutions/articles/80000448376-october-2020-release-highlights>, 2 pages.
Siteimprove.com [online], "Optimizely + Siteimprove," available on or before Jun. 16, 2021, via Internet Archive: Wayback Machine URL <https://web.archive.org/web/20210616140532/https:/siteimprove.com/en/core-platform/integrations/cms-plugin/optimizely/>, retrieved on Mar. 21, 2022, URL<https://siteimprove.com/en/core-platform/integrations/cms-plugin/optimizely//>, 12 pages.

(56) References Cited

OTHER PUBLICATIONS

Siteimprove.com [online], "Siteimprove CMS Plugin Integration Cookbook," available on or before Aug. 5, 2020, via Internet Archive: Wayback Machine URL <https://web.archive.org/web/20200805195514/https:/developer.siteimprove.com/cms-plugin-integration-cookbook/>, retrieved on Mar. 21, 2022, URL<https://developer.siteimprove.com/cms-plugin-integration-cookbook/>, 13 pages.

Siteimprove.com [online], "Web accessibility for all with the next generation of Siteimprove Accessibility," Mar. 20, 2020, retrieved on Mar. 21, 2022, retrieved from URL<https://siteimprove.com/en-us/blog/web-accessibility-for-all-with-next-generation-siteimprove-accessibility/>, 36 pages.

Wikipedia.com [online], "URI normalization," Oct. 20, 2020, retrieved on Mar. 21, 2022, retrieved from URL<https://en.wikipedia.org/w/index.php?title=URI_normalization&oldid=984473278>, 2 pages.

Zhou, "Evaluating Websites Using a Practical Quality Model", Software Technology Research Laboratory, De Montfort University, 2009, 113 pages.

Anonymous: "PublishPress Checklists: Pre-Publishing Approval Task Checklist for Word.Press Content—Word.Press plugin I Word.Press. org," Aug. 13, 2021 (Aug. 13, 2021), 4 pages.

Weller Nathan B: "Converting HTML Sites 1 to Word.Press Sites I Elegant Themes Blog", Oct. 16, 2021 (Oct. 16, 2021), 27 pages.

EP Search Report in application No. 22206661.5-1203, dated Mar. 7, 2023, 19 pages.

\* cited by examiner

200

```
┌─────────────────────────────────────────────┐
│ Provide instructions to client computing    │
│ device to present rendered version of       │
│ webpage concurrently with plugin            │
│                    202                      │
└─────────────────────────────────────────────┘
                      │
                      ▼
┌─────────────────────────────────────────────┐
│ Receive indication of user input            │
│                    204                      │
│  ┌───────────────────────────────────────┐  │
│  │ Edit webpage                          │  │
│  │              206                      │  │
│  └───────────────────────────────────────┘  │
│  ┌───────────────────────────────────────┐  │
│  │ Select option to publish              │  │
│  │              208                      │  │
│  └───────────────────────────────────────┘  │
│  ┌───────────────────────────────────────┐  │
│  │ Select option to execute pre-publish  │  │
│  │ check                                 │  │
│  │              210                      │  │
│  └───────────────────────────────────────┘  │
└─────────────────────────────────────────────┘
                      │
                      ▼
┌─────────────────────────────────────────────┐
│ Perform pre-publication check on webpage    │
│ based on user input                         │
│                    212                      │
└─────────────────────────────────────────────┘
                      │
                      ▼
┌─────────────────────────────────────────────┐
│ Populate portion(s) of the plugin with      │
│ results from the pre-publication check as   │
│ the check is being performed                │
│                    214                      │
│  ┌ ─ ─ ─ ─ ─ ─ ─ ─ ─ ─ ─ ─ ─ ─ ─ ─ ─ ─ ─ ┐ │
│    Determine access rights to information   │
│  │ about the webpage                      │ │
│                    216                      │
│  └ ─ ─ ─ ─ ─ ─ ─ ─ ─ ─ ─ ─ ─ ─ ─ ─ ─ ─ ─ ┘ │
│  ┌ ─ ─ ─ ─ ─ ─ ─ ─ ─ ─ ─ ─ ─ ─ ─ ─ ─ ─ ─ ┐ │
│    Populate the portion(s) of the plugin    │
│  │ based on the access rights             │ │
│                    218                      │
│  └ ─ ─ ─ ─ ─ ─ ─ ─ ─ ─ ─ ─ ─ ─ ─ ─ ─ ─ ─ ┘ │
│  ┌ ─ ─ ─ ─ ─ ─ ─ ─ ─ ─ ─ ─ ─ ─ ─ ─ ─ ─ ─ ┐ │
│    Rank populated portions of the plugin    │
│  │               219                      │ │
│  └ ─ ─ ─ ─ ─ ─ ─ ─ ─ ─ ─ ─ ─ ─ ─ ─ ─ ─ ─ ┘ │
└─────────────────────────────────────────────┘
                      │
                      ▼
                  ( FIG. 2B )
                  (   220   )
```

FIG. 2A

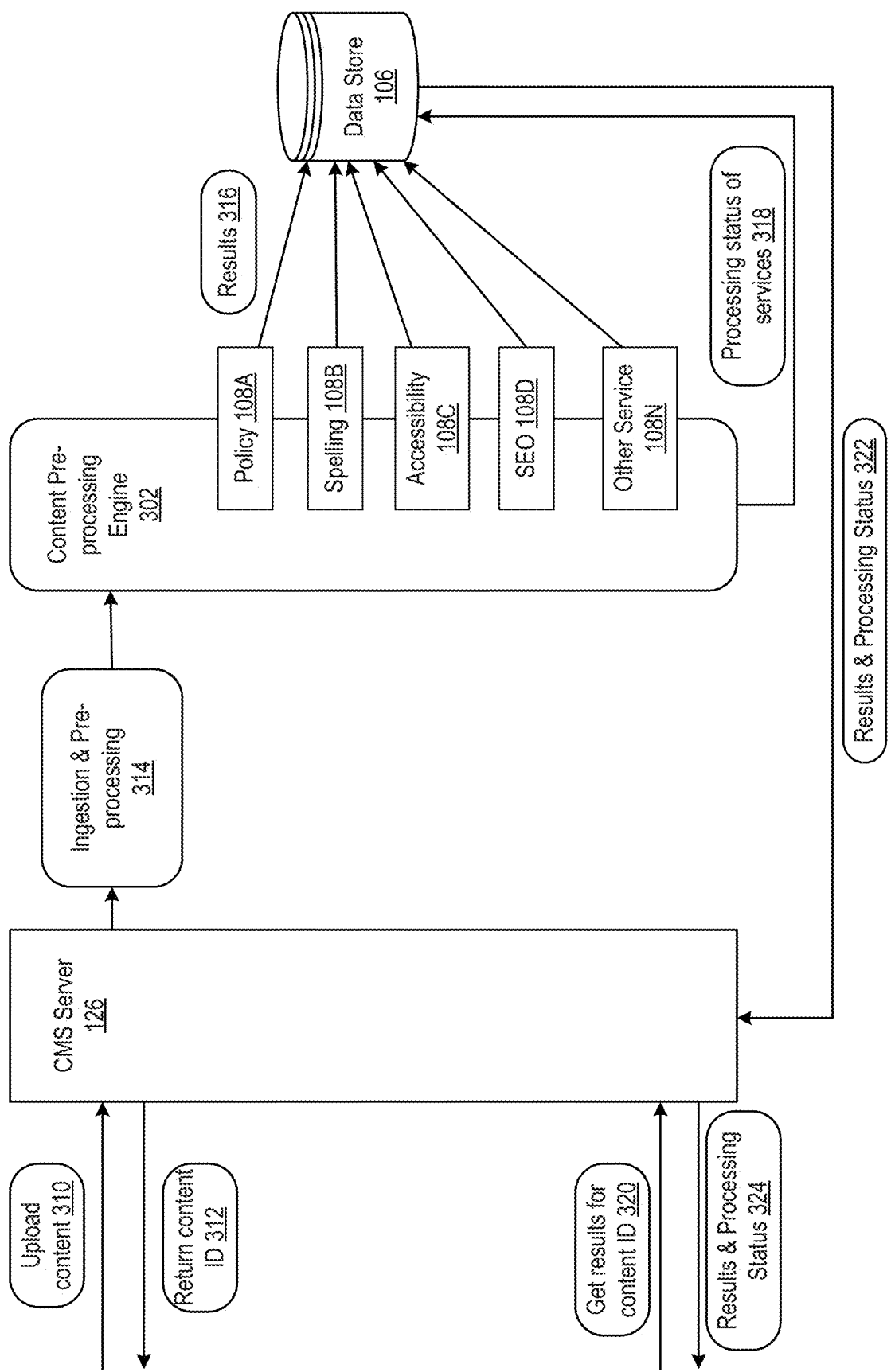

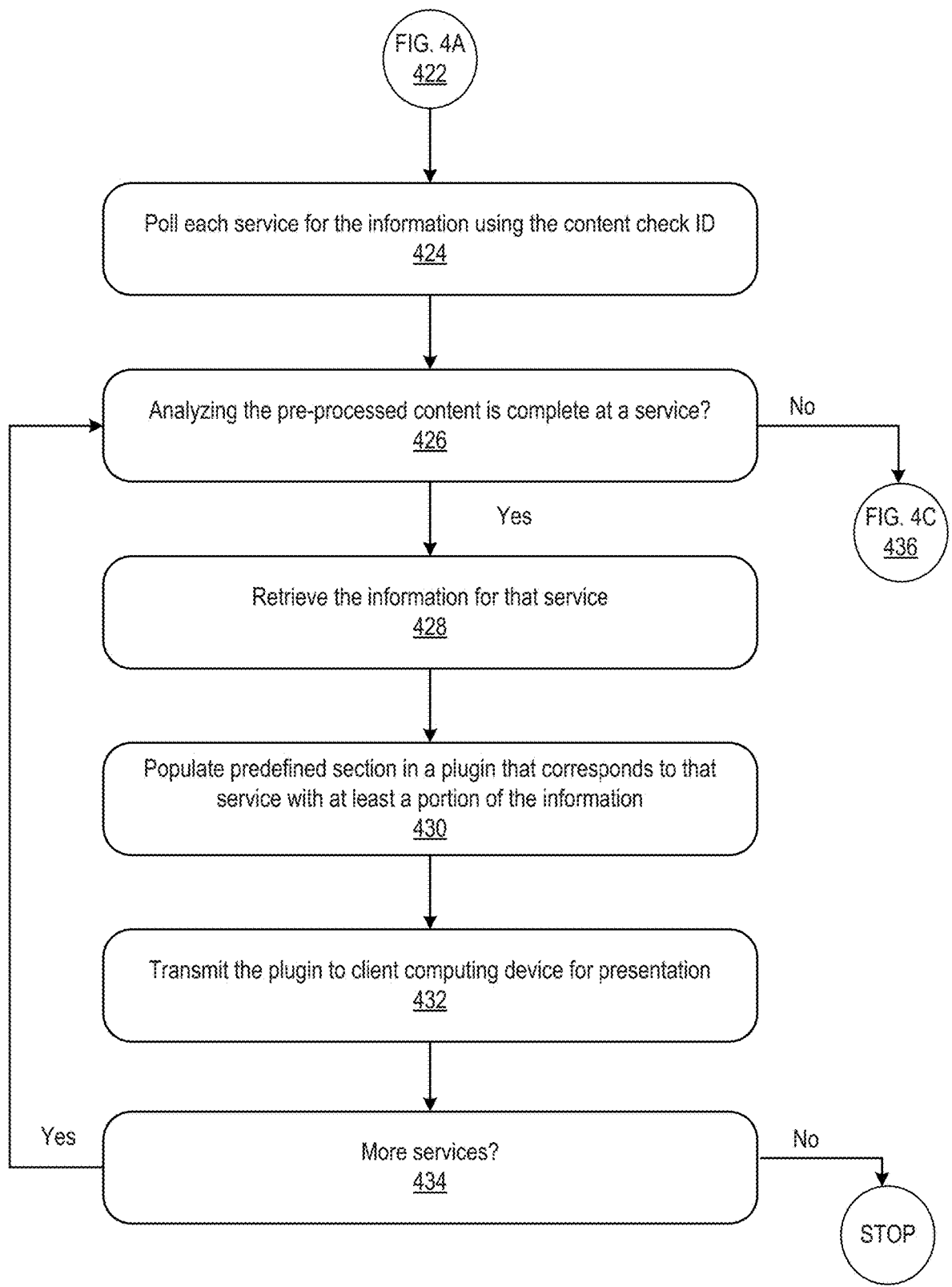

Editing Tool

× Another Page × + http://www.exampleCMS.com/editingtool.htm

Autosaved 2:44 PM Undo?

810

Company Logo

Menu options                                   Search

Homepage

Meet the Company

You've never had a meeting like this before! Participants from remote locations appear in your meeting room, around your table, or stand presenting at your white board. We can pre'd it for you in this service.

Online meeting
distance cooperation
project calendar
white board
online presentations Webpage content 828

Changes to be published  Publish? ⌄

CMS Plugin 804

Pre-publish check   × Close results

Issues to review
Publishing this page will affect the following areas:

Accessibility  832

Accessibility issues

Issue 840  ∘Conformance  ⌄

[ARIA]   [Conformance ▾] [Responsibility ▾]

Text not included
in an ARIA
landmark

[AAA]    Development      < -1/5 >

Line height is
below minimum
value

∘Responsibility  Highlight

Visual design                     < -1/12 >

Technical Issues 854

| Issue | Difficulty | Points you can gain |
|---|---|---|
| ⓘ Pages not included in the sitemap | ○○○○ | 3.66 points |
| ⓘ Missing structured data markup | ○○○○ | 0.91 points |
| ⓘ Missing Open Graph tags | ○○○○ | 0.91 points |
| ⓘ Internal 404 errors (page not found) | ○○○○ | 0.06 points |
| ⓘ Client-side errors (status code 4xx) | ○○○○ | 0.06 points |

Showing all 5 items    Show [5 items ▾] Per page

Content issues 856

| issue | Difficulty | Points you can gain |
|---|---|---|
| ⓘ Low content word count | ○○○○ | 1.98 points |
| ⓘ Pages with broken links | ○○○○ | 1.58 points |

Test  ↻ Refresh    Settings
Log out    Need help?

Events

Webpage Content

News

Webpage Content

Sharing worldwide
Webpage content
830

Find a reseller

Contact us

FIG. 8D-2

Search snippet preview 860

Meet the Company
https://siteimprove-optimizelynet15.azuhewebsites.net/en/alloy-meet/ You've never had a meeting like this before Participants from remote locations appear in your meeting room. around your table, or stand presenting at your white board.

Issues
① Meta description is too long

Keywords related to this pages 862
Mapped keywords
① You haven't mapped any keywords to this page.
Start monitoring keywords
Add keywords to monitor your ranking in relation to the competition. Not sure which keywords to monitor? Discover ones you're already ranking on now.

Discover keywords | Monitor keywords 865
863

Test | Refresh | Settings
Log out | Need help?

Events
Webpage Content
News
Webpage Content

Sharing worldwide
Webpage content
830

Find a reseller
Contact us

FIG. 8E-2

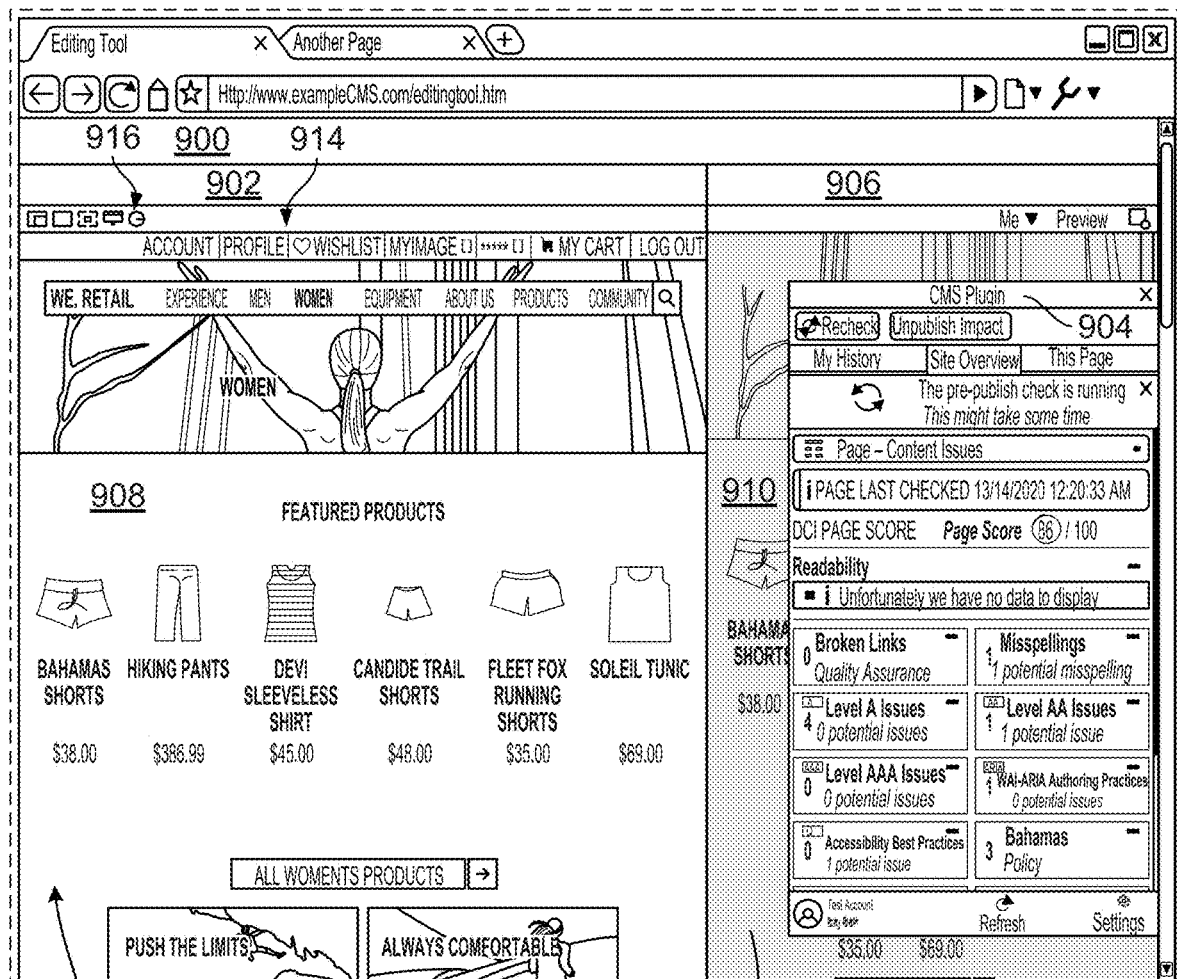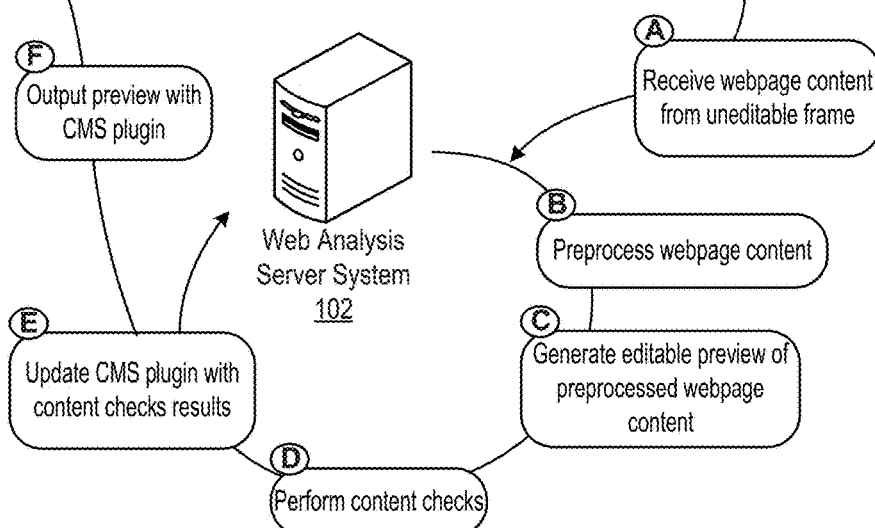
FIG. 9A

WEBSITE PLUGIN AND FRAMEWORK FOR CONTENT MANAGEMENT SERVICES

REFERENCE TO CO-PENDING APPLICATION

This application claims benefit of priority under 35 U.S.C. § 119(e) to U.S. Provisional Application No. 63/277,937, filed Nov. 10, 2021 and entitled WEBSITE PLUGIN AND FRAMEWORK FOR CONTENT MANAGEMENT SERVICES, and the entire disclosure set forth therein is incorporated herein by reference.

TECHNICAL FIELD

This document describes devices, systems, and methods related to assessment and presentation of content management services (CMS) content.

BACKGROUND

Websites can vary in their quality. The quality of a website can affect user experience of users who visit the website. For example, websites with broken links, misspellings, and other features that do not function as intended can be frustrating for users visiting a site. Additionally, websites that are not optimized for search engines (also referred to as "search engine optimization" or SEO) may have a low level of quality because users may not be able to locate relevant pages on the website (or locate the website more generally) using a search engine. For example, websites that do not have information formatted properly for search engines to retrieve and associate with other information on the page may have low levels of SEO, which may result in those websites not appearing as prominently in search results as they otherwise should for relevant search strings. Websites can also have a low level of quality if they are not readily accessible to all users regardless of impairment (also referred to as "website accessibility"). For example, if a website is not formatted properly, users who are seeing or hearing impaired may not be able to use website reader applications to review and navigate through the content.

SUMMARY

The document generally describes assessing pre-publication website content within a CMS system. Pre-publication content includes, for example, draft portions of a webpage that have not yet been published on website (e.g., not yet published and accessible via a URL). For example, the disclosed technology can be used to provide a plugin on a CMS system that is presented on a client computing device and provides an interface between the CMS server, a web analysis server system, one or more web servers that host for the website, and the client computing device presenting information for assessments and guiding improvements. The information can be displayed in a plugin that is presented at the client computing device concurrently with the pre-publication webpage content that is being created/edited within a CMS interface (e.g., a CMS webpage for generating and/or editing the content, such as a webpage editing tool). The plugin can include a coded framework to provide consistent presentation of website assessments from multiple different website assessment services.

A website owner can create content for a webpage in a CMS interface that is provided by the CMS server, such as a CMS interface that is presented in a CMS webpage that includes interfaces and tools for creating content for the webpage (e.g., a webpage editing tool). Such a CMS interface can be loaded onto a client computing device, such as in a web browser being run on the website owner/editor's computer or other similar device. The CMS interface can be programmed to concurrently load and run a web analysis client, such as a web analysis plugin, that is provided by and interfaces with the web analysis server system.

Before publishing the content, web analysis services provided by the web analysis server system and/or third party providers can perform pre-publication checks of the content. Pre-publication content checks can be beneficial to ensure the webpage publishes with minimal or no issues or accidental errors, all of which may impact quality of an overall website and user experiences with the webpage and/or website. Information that is determined by the web analysis services, such as identification of misspellings, accessibility issues, policy issues, etc., during the pre-publication content checks can be presented in the plugin. The website owner/editor can view this information while simultaneously editing their webpage, which can provide for easy and quick review and editing of the webpage before it goes live.

Presentation of the information in the plugin can vary from website owner to website owner, and can be based on access rights and/or subscription of web analysis services associated with the website owner. For example, one website owner can have preferences of running a pre-publication check to verify accessibility and policy compliance. For this website owner, the plugin can be formatted, by the web analysis server system, to include only accessibility and policy information about the website owner's webpage. Another website owner, on the other hand, may have preferences to run the pre-publication check for accessibility, misspellings, and particular word checks. For this website owner, the plugin can be formatted to include the information determined by the web analysis services that pertain to accessibility, misspellings, and particular word checks within the website owner's webpage.

The web analysis services can perform the heavier processing by running the pre-publication checks on the website owner's webpage content while the CMS server can poll the services for status updates and any information that has been generated while running the checks. The CMS server can populate designated portions of the plugin with the information from each of the web analysis services. The CMS server can also format and rank the information presented in the plugin to maintain a consistent framework of information presentation. The CMS server can then transmit the plugin to the client computing device to be presented concurrently with the webpage content that the website owner is editing.

Although the disclosed inventive concepts include those defined in the attached claims, it should be understood that the inventive concepts can also be defined in accordance with the following embodiments.

Embodiment A1 is a computer-implemented method for checking content in a webpage, the computer-implemented method comprising: receiving, by a computing system, webpage content that is rendered in a webpage editing tool that is provided by a content management services (CMS) server and presented in a graphical user interface (GUI) display at a client computing device, wherein the webpage content is ready to be published; transmitting, by the computing system, the webpage content to one or more web analysis services that are configured to (i) analyze the webpage content as part of a content check, (ii) generate information about the webpage content based on performing the content check, and (iii) store the information in association with a content ID in a data store, wherein the content ID identifies the webpage content; polling, by the computing system, the one or more web analysis services for processing status updates and the generated information; receiving, by the computing system and based on the polling, the generated information from the one or more web analysis services; populating, by the computing system, one or more predefined sections in a CMS plugin with at least a portion of the received information from the one or more web analysis services; and returning, by the computing system, the CMS plugin to be presented, at the client computing device, in the webpage editing tool concurrently with the webpage content, wherein the webpage content is presented in a first iFrame and the CMS plugin is presented in a second iFrame, the first iFrame being concurrently presented adjacent to the second iFrame in the webpage editing tool, wherein the webpage content presented in the first iFrame is editable, by a user at the client computing device, while the CMS plugin is being populated, by the computing system, with the at least portion of the received information from the one or more web analysis services Embodiment A2 is the computer-implemented method of embodiment A1, further comprising receiving, by the computing system, an indication of user input at the client computing device indicating selection of an option to perform the content check on the webpage content.

Embodiment A3 is the computer-implemented method of any one of embodiments A1 through A2, further comprising receiving, by the computing system, an indication of user input at the client computing device indicating one or more changes to elements that are displayed in the webpage content within the first iFrame of the webpage editing tool based on at least a subset of the information presented in the CMS plugin.

Embodiment A4 is the computer-implemented method of any one of embodiments A1 through A3, wherein the one or more changes include adding text to at least one element in the webpage content, removing text from at least one element in the webpage content, modifying spelling of text in at least one element in the webpage content, and replacing a broken link in at least one element in the webpage content.

Embodiment A5 is the computer-implemented method of any one of embodiments A1 through A4, further comprising performing, by the computing system, the content check before the webpage content is published.

Embodiment A6 is the computer-implemented method of any one of embodiments A1 through A5, further comprising: determining, by the computing system, whether the webpage content is assigned the content ID within a predetermined period of time; and generating, by the computing system, a content ID for the webpage content based on a determination that the webpage content has not been assigned the content ID within the predetermined period of time.

Embodiment A7 is the computer-implemented method of any one of embodiments A1 through A6, further comprising returning, by the computing system, the content ID that was assigned to the webpage content based on a determination that the webpage content was assigned the content ID within the predetermined period of time.

Embodiment A8 is the computer-implemented method of any one of embodiments A1 through A7, further comprising pre-processing, by the computing system, the webpage content.

Embodiment A9 is the computer-implemented method of any one of embodiments A1 through A8, wherein pre-processing, by the computing system, the webpage content comprises rendering the webpage content internally at the computing system.

Embodiment A10 is the computer-implemented method of any one of embodiments A1 through A9, wherein the webpage content includes HTML, CSS, and JavaScript that correspond to elements that are presented in the webpage content when the webpage content is rendered in a web browser at an end user device.

Embodiment A11 is the computer-implemented method of any one of embodiments A1 through A10, further comprising: packaging, by the computing system, the webpage content into a packaged file; and transmitting, by the computing system, the packaged file to one or more of the web analysis services to be used by the web analysis services in analyzing the webpage content.

Embodiment A12 is the computer-implemented method of any one of embodiments A1 through A11, wherein the web analysis services include at least one of a readability service, an SEO service, a policy service, an accessibility service, and a misspelling service.

Embodiment A13 is the computer-implemented method of any one of embodiments A1 through A12, further comprising receiving, by the computing system, an indication of user input indicating selection of one or more operations to perform in response to at least a portion of the generated information that is presented in the CMS plugin at the client computing device.

Embodiment A14 is the computer-implemented method of any one of embodiments A1 through A13, further comprising: receiving, by the computing system and based on the user input, updated webpage content from the client computing device; and transmitting, by the computing system, the updated webpage content to the one or more web analysis services that are configured to analyze the updated webpage content as part of the content check.

Embodiment A15 is the computer-implemented method of any one of embodiments A1 through A14, wherein the information presented in the CMS plugin includes one or more issues that are identified by the web analysis services while the web analysis services analyze the webpage content.

Embodiment A16 is the computer-implemented method of any one of embodiments A1 through A15, further comprising selecting, by the computing system, the one or more web analysis services from a plurality of web analysis services based on a subscription to services that is associated with a website owner of the webpage content.

Embodiment A17 is the computer-implemented method of any one of embodiments A1 through A16, further comprising: receiving, by the computing system, a request to create webpage content at the client computing device; retrieving, by the computing system, code to render the webpage content in the webpage editing tool at the client computing device; and transmitting, by the computing system, the code to the client computing device to render the webpage content in the first iFrame within the webpage editing tool.

Embodiment A18 is the computer-implemented method of any one of embodiments A1 through A17, wherein the one or more predefined sections of the CMS plugin each correspond to one of the web analysis services.

Embodiment A19 is the computer-implemented method of any one of embodiments A1 through A18, wherein each of the web analysis services are assigned at least one of the predefined sections of the CMS plugin to present the generated information from analyzing the webpage content.

Embodiment A20 is the computer-implemented method of any one of embodiments A1 through A19, further comprising ranking, by the computing system, the information that is presented in the CMS plugin.

Embodiment A21 is the computer-implemented method of any one of embodiments A1 through A20, wherein the ranking is based on user preferences indicating a most important to a least important web analysis service.

Embodiment A22 is the computer-implemented method of any one of embodiments A1 through A21, further comprising: continuously updating, by the computing system, the one or more predefined sections in the CMS plugin with at least a portion of information received from the one or more web analysis services as the one or more web analysis services analyze the webpage content; and returning, by the computing system, the updated CMS plugin to be presented, at the client computing device, in the second iFrame within the webpage editing tool concurrently with the webpage content in the first iFrame within the webpage editing tool.

Embodiment A23 is the computer-implemented method of any one of embodiments A1 through A22, further comprising providing, by the computing system, instructions to the client computing device to present a rendered version of the webpage content in the first iFrame concurrently with the CMS plugin in the second iFrame within the webpage editing tool.

Embodiment A24 is the computer-implemented method of any one of embodiments A1 through A23, further comprising: receiving, by the computing system and from the client computing device, a request for the generated information of at least one of the web analysis services; retrieving, by the computing system, the generated information from the data store based on the content ID that is associated with the webpage content; and returning, by the computing system and to the client computing device, the generated information to be presented in a predefined section in the CMS plugin that is associated.

Embodiment A25 is the computer-implemented method of any one of embodiments A1 through A24, further comprising: receiving, by the computing system, user input indicating selection of a portion of information presented in the CMS plugin, wherein the selected portion of information is an issue that was identified by one of the web analysis services when analyzing the webpage content; generating, by the computing system, a CSS selector for identifying a section of the webpage content that corresponds to the selected portion of information in the CMS plugin; identifying, by the computing system, the section of the webpage content based on analyzing HTML of the webpage content with the CSS selector; applying, by the computing system, a rule to modify the identified section of the webpage with a visual emphasis; and returning, by the computing system, instructions to the client computing device to present the identified section of the webpage content with the visual emphasis.

Embodiment A26 is the computer-implemented method of any one of embodiments A1 through A25, wherein the visual emphasis is highlighting.

Embodiment A27 is the computer-implemented method of any one of embodiments A1 through A26, further comprising generating, by the computing system, a link in the one or more predefined sections of the CMS plugin that corresponds to at least a portion of the received information from the one or more web analysis services.

Embodiment A28 is the computer-implemented method of any one of embodiments A1 through A27, further comprising: caching, by the computing system, at least a second portion of the received information from the one or more web analysis services; and retrieving, by the computing system, the cached information at a later time to be presented in the one or more predefined sections of the CMS plugin at the client computing device.

Embodiment A29 is the computer-implemented method of any one of embodiments A1 through A28, wherein the generated information includes a summary of results that are currently generated by each of the web analysis services at a time that the web analysis service is polled by the computing system.

Embodiment A30 is the computer-implemented method of any one of embodiments A1 through A29, wherein the predefined sections in the CMS plugin are populated, by the computing system, based on a type of issue associated with the generated information.

Embodiment A31 is the computer-implemented method of any one of embodiments A1 through A30, wherein a first section is populated with a subset of the generated information that corresponds to broken links, a second section is populated with a subset of the generated information that corresponds to misspellings, and a third section is populated with a subset of the generated information that corresponds to one or more accessibility conformance levels.

Embodiment B1 is a computer-implemented method for checking content in a webpage, the computer-implemented method comprising: receiving, by a computing system, static webpage content that is rendered in a webpage editing tool that is provided by a content management services (CMS) server and presented in a graphical user interface (GUI) display at a client computing device, wherein the static webpage content is ready to be published; pre-processing, by the computing system, the static webpage content, wherein pre-processing comprises: validating file formats of at least one of HTML, CSS, and JavaScript of the static webpage content that correspond to elements presented in the static webpage content when the static webpage content is rendered in a web browser at an end user device, discarding one or more elements in the static webpage content that are not analyzed by one or more web analysis services as part of a pre-publication content check, and rendering the static webpage content internally at the computing system, wherein the rendered webpage content is dynamic and editable by a user at the client computing device; transmitting, by the computing system, the rendered webpage content to the one or more web analysis services that are configured to (i) analyze the webpage content as part of the pre-publication content check, (ii) generate information about the rendered webpage content based on performing the pre-publication content check, and (iii) store the information in association with a content ID in a data store, wherein the content ID identifies the rendered webpage content; polling, by the computing system, the one or more web analysis services for processing status updates and the generated information; receiving, by the computing system and based on the polling, the generated information from the one or more web analysis services; populating, by the computing system, one or more predefined sections in a CMS plugin with at least a portion of the received information from the one or more web analysis services; and returning, by the computing system, the CMS plugin to be presented, at the client computing device, in the webpage editing tool concurrently with the rendered webpage content, wherein the rendered webpage content is presented in a first iFrame and the CMS plugin is presented in a second iFrame, the first iFrame being concurrently presented adjacent to the second iFrame in the webpage editing tool, wherein the rendered webpage content presented in the first iFrame is editable, by the user at the client computing device, while the CMS plugin is being populated, by the computing system, with the at least portion of the received information from the one or more web analysis services.

Embodiment B2 is the computer-implemented method of embodiment B1, further comprising receiving, by the computing system, an indication of user input at the client computing device indicating selection of an option to perform the pre-publication content check on the rendered webpage content.

Embodiment B3 is the computer-implemented method of any one of embodiments B1 through B2, further comprising receiving, by the computing system, an indication of user input at the client computing device indicating one or more changes to elements that are displayed in the rendered webpage content within the first iFrame of the webpage editing tool based on at least a subset of the information presented in the CMS plugin.

Embodiment B4 is the computer-implemented method of any one of embodiments B1 through B3, wherein the one or more changes include adding text to at least one element in the rendered webpage content, removing text from at least one element in the rendered webpage content, modifying spelling of text in at least one element in the rendered webpage content, and replacing a broken link in at least one element in the rendered webpage content.

Embodiment B5 is the computer-implemented method of any one of embodiments B1 through B4, further comprising performing, by the computing system, the pre-publication content check before the rendered webpage content is published.

Embodiment B6 is the computer-implemented method of any one of embodiments B1 through B5, further comprising: determining, by the computing system, whether the rendered webpage content is assigned the content ID within a predetermined period of time; generating, by the computing system, a content ID for the rendered webpage content based on a determination that the rendered webpage content has not been assigned the content ID within the predetermined period of time; and returning, by the computing system, the content ID that was assigned to the rendered webpage content based on a determination that the rendered webpage content was assigned the content ID within the predetermined period of time.

Embodiment B7 is the computer-implemented method of any one of embodiments B1 through B6, further comprising returning, by the computing system, the static webpage content to be presented in a third iFrame, wherein the third iFrame is presented concurrently with the first and second iFrames, the third iFrame being presented adjacent to the first iFrame and the second iFrame overlaying a portion of the third iFrame, wherein the static webpage content is uneditable and greyed out in the third iFrame.

Embodiment B8 is the computer-implemented method of any one of embodiments B1 through B7, wherein the web analysis services include at least one of a readability service, an SEO service, a policy service, an accessibility service, and a misspelling service.

Embodiment B9 is the computer-implemented method of any one of embodiments B1 through B8, further comprising receiving, by the computing system, an indication of user input indicating selection of one or more operations to perform in response to at least a portion of the generated information that is presented in the CMS plugin at the client computing device.

Embodiment B10 is the computer-implemented method of any one of embodiments B1 through B9, further comprising: receiving, by the computing system and based on user input, updated webpage content from the client computing device; pre-processing, by the computing system, the updated webpage content; and transmitting, by the computing system, the pre-processed webpage content to the one or more web analysis services that are configured to analyze the pre-processed webpage content as part of the pre-publication content check.

Embodiment B11 is the computer-implemented method of any one of embodiments B1 through B10, wherein the information presented in the CMS plugin includes one or more issues that are identified by the web analysis services while the web analysis services analyze the rendered webpage content.

Embodiment B12 is the computer-implemented method of any one of embodiments B1 through B11, further comprising selecting, by the computing system, the one or more web analysis services from a plurality of web analysis services based on a subscription to services that is associated with a website owner of the rendered webpage content.

Embodiment B13 is the computer-implemented method of any one of embodiments B1 through B12, further comprising: receiving, by the computing system, a request to create webpage content at the client computing device; retrieving, by the computing system, code to render the webpage content in the webpage editing tool at the client computing device; and transmitting, by the computing system, the code to the client computing device to render the webpage content in the first iFrame within the webpage editing tool.

Embodiment B14 is the computer-implemented method of any one of embodiments B1 through B13, wherein each of the web analysis services are assigned at least one of the predefined sections of the CMS plugin to present the generated information from analyzing the rendered webpage content.

Embodiment B15 is the computer-implemented method of any one of embodiments B1 through B14, further comprising ranking, by the computing system, the information that is presented in the CMS plugin, wherein the ranking is based on user preferences indicating a most important to a least important web analysis service.

Embodiment B16 is the computer-implemented method of any one of embodiments B1 through B15, further comprising: continuously updating, by the computing system, the one or more predefined sections in the CMS plugin with at least a portion of information received from the one or more web analysis services as the one or more web analysis services analyze the rendered webpage content; and returning, by the computing system, the updated CMS plugin to be presented, at the client computing device, in the second iFrame within the webpage editing tool concurrently with the rendered webpage content in the first iFrame within the webpage editing tool.

Embodiment B17 is the computer-implemented method of any one of embodiments B1 through B16, further comprising providing, by the computing system, instructions to the client computing device to present the rendered webpage content in the first iFrame concurrently with the CMS plugin in the second iFrame within the webpage editing tool.

Embodiment B18 is the computer-implemented method of any one of embodiments B1 through B17, further comprising: receiving, by the computing system and from the client computing device, a request for the generated information of at least one of the web analysis services; retrieving, by the computing system, the generated information from the data store based on the content ID that is associated with the rendered webpage content; and returning, by the computing system and to the client computing device, the generated information to be presented in a predefined section in the CMS plugin that is associated.

Embodiment B19 is the computer-implemented method of any one of embodiments B1 through B18, further comprising: receiving, by the computing system, user input indicating selection of a portion of information presented in the CMS plugin, wherein the selected portion of information is an issue that was identified by one of the web analysis services when analyzing the rendered webpage content; generating, by the computing system, a CSS selector for identifying a section of the rendered webpage content that corresponds to the selected portion of information in the CMS plugin; identifying, by the computing system, the section of the rendered webpage content based on analyzing HTML of the rendered webpage content with the CSS selector; applying, by the computing system, a rule to modify the identified section of the rendered webpage content with a visual emphasis; and returning, by the computing system, instructions to the client computing device to present the identified section of the rendered webpage content with the visual emphasis.

Embodiment B20 is the computer-implemented method of any one of embodiments B1 through B19, further comprising: caching, by the computing system, at least a second portion of the received information from the one or more web analysis services; and retrieving, by the computing system, the cached information at a later time to be presented in the one or more predefined sections of the CMS plugin at the client computing device.

Embodiment B21 is a method for performing pre-publication checks on webpage content, the method comprising: displaying, in a graphical user interface (GUI) for a content management system (CMS) application running on a client computing device, a selectable element to perform a pre-publication check on unpublished webpage content, wherein the unpublished webpage content has not yet been published to a webserver; retrieving, in response to selection of the selectable element, the webpage content from the CMS application on the client computing device; transmitting, by the client computing device, at least a portion of the webpage content to a web content analysis system for pre-publication checks, wherein the web content analysis system includes a plurality of web content analysis services that each perform a different type of webpage content check, wherein transmitting the at least a portion of the webpage content causes the web content analysis system to initiate the webpage content checks on the webpage content by the plurality of web content analysis services; polling, by the client computing device, the plurality of web content analysis services for results of the webpage content checks; retrieving, from the web content analysis system, the results from each of the web content analysis services as the results become available based on the polling, wherein the results identify one or more elements in the unpublished webpage content for correction; identifying, by the client computing device, one or more DOM elements for the unpublished webpage content in the CMS application that correspond to the one or more elements identified in the results; displaying, in the GUI for the CMS application, the results for each of the web content analysis services in one or more designated areas of the GUI, wherein the results are displayed in the one or more designated areas of the GUI with information identifying the one or more elements for correction; and outputting, in the GUI for the CMS application, one or more graphical features that identify the one or more elements in the unpublished webpage content as displayed in other portions of the CMS application based on the one or more DOM elements.

Embodiment B22 is the method of embodiment B21, wherein retrieving, in response to selection of the selectable element, the webpage content from the CMS application on the client computing device comprises retrieving an uneditable version of the webpage content from the webserver.

Embodiment B23 is the method of any one of embodiments B21 through B22, wherein the one or more graphical features are presented over at least a portion of the uneditable version of the webpage content.

Embodiment B24 is the method of any one of embodiments B21 through B23, wherein the one or more graphical features are presented over an editable version of the webpage content, wherein the editable version of the webpage content is different from the uneditable version of the webpage content.

Embodiment B25 is the method of any one of embodiments B21 through B24, wherein the editable version of the webpage content is displayed in the GUI for the CMS application and the uneditable version of the webpage content is not displayed in the GUI for the CMS application.

Embodiment B26 is the method of any one of embodiments B21 through B25, further comprising identifying, by the client computing device, the one or more DOM elements for the unpublished webpage content in the CMS application from identifiers that correspond to the one or more elements identified in the results, wherein the identifiers are generated by the web content analysis system.

Embodiment B27 is the method of any one of embodiments B21 through B26, wherein each of the one or more designated areas of the GUI can include information indicating an issue category, a quantity of occurrences identified by the respective web content analysis service for the issue category, the respective web content analysis service that identified the quantity of occurrences, and a quantity of potential issues identified by the respective web content analysis service that should be verified or rejected by a user of the client computing device.

Embodiment B28 is the method of any one of embodiments B21 through B27, wherein the one or more web content analysis services include a broken links service, a spelling service, an accessibility service, a policy service, and an SEO service.

Embodiment B29 is the method of any one of embodiments B21 through B28, wherein the broken links service is configured to identify broken links in the webpage content and determine a quantity of occurrences of broken links in the webpage content, wherein the quantity of occurrences is outputted in one of the one or more designated areas of the GUI that corresponds to the broken links service.

Embodiment B30 is the method of any one of embodiments B21 through B29, wherein the spelling service is configured to identify misspellings in the webpage content and determine a quantity of occurrences of misspellings in the webpage content, wherein the quantity of occurrences is outputted in one of the one or more designated areas of the GUI that corresponds to the misspellings service.

Embodiment B31 is the method of any one of embodiments B21 through B30, wherein the accessibility service is configured to: identify occurrences of noncompliance with accessibility standards in the webpage content; group the occurrences of noncompliance with particular accessibility standards; and determine a quantity of the occurrences of noncompliance in each group.

Embodiment B32 is the method of any one of embodiments B21 through B31, wherein the accessibility service is further configured to output each group of the occurrences of noncompliance in one or more of the one or more designated areas of the GUI that correspond to the particular accessibility standards.

Embodiment B33 is the method of any one of embodiments B21 through B32, wherein the particular accessibility standards include level A, level AA, level AAA, WAI-ARIA authoring practices, and accessibility best practices.

Embodiment B34 is the method of any one of embodiments B21 through B33, wherein the one or more designated areas of the GUI each correspond to different categories of services offered by the web content analysis services, wherein the different categories of services include accessibility issues, quality assurance, readability, and policy.

Embodiment B35 is the method of any one of embodiments B21 through B34, wherein at least one of the one or more designated areas of the GUI is configured to display information about an overall quality score of the webpage content.

The devices, system, and techniques described herein may provide one or more of the following advantages. For example, pre-publication content checking can enable analysis of webpage content prior to publishing to prevent or otherwise mitigate publication of potentially error-ridden content that may negatively impact overall webpage and/or website quality. The disclosed techniques provide for distilling complex and robust amounts of information about the webpage to generate meaningful insight about how to improve the webpage before publication. By enabling programmatic integration of analysis and processing of webpage content into web analysis server systems, including but not limited to a publishing, or pre-publishing, pipeline, the disclosed techniques can mitigate or otherwise prevent accidental publishing of error-ridden webpage content that may lower quality of the webpage and/or or negatively impact user experiences with the webpage.

Moreover, issues that are identified during a pre-publication check by the web analysis services is presented in the plugin, concurrently with the webpage, to increase visibility of the issues and make it easy and fast for the website owner to address these issues in their webpage before publishing. For example, graphical user interfaces (GUI) and specific GUI features can be provided to assist website owners in readily and quickly understanding issues in the webpage that can and probably should be fixed before publishing to improve overall webpage quality and user experiences. The GUI features can visually and textually identify particular issues and walk the website owner through options for quick resolution of those issues. Such GUI features can permit for complex information about quality issues in the webpage to be presented in a simplified manner along with the webpage. Since the website owner can view the issues concurrently in a same GUI as the webpage, the website owner can edit the webpage in real-time to quickly correct the issues before publication.

Similarly, the disclosed techniques provide for maintaining quality before and after publishing the webpage. Rather than being a static check, the disclosed techniques provide for dynamically checking the webpage to determine whether issues or errors exist in the webpage content and if the issues or errors do exist, suggestions can be presented in the plugin that prompt the website owner to review and resolve the issues or errors before publication. Thus, the issues or errors can be made known to the webpage owner as soon as they are identified so that the website owner can quickly resolve such issues or errors before publication.

As another example, although the plugin can be implemented in any web browser for any website owner or other relevant client, the CMS plugin framework can be adapted to present information relevant to a particular website owner in a consistent ranking, formatting, and styling. Each website owner can have different service subscriptions and/or preferences of what and how webpage content is checked by the web analysis services. The framework can be adapted to meet the unique needs of each website owner so that information is consistently formatted and displayed in a particular way within the plugin for the website owner.

As another example, the CMS plugin framework can be an architecture that permits for various different web analysis services to present information in the plugin without having to be specifically developed for the plugin. The services do not have to be integrated with the CMS server nor the web analysis server system. The CMS plugin framework allows for integration of web analysis services that are provided by different third party server systems and/or providers. Each web analysis service can be polled, by the CMS server, about their progress in checking the content and whether they generated any information as they are currently performing the check(s). The disclosed techniques allow for each web analysis service that checks different aspects of the webpage to return information that can be consolidated and displayed in a singular plugin using consistent ranking, formatting, and styling.

Moreover, the disclosed techniques provide for an efficient and consistent way to check a webpage for any issues or errors before the webpage is published with those issues or errors. The technology described herein permits for a number of processor cycles that are used to identify errors in the webpage to be minimized, thus optimizing processing efficiency of generating and presenting information in the plugin. Additionally, efficiencies that are gained permit for real-time, dynamic webpage assessments, which can allow website owners, before and after publication, to evaluate the current version of their websites, to respond more quickly to decreased quality and issues within the webpage, and to improve user experiences with the webpage.

The details of one or more implementations are set forth in the accompanying drawings and the description below. Other features and advantages will be apparent from the description and drawings, and from the claims.

BRIEF DESCRIPTION OF THE DRAWINGS

FIGS. 2A-B is a flowchart of a process for generating and presenting information in a CMS plugin for a website owner.

FIG. 3 is a conceptual diagram for executing a pre-publication content check.

FIGS. 4A-C is a flowchart of a process for executing a pre-publication content check.

FIGS. 8A-1 and 8A-2 are an example GUI for displaying information to run a pre-publication check for a webpage.

FIGS. 8B-1 and 8B-2 are an example GUI for displaying results while the pre-publication check of FIGS. 8A-1 and 8A-2 is running.

FIGS. 8D-1, 8D-2, 8E-1, 8E-2, and 8F are example GUIs for displaying identified SEO issues for a webpage.

FIG. 9A is a conceptual diagram depicting generation and presentation of a CMS plugin with webpage content in a webpage editing tool.

Like reference symbols in the various drawings indicate like elements.

DETAILED DESCRIPTION OF ILLUSTRATIVE EMBODIMENTS

This document generally describes checking webpage content for potential issues and returning information about such content checks in a consistent CMS plugin framework. The framework can be an architecture of a CMS plugin that permits for different web analysis services to present information in the plugin without having to be specifically developed for the plugin. The framework can also be used by a computing system to rank and format the information from the web analysis services as well as consistently allocate space in the plugin for each of the services. The plugin can be displayed in a web browser concurrently with the webpage that a website owner is reviewing or otherwise editing so that the website owner can review issues presented in the plugin and edit the webpage at the same time to resolve those issues before publication of the webpage.

The website owner may customize what web analysis services are used to perform pre-publication content checks and what information is presented in the plugin. As the web analysis services execute their respective checks, they can provide information to the computing system to be presented in their respective/allocated portions of the plugin. Although a single plugin can be deployed in all types of web browsers for any website owner or other relevant user/client, the disclosed techniques provide for adapting the CMS plugin framework to particular needs and/or preferences of a website owner. As a result, only particular web analysis services that are identified by the website owner's needs and/or preferences (e.g., a service subscription) may be polled, by the computing system, to provide information for presentation in the plugin.

The pre-publication content checks can be beneficial to assess content quality in a webpage as well as in other situations where content may be formatted similarly. For example, pre-publication content checks can be performed on campaign emails that can be sent out to many customers at once. The campaign emails can be a combination of HTML, JavaScript, and CSS, all of which can be analyzed similar we webpage content with the disclosed techniques. Therefore, using the pre-publication content checks, each variation of the campaign emails can be checked before they are sent out to the customers to determine content quality of the campaign emails. As another example, the pre-publication content checks can be performed on various types of social media posts and content.

Figure 1A:
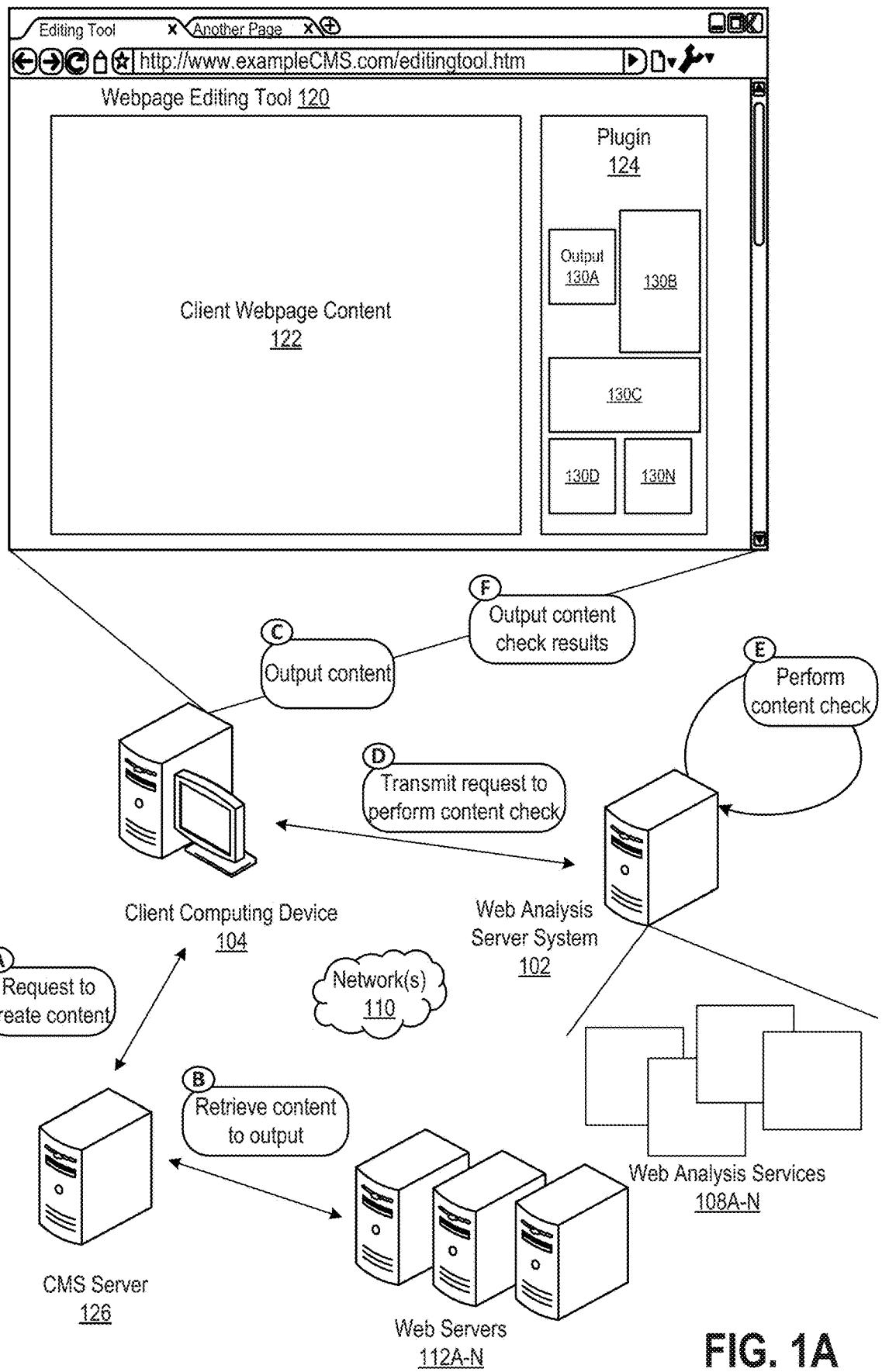
FIG. 1A is a conceptual diagram depicting generation and presentation of a CMS plugin with webpage content in a webpage editing tool.

Referring to the figures, FIG. 1A is a conceptual diagram depicting generation and presentation of a CMS plugin 124 with webpage content 122 in a webpage editing tool 120. A web analysis server system 102, a client computing device 104, a CMS server 126, and web servers 112A-N can be in communication (e.g., wired and/or wireless) via network(s) 110. Although shown as separate components and systems, in some implementations, one or more of 102, 104, 126, and/or 112A-N can be combined into a computing system or otherwise part of a network of computing devices, systems, and/or cloud-based services. In some implementations, the CMS server 126 can be part of the web analysis server system 102.

The web analysis server system 102 can be a computer, computing system, computing device, network of devices, cloud-based system, and/or cloud-based server that can provide website analytics to website owners (e.g., clients), website operators, and other relevant users. For example, the web analysis server system 102 can assess quality of websites and, more particularly, webpages for website owners or other relevant users and provide suggestions for improving those websites or webpages based on particular client needs. The web analysis server system 102 can also be configured to generate the CMS plugin 124 and populate the CMS plugin 124 with information about the quality of the website owner's webpage.

The web analysis server system 102 can include web analysis services 108A-N, which can be configured to assess different aspects of the webpage. The web analysis services 108A-N can perform any of the pre-publication webpage content checks described herein. For example, one or more of the services 108A-N can be configured to identify misspellings, noncompliance with accessibility standards, policy violations, SEO issues, ads issues, and other potential errors in the webpage that may impact the webpage's quality. In some implementations, one or more of the services 108A-N can be provided by one or more different third parties.

The client computing device 104 can be a user device, including but not limited to a mobile phone, smartphone, laptop, tablet, computer, or other type of user device. The client computing device 104 can be used by the website owner (e.g., client) or other relevant user who operates the website and/or improves, changes, or modifies the website. The website owner can access content management services via a CMS interface, such as the webpage editing tool 120, which can be provided by the CMS server 126. The webpage editing tool 120 can be used to generate, create, modify, and/or maintain content in webpages of the website owner. The webpage editing tool 120 can also be used to view and learn insights about the webpages of the website owner, such as quality of a webpage, how much traffic the webpage is getting, keyword suggestions, search engine optimization (SEO) suggestions, advertisement recommendations, and/or search engine rankings. One or more other content management services can be provided by the CMS server 126 and presented in one or more CMS interfaces at the client computing device 104, such as the webpage editing tool 120.

The CMS server 126 can provide content management services to the website owner at the client computing device 104, as described above.

The web servers 112A-N can host code for webpages of websites. The code can be retrieved by any of the systems described herein to render a webpage at the client computing device 104.

The webpage editing tool 120 can be presented in a web browser at the client computing device 104. As described herein, the webpage editing tool 120 can be used by a website owner to create, edit, and analyze a webpage of the website owner before, during, and after publication. The webpage editing tool 120 can be provided by the CMS server 126.

The webpage editing tool 120 can display both client webpage content 122 and the plugin 124. The client webpage content 122 can be presented within an iFrame that displays a rendered version of a particular webpage of the website owner's website. The webpage content 122 can be rendered as if it were presented at a user device of an end user. Therefore, the website owner can assess the webpage content 122 as it would appear to an end user. The website owner can also edit any of the webpage content 122 directly in the website editing tool 120. For example, the webpage editing tool 120 can present multiple options, such as buttons, that can be selected by the website owner to edit the webpage content 122 and perform other content creation and/or analytics actions. These edits can appear in the webpage content 122, which the website owner can save and run a pre-publication check on.

The CMS plugin 124 can be presented in another iFrame separate from the iFrame of the webpage content 122. The plugin 124 can present information about the client webpage content 122. For example, the plugin 124 can present results from one or more quality assessments that were performed during a pre-publication check by the web analysis services 108A-N.

After the website owner edits the webpage content 122, the website owner can select an option (e.g., button) in the webpage editing tool 120 to run a pre-publication check on the webpage content 122. When the option is selected, the CMS server 126 can provide a unique identifier (ID) and session ID that identifies the website owner and the webpage to the web analysis server system 102. The web analysis server system 102 can use the unique ID and/or session ID to poll for relevant information related to the webpage content 122 and run the pre-publication check on the webpage content 122. The webpage content 122 can be pulled and packaged at the client computing device 104 before being sent to the web analysis services 108A-N with the unique ID and/or session ID. The web analysis server system 102 can then return the results from assessments performed by the web analysis services 108A-N, which can be presented in one or more output blocks 130A-N of the plugin 124.

The plugin 124 includes one or more output blocks 130A-N. The output blocks 130A-N can be like placeholders in the framework of the plugin 124. Each web analysis service 108A-N that is run to assess the webpage content 122 can generate results that are presented in the output blocks 130A-N. Each service 108A-N can be assigned one or more of the output blocks 130A-N. Therefore, whenever a service 108A-N assesses the webpage content 122 and generates results (e.g., information) about the respective assessment, the service 108A-N can populate its designated output block(s) 130A-N with the results (or a portion of the results).

The output blocks 130A-N may be configurable to include results from any type of service 108A-N, including third party services that are not part of the web analysis server system 102. As a result, the plugin 124, which can be deployed in the webpage editing tool 120 of any client computing device 104 for any website owner, can be dynamic and customizable, based on user preferences, access rights, privileges, and/or service subscriptions. This framework allows for the plugin 124 to be easily deployed and filled in with information by services that are selected by the website owner to assist the website owner in editing, finalizing, and publishing their webpage content.

In some implementations, the plugin 124 can be a panel that is presented concurrently with the webpage content 122 (e.g., once an option, such as a button in the webpage editing tool 120, is selected to view the plugin 124). In some implementations, the plugin 124 may also be presented in the webpage editing tool 120 as overlapping at least a portion of the client webpage content 122.

Still referring to FIG. 1A, the client computing device 104 can request to create content from the CMS server 126 (step A). For example, the website owner can request to load a particular webpage as the webpage content 122 in the webpage editing tool 120. This webpage can be one that the website owner desires to edit, create, and then eventually publish. The client computing device 104 can provide the CMS server 126 with a client ID and a webpage ID, which can be used to retrieve corresponding webpage code from the web servers 112A-N. When the client computing device 104 request to create content from the CMS server 126, the client computing device 104 may also include a message request for the CMS server 126 to also get the CMS plugin 124, from the web analysis server system 102, for the particular client ID. Thus, the client computing device 104 can present the rendered webpage content 122 concurrently with the CMS plugin 124 in the webpage editing tool 120.

The CMS server 126 can retrieve content from the web servers 112A-N (step B). The content can include webpage code, including but not limited to HTML, CSS, Javascript, images, and any other files that may be used to render the requested webpage. All this content can be retrieved in order to render the webpage content 122 in the webpage editing tool 120 as the webpage would appear at a user device of an end user. As mentioned above, the CMS server 126 can also transmit a message to the web analysis server system 102 requesting the CMS plugin 124 that is associated with the particular client ID.

The content can be transmitted from the web servers 112A-N back to the CMS server 126 or directly to the client computing device 104 to be presented in the website editing tool 120 as the webpage content 122 (step C). Once the webpage content 122 is displayed to the website owner, the website owner can edit the content 122 and/or create new content therein. The website owner may also desire to publish the webpage content 122. As described above, the website owner may select an option in the webpage editing tool 120 to perform a pre-publication check on the webpage content 122. When the website owner selects that option, the client computing device 104 can transmit a request to perform the content check to the web analysis server system 102 (step D). In some implementations, the content check can be performed even after the webpage content 122 is published. Moreover, the content check can be automatically performed when the website owner selects an option to publish the webpage content 122.

The webpage content 122 can be packaged at the client computing device 104 and transmitted to the web analysis server system 102 in step D. The web analysis server system 102 can also receive the client ID from the client computing device 104, which can be used by the web analysis server system 102 to identify the website owner's preferences and/or service subscriptions and determine which of the web analysis services 108A-N should execute pre-publication content checks.

The web analysis server system 102 can unpackage the webpage content 122 and perform the content check on the unpackaged webpage content 122 (step E). As described throughout this disclosure, the content check can be performed by one or more of the web analysis services 108A-N. Each of the services 108A-N that correspond to a subscription or preferences of the website owner can run a pre-publication check on the unpackaged webpage content.

Each of the services 108A-N can transmit results from their respective content checks back to the client computing device 104. The results can be transmitted in real-time so that the client computing device 104 can output content check results as they are generated in the plugin 124 (step F). The services 108A-N can each populate their respective output blocks 130A-N in the plugin 124 with results from the content checks. The plugin 124 can therefore utilize a framework that allows each service 108A-N, which is designated one or more particular output blocks 130A-N, to consistently rank, format, and display their results in the same portions of the plugin 124. Once each service 108A-N populates its respective output blocks 130A-N with the results, the plugin 124 can be transmitted by the web analysis server system 102 back to the client computing device 104 to be presented concurrently with the webpage content 122 in the webpage editing tool 120.

Figure 1B:
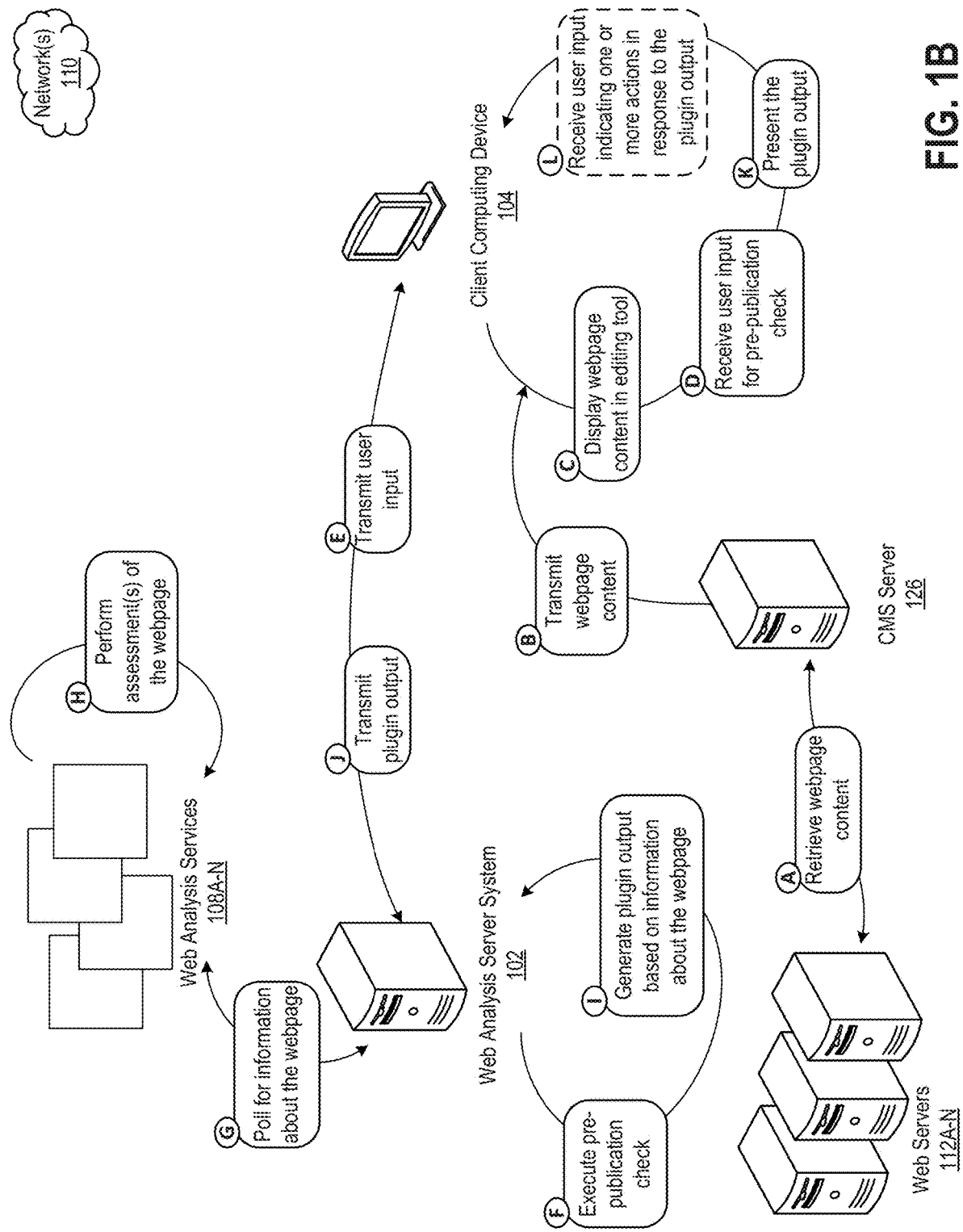
FIG. 1B is a conceptual diagram depicting generation of information for the CMS plugin that is presented at a client computing device.

FIG. 1B is a conceptual diagram depicting generation of information for the CMS plugin 124 that is presented at the client computing device 104. The CMS server 126 can retrieve webpage content from the web servers 112A-N, which can be used to render the webpage content at the client computing device 104 (step A). As described above in reference to FIG. 1A, the CMS server 126 may retrieve the content upon receiving a request from the client computing device 104 to create the webpage content in a CMS interface, such as the webpage editing tool 120, displayed at the client computing device 104. The CMS server 126 can then transmit the webpage content to the client computing device 104 in step B, which the client computing device 104 can display in the webpage editing tool 120 in step C.

The client computing device 104 can then receive user input for a pre-publication check to be performed on the displayed webpage content (step D). Refer to FIG. 1A for further discussion. In brief, the website owner can decide to publish the webpage that is presented in the webpage editing tool 120 (step C). Before publishing, the website owner can select an option (e.g., a button) that is presented in the editing tool to run a pre-publication check. The pre-publication check can be performed to identify any potential issues or accidental errors in the webpage content that can be fixed before publishing the webpage.

The client computing device 104 can transmit an indication of the received user input to the web analysis server system 102 (step E). The web analysis server system 102 can then execute the pre-publication check (step F), which is described in further detail below (e.g., refer to FIGS. 3-4). In brief, the pre-publication check can be performed by the web analysis server system 102 to check webpage content for accidental errors and potential issues that can be fixed before the webpage is published. Therefore, the website owner can easily and quickly address these errors and/or issues so that the published webpage is of higher quality than if the errors and/or issues are not fixed before publication.

As part of the pre-publication check, the web analysis server system 102 can poll the web analysis services 108A-N for information about their respective progress in assessing the webpage (step G). One or more of the web analysis services 108A-N may be selected by the website owner and used in the pre-publication check. In some implementations, the one or more services 108A-N can be selected by the web analysis server system 102 and based on access rights, privileges, and/or a subscription associated with the website owner. For example, if the website owner only has a subscription for accessibility and misspellings review, then the web analysis system 102 may only poll web analysis services 108A-N that are configured to assess the website for accessibility and misspellings. In some implementations, the CMS server 126 can poll the web analysis services 108A-N instead of the web analysis server system 102.

The services 108A-N can receive information about the webpage from the web analysis server system 102, which they can use to perform their designated assessments (step H). Each service 108A-N can be configured to perform a different type of content check on the webpage, or otherwise check the webpage for different issues and/or errors. For example, one of the services 108A-N can be configured to check the webpage for any spelling errors. Another service 108A-N can be configured to check the webpage for search engine optimization (SEO) issues. Yet another service 108A-N can be configured to check the webpage for compliance with accessibility standards. Another service 108A-N can be configured to check the webpage for compliance with website policies that have been established by the website owner. One or more other services 108A-N can be chosen by the website owner to execute content checks before publishing the webpage.

The services 108A-N can perform their assessments on information that is collected by the web analysis server system 102 when crawling the webpage. Crawl results can be generated, which include everything on and associated with the webpage, including HTML, CSS, and Javascript, as well as a path for presenting the webpage content in a web browser. The crawl results can be packaged and delivered to the one or more services 108A-N with an anonymous identifier that identifies the webpage and/or the website owner. Since an anonymous identifier is used, any confidential or private information that is presented in the webpage may not be exposed while transmitting the packaged information to the web analysis services 108A-N. Additionally, the packaged information can represent the webpage as if it were presented in real-time in a web browser at a user device of an end user. Therefore, since all information associated with the webpage is packaged, the information can be used by any of the services 108A-N to perform their respective content checks, regardless of what aspects of the webpage the services 108A-N assess.

In some implementations, the services 108A-N can populate designated portions in the CMS plugin with their respective results, which can reduce an amount of processing power and resources that may be used by the web analysis server system 102 and/or the CMS server 126. As a result, the services 108A-N can do more of the heavier processing by not only assessing the webpage but also presenting, using the CMS plugin framework for the particular website owner, results from their assessments in a consistent manner within the CMS plugin.

The web analysis server system 102 can also generate plugin output based on the information about the webpage that is received from the web analysis services 108A-N (step I). For example, using the framework associated with the particular website owner, the system 102 can populate predefined sections of the plugin with the results from the one or more web analysis services 108A-N. The system 102 can also rank and format the information presented within the plugin. Ranking can be based on importance of the services 108A-N to the website owner. For example, the website owner can designate importance of each of the services 108A-N that are used to assess the website. As another example, the web analysis server system 102 can automatically determine a ranking of the services 108A-N.

The plugin output can then be transmitted, by the web analysis server system 102 to the client computing device 104 (step J). The plugin can be presented in a GUI display at the client computing device 104 (step K). As described throughout this disclosure, the plugin can be presented in the same GUI display as the webpage that the website owner desires to publish and/or is currently editing. As a result, the website owner can view the current webpage concurrently with results from the assessments performed by the web analysis services 108A-N. This can be a beneficial and user-friendly interface to assist the website owner in quickly and efficiently reviewing potential issues and/or accidental errors in the webpage before publishing the webpage.

Optionally, the client computing device 104 may also receive user input indicating one or more actions to be taken in response to the plugin output (step L). For example, and as described further in reference to FIGS. 1A and 8A-C, the website owner can click into or select any of the issues or errors presented in the plugin. By selecting an issue, additional information can be presented about the issue. Moreover, the selected issue can be highlighted in the webpage that is presented concurrently with the plugin. The website owner can therefore view where in the webpage the issue is identified and additional information about the issue (which is presented in the plugin).

The website owner can fix the issue directly in the highlighted portion of the webpage. When such a fix is made, content of the webpage has been updated. Therefore, the website owner can select an option (e.g., button) presented in the web browser (for example, in the plugin) to rerun the pre-publication check. In some implementations, the pre-publication check can be automatically executed by the web analysis server system 102 (step F). By running the pre-publication check again, the web analysis server system 102 can determine whether the issue has been resolved and whether there are any other issues or accidental errors in the webpage that can be addressed before publishing the webpage.

Figure 2B:
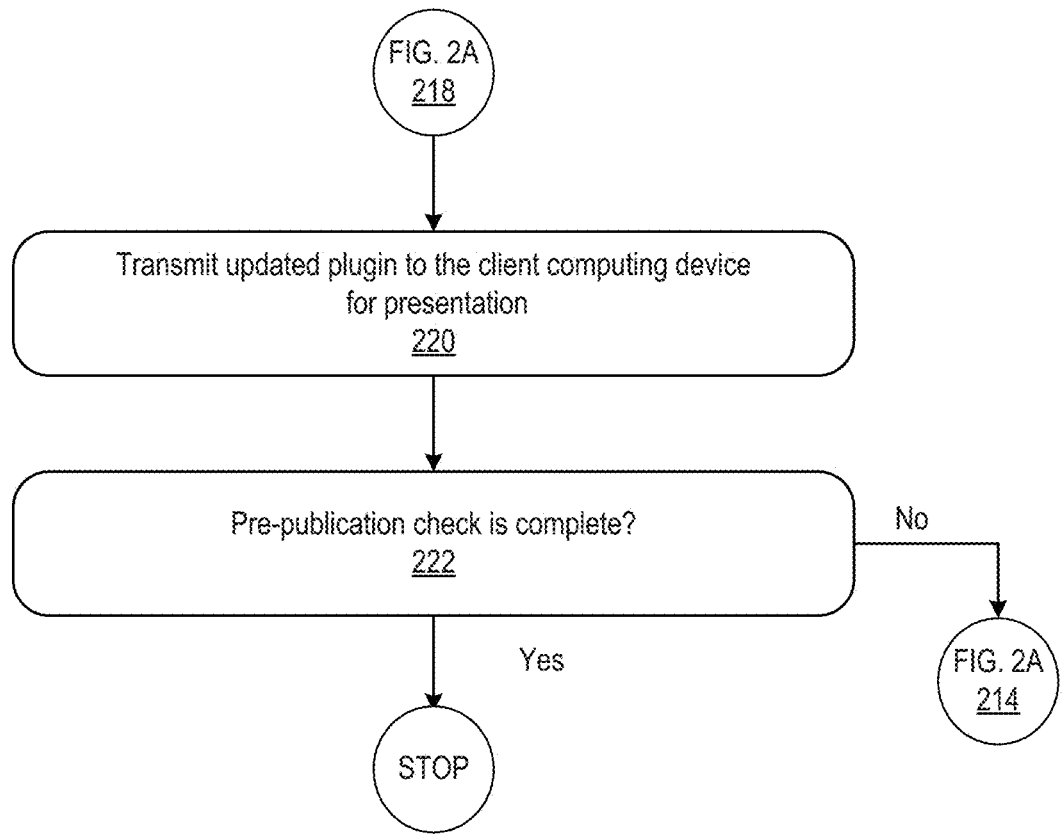

FIGS. 2A-B is a flowchart of a process 200 for generating and presenting information in a CMS plugin for a website owner. The process 200 can be performed as part of a pre-publication check of a webpage before the webpage is published. The process 200 can also be performed as part of a check on any content in a webpage before or after the webpage is published.

The process 200 can be performed by the web analysis server system 102. One or more blocks of the process 200 may also be performed by one or more web analysis services 108A-N, which can be part of the web analysis server system 102. One or more of the services 108A-N can also be provided by third party providers that are in communication with the web analysis server system 102. The process 200 can also be performed by one or more other computing systems, devices, computers, networks, cloud-based systems, and/or cloud-based services. For illustrative purposes, the process 200 is described from the perspective of a computer system.

Referring to the process 200 in FIGS. 2A-B, the computer system can provide instructions to a client computing device to present a rendered version of the webpage concurrently with a plugin (block 202). The rendered webpage and plugin can be presented in a webpage editing tool in a web browser of the client computing device, as described in reference to FIG. 1A. Therefore, the website owner can review, edit, and/or create content in the rendered version of the webpage using tools presented in the webpage editing tool. The website owner can also view potential issues and/or accidental errors in the plugin at the same time. The potential issues and/or accidental errors can be identified by one or more services during the pre-publication content check described herein.

To render the webpage, the computer system can locally execute and interpret code to render the webpage. The code can be requested and received from one or more web servers 112A-N that host the code to render webpages of websites. The webpage can be rendered in block 202 as if the webpage is being presented at a device of an end user, although the rendering can also be performed by a "headless" web browser that does not actually present content on a display device.

In block 204, the computer system can receive an indication of user input from the client computing device. This user input can be used by the computer system to determine whether to perform a content check on the webpage. Thus, the user input can be a trigger to perform the content check on the webpage.

The user input can be selection of one or more options to edit content in the webpage (block 206). The website owner can directly edit the content as it appears rendered in the web browser at the client computing device. The website owner can also select one or more options presented in the webpage editing tool to modify the webpage, create content, and/or delete content.

The user input can also be selection of an option (e.g., button) to publish the webpage (block 208). The option to publish can be presented in the plugin. The option to publish can also be presented in the webpage editing tool concurrently with one or more other selectable options for editing the webpage.

The user input may also be selection of an option to run a pre-publication check on the webpage (block 210). The option to run the pre-publication check can be presented in the plugin. This option can also be presented in the webpage editing tool concurrently with the other selectable options for publishing the webpage and editing the webpage.

Once an indication of user input is received (blocks 204-210), the computer system can perform the pre-publication check on the webpage in block 212. As described herein, the content of the webpage that is rendered and presented at the client computing device (block 202) can be packaged and provided to the computer system to perform the pre-publication check. The packaged webpage content can include HTML, CSS, JavaScript, images, and other elements that comprise the webpage.

As described throughout, the packaged webpage content can be delivered to each web analysis service that is selected for performing content checks for the particular website owner's website. The services can be selected by the website owner. The services can also be selected based on a subscription that the website owner has for the web analysis services provided by the computer system. For example, if the website owner has a subscription that only includes accessibility and misspelling services, then during the pre-publication check of block 212, only the accessibility and misspelling services will be executed.

Moreover, the checks can be performed by the web analysis services and the computer system can poll the services (e.g., continuously, at predetermined time intervals) for updates on the checks. For example, the computer system can poll the services to determine if each service completed its respective content check. The computer system can receive status information/updates from the services. The computer system can also receive results from the services as the results are generated. Therefore, the results can be outputted in the plugin in real-time to provide the website owner with dynamic and real-time review of their webpage before publishing the webpage. This can reduce an amount of time needed to review the webpage and fix any potential issues or accidental errors before publishing.

The computer system can populate portions of the plugin with the results from the pre-publication check as the services perform their respective assessments (block 214). As described above, while each service performs its respective check, it can provide the computer system with status information as well as results that have been generated. The results can be outputted in the plugin as they are generated and received at the computer system to provide the website owner with a real-time assessment and review of their webpage.

Each service that runs an assessment on the particular webpage can be assigned at least one portion of the plugin. That service can then present their results and other associated information in the at least one portion of the plugin. As a result, the plugin framework can maintain a consistent format, ranking, and styling of content check results for improved user friendliness.

Accordingly, the computer system can optionally determine access rights to information about the webpage in block 216. Determining access rights can include identifying services that are included in the website owner's subscription for web analysis services that are provided by the computer system. The computer system can therefore determine which services can be granted rights to provide information for the plugin and populate their respective portions of the plugin with results or other relevant information. Therefore, in the process 200 described herein, the computer system can poll (e.g., transmit messages and/or requests) each of the services having the access rights and notify those services of which portions of the plugin they can populate with content check results and other relevant information. The computer system can also provide a link to the webpage content and client information to each of the services having the access rights. The services having the access rights can then perform their respective content checks using the webpage content provided by the link. The services can use the client information to populate the respective portions of the plugin with results and other relevant information determined by performing the content checks.

The computer system can also optionally populate the portions of the plugin based on the access rights in block 218. Therefore, the portions of the plugin can be consistently populated and formatted with the results and other relevant information from the services that have the access rights. As described herein, the services that have access rights can also populate their respective portions of the plugin in real-time, as they generate results and other relevant information during the content checks.

Moreover, the computer system can rank the populated portions of the plugin (block 219). Ranking can be based on user preferences. For example, the website owner can designate that compliance with accessibility standards is most important before publishing the webpage. Therefore, results of an accessibility check can be presented first in the plugin. Ranking can also be based on what results the computer system determines are most important for the website owner, or most beneficial to help the website owner quickly publish their webpage with high quality.

Next, the computer system can transmit the updated plugin to the client computing device for presentation (block 220). Every time that the services are polled for status updates on their respective content checks, the services can provide results and other relevant information back to the computer system. The computer system can then update the portions of the plugin with the results and other relevant information as they are received from the services. After each time that the plugin is updated, the computer system can transmit the updated plugin to the client computing device for presentation in block 220. As a result, the website owner can view results from the pre-publication content check in real-time, as they are generated by the services.

The computer system can determine whether the pre-publication check is complete (block 222). For example, the computer system can poll the services for status updates on their respective content checks. The services can be polled by the computer system at one or more predetermined time intervals (e.g., every few seconds, every 2 minutes, etc.). The services can also be continuously polled by the computer system. In some implementations, each of the services can automatically transmit status updates, results, and other relevant information to the computer system at predetermined time intervals, whenever a respective content check is complete, and/or whenever the respective content check hits a predetermined status time point and/or update in the respective content check.

If the check is complete, then the computer system process 200 can stop. If the check is not complete, the computer system can return to block 214 and repeat 216-220 until the pre-publication check is complete.

FIG. 3 is a conceptual diagram for executing a pre-publication content check. The content check described in FIG. 3 can be performed before publishing the content. The content check can also be performed on content that has already been published. The content check described in FIG. 3 can be performed by the web analysis server system 102. One or more aspects of the content check can also be performed by one or more other components described throughout this disclosure that are part or separate from the web analysis server system 102, such as the CMS server 126.

Content can be uploaded (310) to the CMS server 126. The content can be provided by a client computing device. The content can be a packaged file (e.g., archive, zip) of HTML, CSS, JavaScript, etc. and relative links between these elements/files. In some implementations, the content may be only HTML. Moreover, in some implementations, the content can be uploaded directly from the client computing device to the web analysis server system 102 using an API.

The website owner may be reviewing a particular webpage of their website before publishing the webpage. Before publishing the webpage, the website owner can select an option presented at the client computing device to run a pre-publication check on the webpage. By selecting this option, the client computing device can package the webpage and its associated content that is presented at the client computing device and transmit this packaged information to the CMS server 126, or the web analysis server system 102.

The CMS server 126 can return a content ID (312). Returning the content ID can be an indication that the pre-publication content check has begun. Consecutive uploads of the same content (e.g., within a predetermined period of time, such as a past 24 hours) can result in a same content ID being returned. In such scenarios, the pre-publication content check may be executed once. After all, if the same content has been uploaded (e.g., sent to the web analysis server system 102 to execute a pre-publication check) more than once, then the content has not been changed, modified, or otherwise altered. Thus, the pre-publication check may only be executed when changes are made to the content.

The content can be passed from the CMS server 126 to a content pre-processing engine 302 for ingestion and pre-processing (314). The pre-processing engine 302 can be part of the web analysis server system 102. Pre-processing the content can include validating the content. A validation process can be performed before the packaged content is unpackaged (e.g., unzipped). As part of the validation process, the engine 302 can check the content for valid formats of HTML, CSS, and/or JavaScript files for the content. Invalid formats can be discarded. As part of pre-processing the content, the engine 302 can also discard any of the content that may not be necessary or useful for executing any of the pre-publication content checks described herein. For example, image data and video plugins may be discarded because pre-publication content checks may not be performed on this type of content. One or more checks can be performed on the image data and the video plugins in a context different than the pre-publication context (e.g., a relevant user can run accessibility checks on an entire website using another service provided by the web analysis server system 102. The accessibility checks can be performed on all elements in the website, including image data and video plugins. Results from these accessibility checks can be presented within a GUI provided by the web analysis server system 102 but may not necessarily be presented in a CMS plugin as part of a pre-publication content check on a particular webpage).

Pre-processing the content can further include expanding the packaged content and internally rendering the content. Thus, the web analysis server system 102 can render the content using the packaged information as if the content was being presented in a web browser of a device of an end user. Rendering the content as it would appear to an end user can be beneficial to allow the web analysis services 108A-N to perform their respective content checks. The web analysis server system 102 can render the content using an object model, which can be generated using any of the techniques described in Generating Lossless Static Object Models of Dynamic Webpages, Application No. 63/279,063 (Object Model Patent Application), herein incorporated by reference in its entirety.

Accordingly, one or more web analysis services 108A-N of the content pre-processing engine 302 (or the web analysis server system 102, more generally) can execute content checks on the pre-processed content and generate results (316). The services 108A-N that have access rights to the particular website owner's content (e.g., the services 108A-N are part of the website owner's subscription for web analysis services provided by the web analysis server system 102) can receive the pre-processed content and analyze it to generate content check results. The services 108A-N can include readability, spelling, SEO, policy, accessibility, and one or more other services that can provide valuable insight about potential issues and accidental errors in the webpage content before publishing. Moreover, some of the functionality (e.g., web analysis services) available by the web analysis server system 102 for a crawled website may not be available in the pre-publication context. Since, as shown and described herein, the web analysis server system 102 receives content for a webpage, the webpage is detached from a website, such as a crawled website. As a result, the web analysis server system 102 is performing pre-publication checks on only the webpage and not other webpages or a website that the particular webpage may be associated with. Therefore, since only the particular webpage is received and analyzed, the engine 302 may not perform checks such as checking for broken links or determining an overall quality score for the website. One or more other checks that require continuity across multiple webpages and/or a website may not be performed by the engine 302.

Results from the assessments performed by the services 108A-N can be stored in a data store 106 and internally identified by the content ID that was returned in 312. The content pre-processing engine 302 can also generate processing status of the services 108A-N (318) to be stored in the data store 106. The processing status can indicate whether each respective service 108A-N has completed its assessment of the content. When each service 108A-N is done checking the webpage content, their individual status can be updated internally in the data store 106 in association with the content ID.

The CMS server 126 can receive a request from the client computing device to get results for the webpage content (320). The request can be made by the client computing device using an API endpoint. The request can also be automatically queried from the CMS server 126. The CMS server 126 can use the content ID returned in 312 to identify the results and processing status from the data store 106. Thus, the CMS server 126 can retrieve the results and processing status from the data store 106 (322).

The CMS server 126 can return the results and processing status (324) that were retrieved from the data store 106 and associated with the particular content ID. The results and processing status can be returned to the client computing device, to be presented to the website owner in a CMS plugin at a GUI display. The returned results and processing status can include a summary of any results that are currently ready at a time of the request (e.g., when the request was received and/or made at the CMS server 126). The returned results and processing status can also include information about whether the content check of a respective service 108A-N has completed.

Depending on the state of the processing, more detailed results for the respective service 108A-N can be requested, but may not be returned to be presented in the plugin until the respective part of that service's processing has yielded results (e.g., been completed). Therefore, as described herein, results and processing status can be returned to the client computing device in 324 and presented in the plugin at the client computing device in real-time, even if the pre-publication checking process is not yet complete for the webpage content.

As any of the services 108A-N complete their respective checks, or parts/portions of their checks, their results can populate the plugin. The plugin can be continuously updated as more checks are completed or parts/portions of the checks are completed. As a result, the website owner can view results in real-time, and address the results quickly and efficiently before publishing the webpage.

Figure 4A:
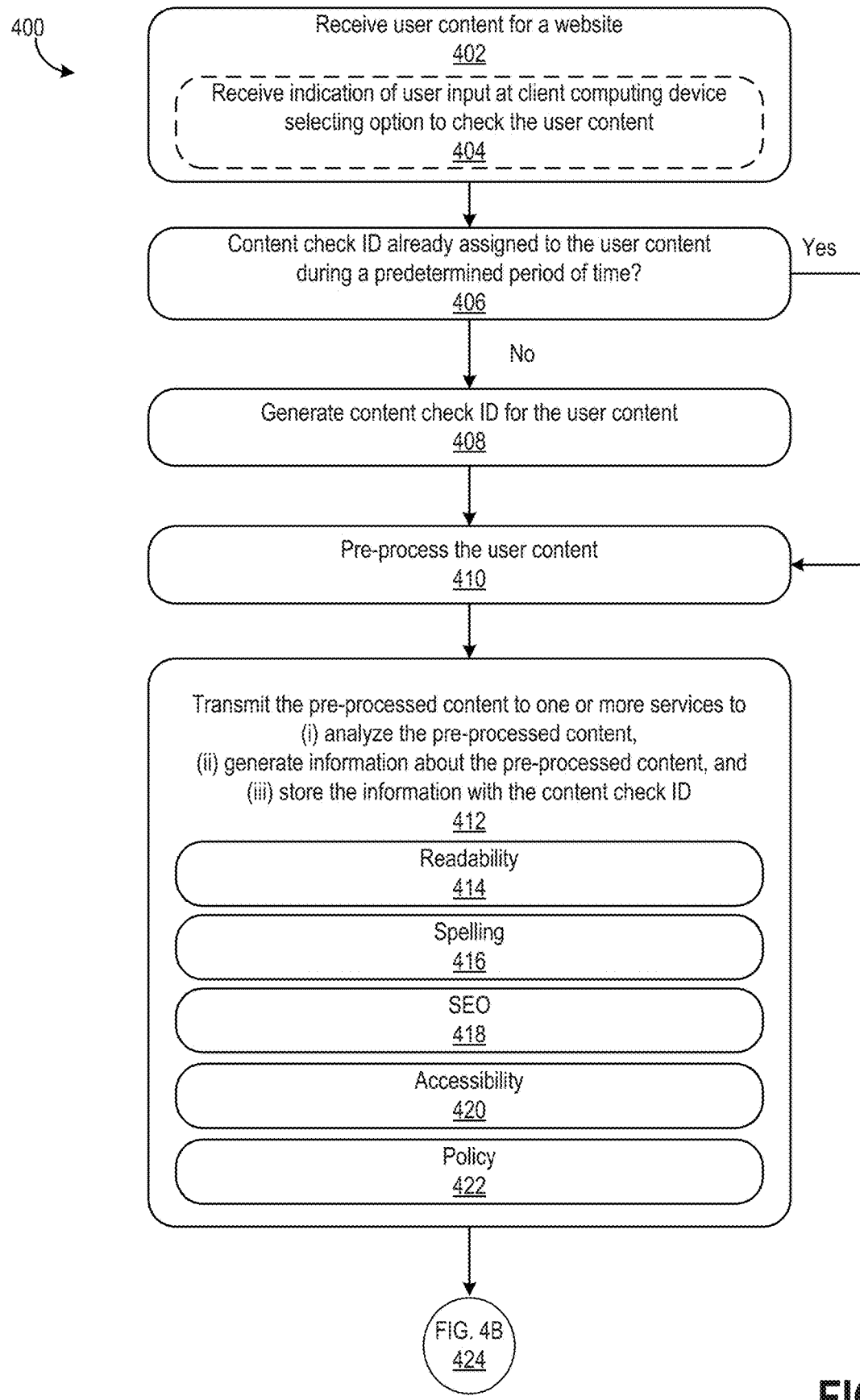
Figure 4C:
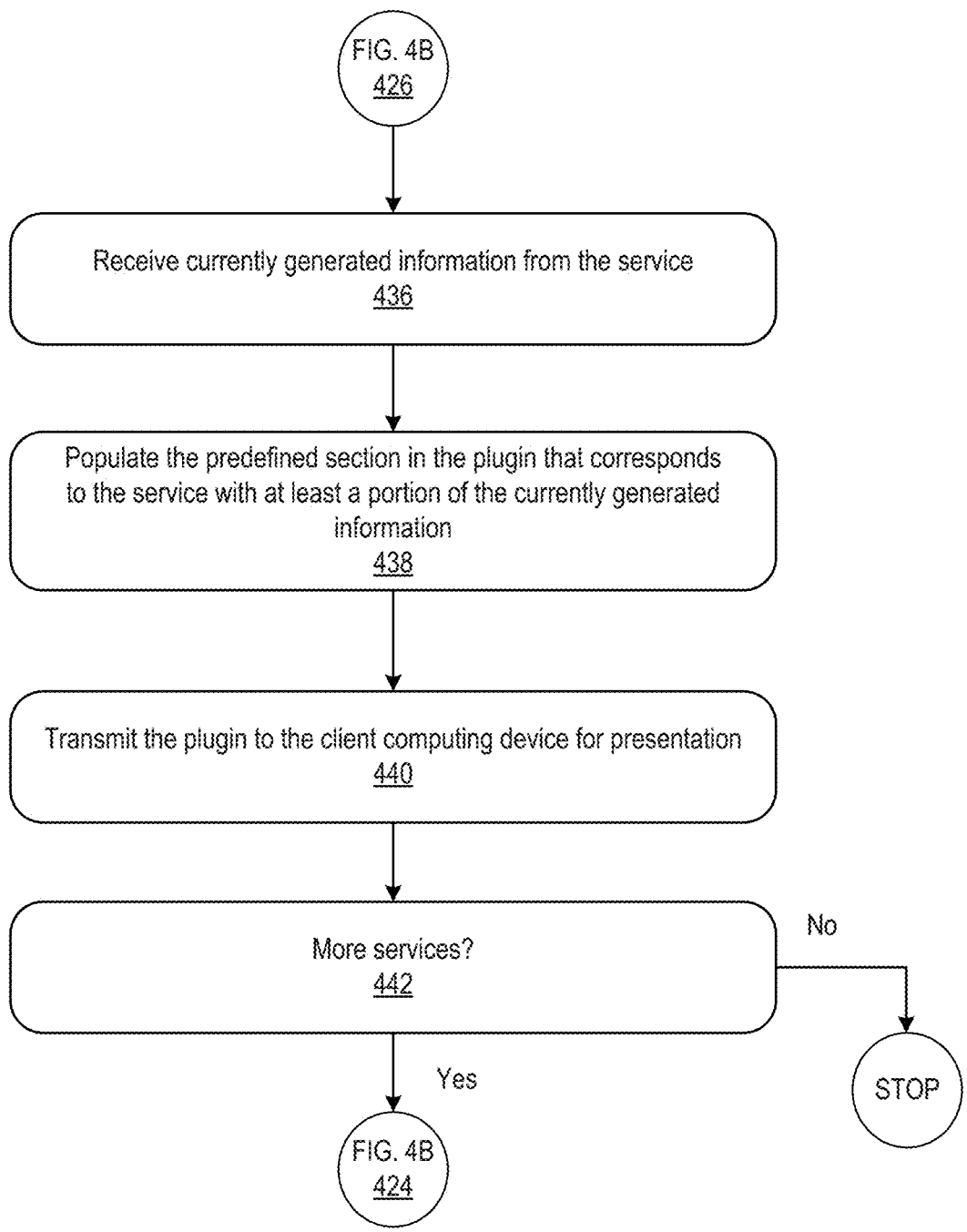

FIGS. 4A-C is a flowchart of a process 400 for executing a pre-publication content check. The process 400 is similar to the pre-publication content check described in FIG. 3. The process 400 can be performed by the web analysis server system 102. One or more blocks of the process 400 may also be performed by one or more web analysis services 108A-N. The process 400 can also be performed by one or more other computing systems, devices, computers, networks, cloud-based systems, and/or cloud-based services. For illustrative purposes, the process 400 is described from the perspective of a computer system.

Referring to the process 400 in FIGS. 4A-C, the computer system can receive user content for a website in block 402. The user content can be a webpage that is presented in a webpage editing tool in a web browser of a website owner's client computing device (e.g., refer to the webpage content 122 in FIG. 1A). The user content can include the webpage and all its underlying content. Therefore, the user content can include webpage DOM(s), HTML, CSS, Javascript, image files, and other content that can be uploaded and displayed as the webpage content. The user content can be packaged by the computer system or a CMS server so that the user content can be available to one or more web analysis services for content checking.

Instead of scraping a website, the webpage content can be pulled from within the web browser of the client computing device. For example, the computer system can identify the webpage content presented in an iFrame in the webpage editing tool. The computer system can also receive information about the particular webpage presented in the webpage editing tool from the CMS server.

Optionally, the computer system can receive an indication of user input at the client computing device selecting an option to check the user content (block 404). For example, the website owner may load a particular webpage (e.g., the user content) in the webpage editing tool. The website owner can review the webpage and determine whether they want to make any changes to the webpage. If they are satisfied with the webpage, they can select an option presented in the webpage editing tool to publish the webpage presented therein. Selecting the publish option can trigger the computer system to begin the process 400 described herein. In some implementations, the website owner can select an option presented in the webpage editing tool to perform a content check before publishing the webpage (e.g., a pre-publish check). Selecting this option can also trigger the process 400 to be executed.

The computer system can determine whether a content check ID (e.g., the content ID in FIG. 3) has already been assigned to the user content during a predetermined period of time (block 406). The predetermined period of time can be a past 24 hours. One or more other periods of time can be determined and used by the computer system in block 406. When the user content is received for the first time in block 402, the user content can be assigned a content check ID. The content check ID can associate the user content (e.g., a particular webpage loaded in an iFrame in the webpage editing tool) with the website owner or other relevant user. This association can be maintained by the computer system (e.g., stored in the data store 106) for the predetermined period of time. After the predetermined period of time ends, this association can be deleted/erased from the computer system and/or data store. The content check ID can be used by the computer system to poll the web analysis services for their progress on completing the pre-publishing content check for the associated user content.

Therefore, so long as the user content received in block 402 is associated with a content check ID that was assigned within the predetermined period of time, the user content is the same content that was received previously during the predetermined period of time and the computer system can proceed to block 410, discussed further below. The same content check ID can be used to efficiently and quickly poll the web analysis services for results of their respective pre-publishing content checks for the associated user content.

If the content check ID has not already been assigned to the user content, then the computer system can proceed to block 408. In block 408, the computer system can generate a content check ID for the user content. After all, the user content has not been previously received during the predetermined period of time. This can be a first time, within the predetermined period of time, that the user content is received and thus ready to be checked before publishing. Once the content check ID is generated in block 408, the computer system can proceed to block 410.

In block 410, the computer system can pre-process the user content. As mentioned above, the user content can be packaged. For example, the user content can be packaged in an archive and/or zip file. In some implementations, the user content may be raw HTML of the webpage that is presented in the webpage editing tool. Pre-processing the user content can include validating the user content. Pre-processing the user content can also include identifying information that is part of the user content or otherwise packaged. Pre-processing the user content can be beneficial to then make the content digestible by other components, such as the web analysis services. The pre-processed content can also be used by a crawler of the computer system to render the webpage.

The computer system can transmit the pre-processed content to one or more web analysis services to (i) analyze the pre-processed content, (ii) generate information about the pre-processed content, and (iii) store the information with the content check ID (block 412). In other words, the web analysis services can check the content as part of the pre-publishing content check. Each of the web analysis services can analyze the pre-processed content at different times. Moreover, each of the web analysis services can check different aspects, elements, and/or files of the pre-processed content. As the services check the pre-processed content, they can each store their respective results in the data store in association with the content check ID. Thus, results from all different web analysis services can be stored in a centralized location, which can provide for quick and efficient retrieval by the computer system when populating a CMS plugin with relevant information to be presented in the webpage editing tool at the client computing device.

The one or more web analysis services can include readability (block 414), spelling (block 416), SEO (block 418), accessibility (block 420), and policy (block 422). One or more other services may also be used in performing the pre-publishing content check described throughout this disclosure. Moreover, as described herein, a portion or subset of the web analysis services may be selected to run their respective checks as part of the pre-publishing content check. The portion of web analysis services can be selected based on a subscription of the website owner. For example, the website owner can purchase one or more of the services that are provided by the computer system. Only the purchased services may be selected to run their respective checks as part of the pre-publishing content check. As another example, the portion of web analysis services can be selected by the website owner, even if the website owner has a subscription that may include additional, other services. Therefore, the website owner may decide that they only want some of the web analysis services to be run as part of the pre-publishing content check. The website owner may select the services that provide the website owner, in their opinion, the most value at the time of publishing.

Figures 1, 8A:
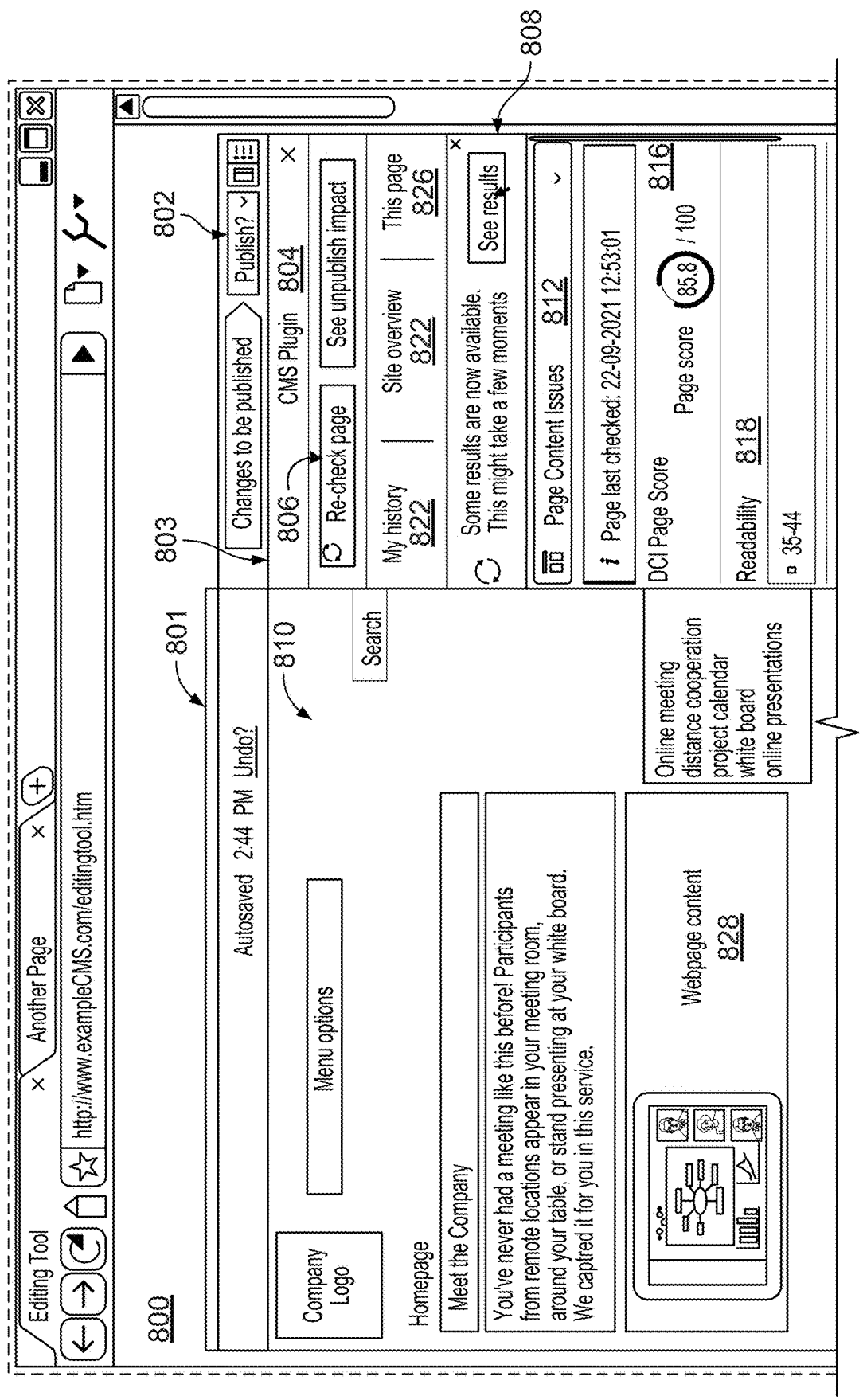
Figures 2, 8B:
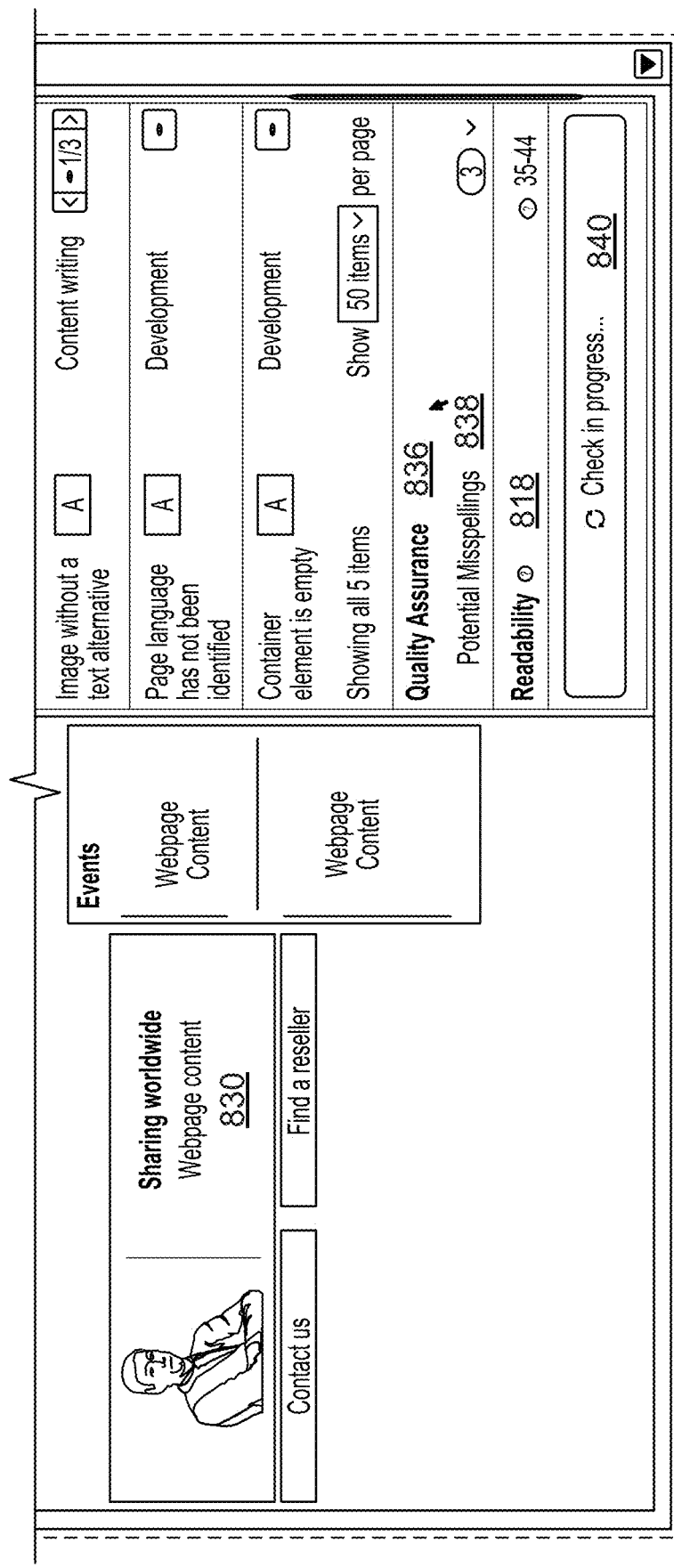
Figure 8C:
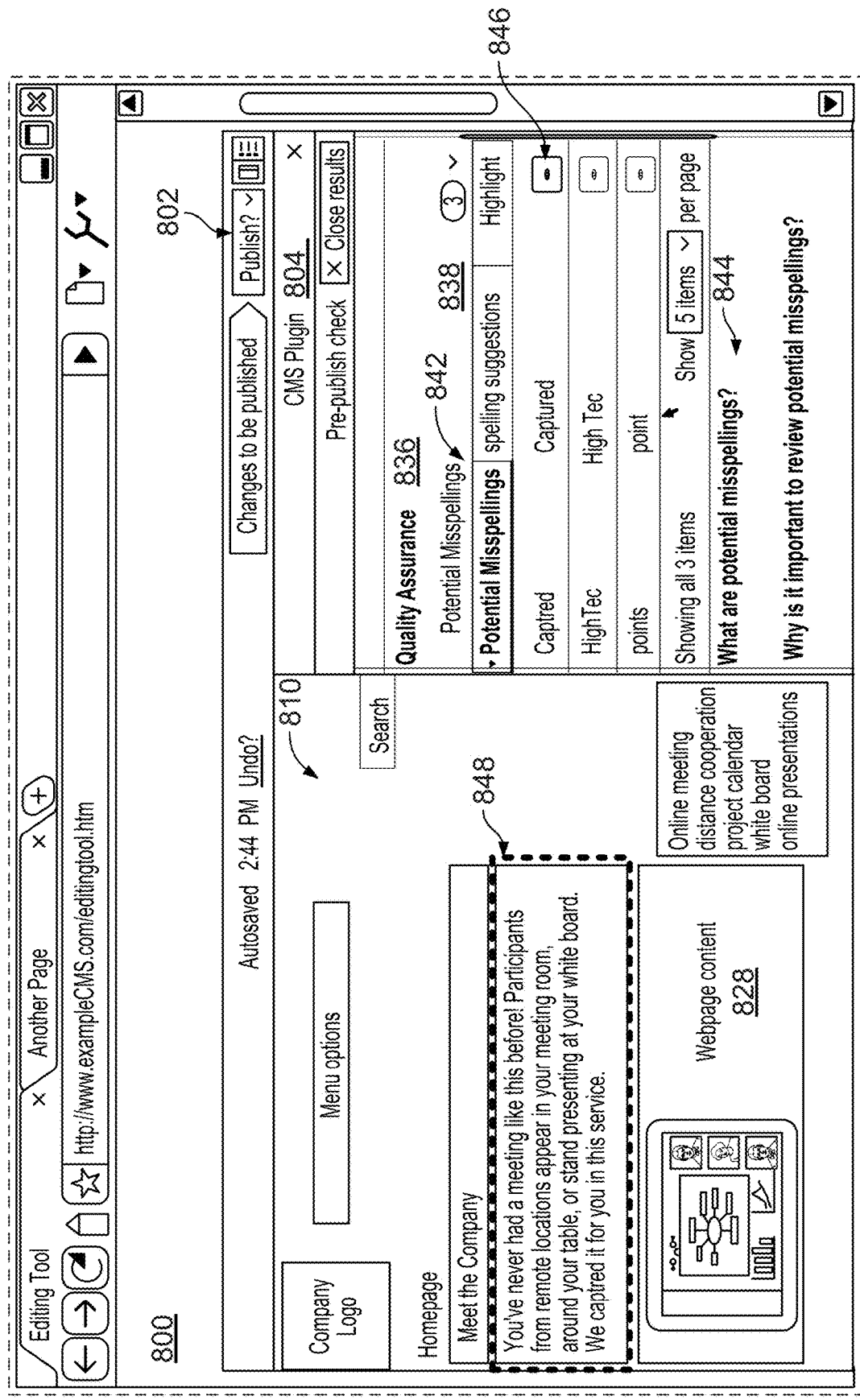
FIG. 8C is an example GUI for highlighting user-selected results from the pre-publication check of FIGS. 8A-1 and 8A-2.

Next, the computer system can poll each service for the information using the content check ID (block 424). The computer system can poll each service at one or more times to determine a status of the check (e.g., the analysis of the pre-processed content) being performed by the service. The computer system can determine whether the service has completed analyzing the pre-processed content and/or whether the service has generated any information (e.g., results) about the pre-processed content while analyzing the pre-processed content. The computer system can therefore poll the services for generated information that can be presented in the plugin in real-time. The plugin can be continuously updated to include information as it is generated by one or more of the web analysis services. Therefore, the plugin can reflect information about the pre-publishing content check of the user content while the check is being executed and while the website owner is viewing the user content in the webpage editing tool. Refer to FIGS. 8A-C for additional discussion about updating the plugin as the pre-publishing content check is being performed by the one or more web analysis services.

The computer system can determine, based on the information, whether analyzing the pre-processed content is complete at a service (block 426). For example, each service can generate a processing status notification upon being polled by the computer system. In some implementations, each service can automatically generate the processing status notification whenever the service completes one or more steps during the service's check (e.g., analysis) of the pre-processed content. In block 426, the computer system can determine whether the processing status notification indicates that analyzing the pre-processed content is complete. In other words, the service has completed running its check and analyzing the user content. The service might have completed identifying any potential issues or accidental errors that appear in the user content.

If the service has not finished analyzing the content, the computer system can proceed to block 436, described below. If the service has finished analyzing the content, the computer system can retrieve the information for that service (block 428). When the service completes analyzing the pre-processed content, the service can package any generated information (e.g., results) into a file that can be stored in the data store in association with the content check ID. The packaged file can also be ingested by the computer system, and/or by the CMS server, to then be presented in the CMS plugin, as described below. In block 428, the computer system can use the content check ID to retrieve the packaged file in the data store. In some implementations, the computer system can receive the packaged file directly from the service that completed its analysis of the user content. For example, if the computer system polls the service in block 424 and at the time of polling, the service returns an indication that analysis of the user content is complete, then the service can also transmit the packaged file to the computer system. On the other hand, if, at the time of polling, the service returns an indication that analysis of the user content is not complete but then the service completes the analysis after the time of polling, the service can transmit the packaged file to the data store for storage. The next time the computer system polls the service and receives an indication that the analysis is complete, the computer system can use the content check ID to retrieve the packaged file from the data store.

Once the computer system receives the packaged file from the service (or from the data store), the computer system can populate a predefined section in a plugin that corresponds to that service with at least a portion of the retrieved information (block 430). In some implementations, as described herein the CMS server can populate the predefined section in the plugin with at least a portion of the retrieved information. In yet some implementations, the service can populate the predefined section in the plugin with at least a portion of the retrieved information.

As described herein, each service can be allotted one or more sections in the plugin to present their generated information from analysis of the pre-processed content. The service can be allotted the same one or more sections in the plugin every time that the plugin is presented in the webpage editing tool for the particular website owner. Therefore, the plugin can utilize a framework that maintains consistent formatting, styling, and ranking of pre-publishing content check information for the particular website owner.

Additionally, not all the information that is received in the packaged file may be presented in the predefined section in the plugin. Some of that information can be cached for future retrieval and presentation in the plugin. For example, a link can be generated and provided in the predefined section in the plugin. The link can be directed to the cached information so that when the link is selected by the website owner in the outputted plugin, the cached information can be retrieved, the predefined section in the plugin can be updated to present the cached information, and this updated plugin can be presented in the webpage editing tool at the client computing device.

Once the predefined section in the plugin is populated with at least a portion of the information from the service, the computer system can transmit the plugin to the client computing device for presentation (block 432). As described herein, the plugin can be presented in the webpage editing tool in the web browser of the client computing device. The plugin can be presented concurrently with the user content that is editable in the webpage editing tool. The plugin can also be dynamically updated to reflect real-time information that is generated by the one or more services as they analyze the pre-processed content. As a result, the website owner can view potential issues or accidental errors in the user content within the plugin as those issues and/or errors are identified by the services. This dynamic presentation can assist the website owner to efficiently use their time in reviewing, editing, correcting, and finalizing their webpage before publishing. This dynamic presentation can also assist the website owner to prioritize review of the identified issues and/or errors without overwhelming the website owner with too many fixes that can be made before publishing. Refer to FIGS. 8A-C for additional discussion about presenting the plugin at the client computing device.

The computer system can then determine whether there are more services that are analyzing the pre-processed content (block 434). If there are more services, the computer system can return to block 426 and repeat blocks 426-432 for each remaining service that is running. As a result, the plugin can be continuously updated in real-time to reflect information that is generated by each of the services as the services execute their respective analyses of the pre-processed content. If there are no more services, then the process 400 can stop.

Referring back to block 426, if the service has not completed analyzing the pre-processed content, the computer system can proceed to block 436. In block 436, the computer system can receive currently generated information from the service. Although the service may not have finished analyzing the entire user content, the service may still identify some potential issues and/or accidental errors in portions of the user content that have been analyzed. These issues and/or errors can be transmitted to the computer system in block 436. In some implementations, this currently generated information can be stored, by the service, in the data store in association with the content check ID. The computer system can then retrieve the currently generated information from the data store in block 436. In some implementations, the service can transmit the currently generated information directly to the computer system.

As an example, the service can be configured to check the user content for misspellings. The service may still be analyzing the user content when the computer system polls the service for a processing status (block 424). Although the service has not completed review of all the user content (block 426), the service may transmit, to the computer system, information indicating any misspellings that the service has already identified. Every time that the service is polled but has not yet completed review of all the user content, the service may transmit the most recent information indicating misspellings to the computer system.

The computer system can then populate the predefined section in the plugin that corresponds to the service with at least a portion of the currently generated information (block 438). Therefore, as described above, the plugin can be dynamically updated to reflect real-time results from the pre-publishing content check being performed by the computer system. In the example above of the misspellings service, the section in the plugin that corresponds to this service can be populated with any additional misspellings that are identified at the time of polling. Misspellings that were identified at previous times of polling may remain in the section in the plugin while the most recent identified misspellings are being added to the section in the plugin.

The computer system can transmit the plugin to the client computing device for presentation (block 440). Therefore, the most updated version of the plugin can be presented in the webpage editing tool at the client computing device, as described throughout this disclosure.

In block 442, the computer system can determine whether there are more services that are still analyzing the pre-processed content. If there are more services, then the computer system can return to block 424 and repeat blocks 424-440 for each remaining service that is analyzing the pre-processed content. If there are no more services, then the process 400 can stop.

Figure 5:
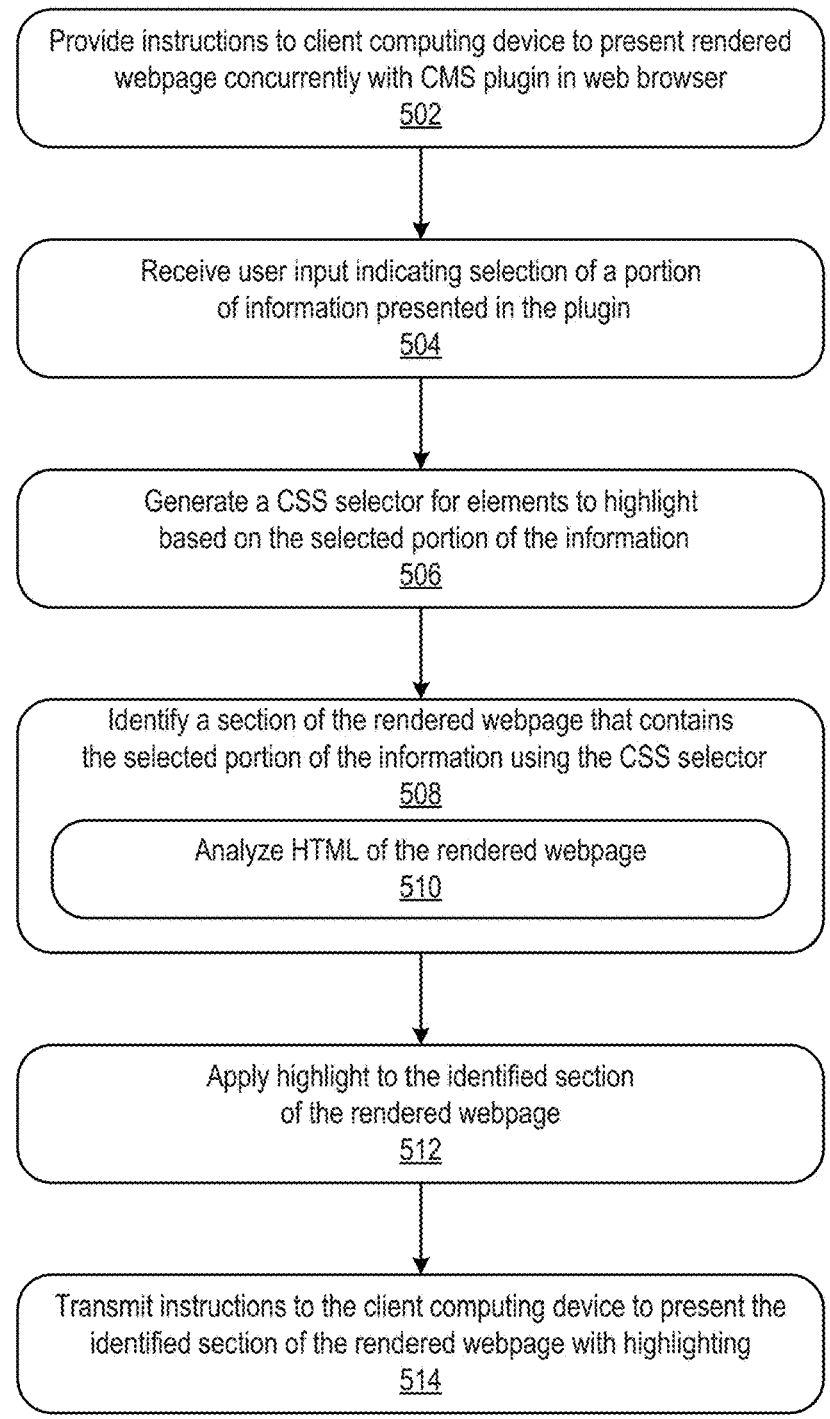
FIG. 5 is a flowchart of a process for highlighting issues in an editable webpage based on execution of the pre-publication content check.

FIG. 5 is a flowchart of a process 500 for highlighting issues in an editable webpage based on execution of the pre-publication content check. Highlighting the issues (or sections of the webpage containing the issue(s)) can be beneficial to quickly and easily direct the website owner's attention to a particular element in the webpage that contains the issue or error. The website owner can therefore view information about the issue or error in the plugin while also viewing where in the webpage the issue or error is identified. The website owner can quickly correct the issue or error directly in the webpage, thereby speeding up a process to review, edit, and finalize webpages before or after publishing.

The process 500 can be performed once all the web analysis services 108A-N complete their respective analyses of the webpage content described above in FIGS. 4A-C. The process 500 can be performed once the plugin has been updated to include all the results (e.g., generated information) from the services 108A-N. Moreover, the process 500 can be performed on both pre-published webpages as well as published webpages.

The process 500 can be performed by the web analysis server system 102. In some implementations, highlighting of elements containing potential issues and/or accidental errors can occur natively within the CMS server 126. For example instructions for highlighting the elements of the webpage content can be transmitted to the CMS server 126 and executed by the CMS server 126. The process 500 can also be performed by one or more other computing systems, devices, computers, networks, cloud-based systems, and/or cloud-based services. For illustrative purposes, the process 500 is described from the perspective of a computer system.

Referring to the process 500, the computer system can provide instructions to a client computing device to present a rendered webpage concurrently with a CMS plugin in a web browser (block 502). Refer to FIG. 1A and block 202 in the process 200 of FIGS. 2A-B for additional discussion about rendering the webpage concurrently with the plugin at the client computing device.

In block 504, the computer system can receive user input indicating selection of a portion of information presented in the plugin. The plugin can be populated with results from each of the web analysis services that analyzed the rendered webpage. The results can indicate one or more potential issues and/or accidental errors that were identified by each of the web analysis services. The plugin can also include one or more selectable options (e.g., buttons) for addressing the potential issues and/or accidental errors presented therein. For example, as shown in the FIGS. 8A-C, a button with an eye icon can be presented next to each potential issue or accidental error that is presented in the plugin. The website owner can select this button in order to view the associated issue or error directly in the rendered webpage. Therefore, in block 504, the computer system can receive user input indicating selection of the button with the eye icon. In some implementations, the user input can also indicate selection of a particular issue or error. Thus, the website owner can click on a link that is presented for the particular issue or error in the plugin. The website owner can also directly click on the particular issue or error in the plugin.

The computer system can generate a CSS selector for identifying element(s) in the webpage to be highlighted based on the selected portion of the information (block 506). In some implementations, the computer system can also generate an offset. The offset can be used to indicate, to the computer system, how many words and/or characters from the beginning of an element exist before highlighting should begin as well as end. The CSS selector can be used to identify exactly where in HTML of the rendered webpage the particular issue or error can be found, such as a <div> element. For example, if the website owner selects the button with the eye icon for a misspelling issue, the computer system can generate a CSS selector that can be used to identify where in the HTML of the rendered webpage, the misspellings occur, such as a main body of text. If, on the other hand, the website owner selects the eye icon button for a policy violation issue, then the computer system can generate a CSS selector that can be used to identify where in the HTML of the rendered webpage the policy violation may be found, such as in a footer of the webpage.

The computer system can identify a section of the rendered webpage that contains the selected portion of the information using the CSS selector (block 508). For example, the computer system can analyze HTML of the rendered webpage in block 510 to identify which elements in the HTML should be highlighted. The CSS selector can be applied to the HTML to identify which element corresponds to the selected portion of the information.

In block 512, the computer system can apply highlight to the identified section of the rendered webpage. A function such as onHighlight is used, which takes one parameter, a callback, which can be called when trying to highlight an issue (e.g., the selected portion of the information in the plugin). The callback can receive one parameter, which may be structured as the following (offset being optional): {highlights: [{selector: " ", offset: {start:, length: }}, {selector: " "}} . . . ]}.

The identified section of the rendered webpage can be highlighted in a variety of ways. A content section in the webpage that includes the issue or error that the website owner selected in the plugin can be highlighted. For example, if a misspelling is located in a main body of text in the webpage, the entire main body of text can be surrounded in a box. The box can be in some indicia (e.g., color, pattern) that draws the website owner's attention to the main body of text. Highlighting can also be more granular. A particular issue or error that is selected by the website owner can be highlighted in the rendered webpage. For example, if a particular word is misspelt in the main body of text in the webpage, that particular word can be highlighted in some indicia (e.g., a color, such as yellow) and/or surrounded in a box in some indicia (e.g., color, pattern) that draws the website owner's attention to the particular word. One or more other highlighting techniques may also be used.

The computer system can then transmit instructions to the client computing device to present the identified section of the rendered webpage with highlighting (block 514). When the client computing device presents the identified section with highlighting, the plugin may also be presented concurrently with the rendered webpage in the webpage editing tool. As a result, the website owner can view the information about issues and/or errors in the plugin while also addressing the particular issue that has been highlighted in the rendered webpage. The website owner may view additional information about the particular highlighted issue in the plugin, which can guide the website owner to easily and quickly correct the highlighted issue directly in the rendered webpage.

Figure 6:
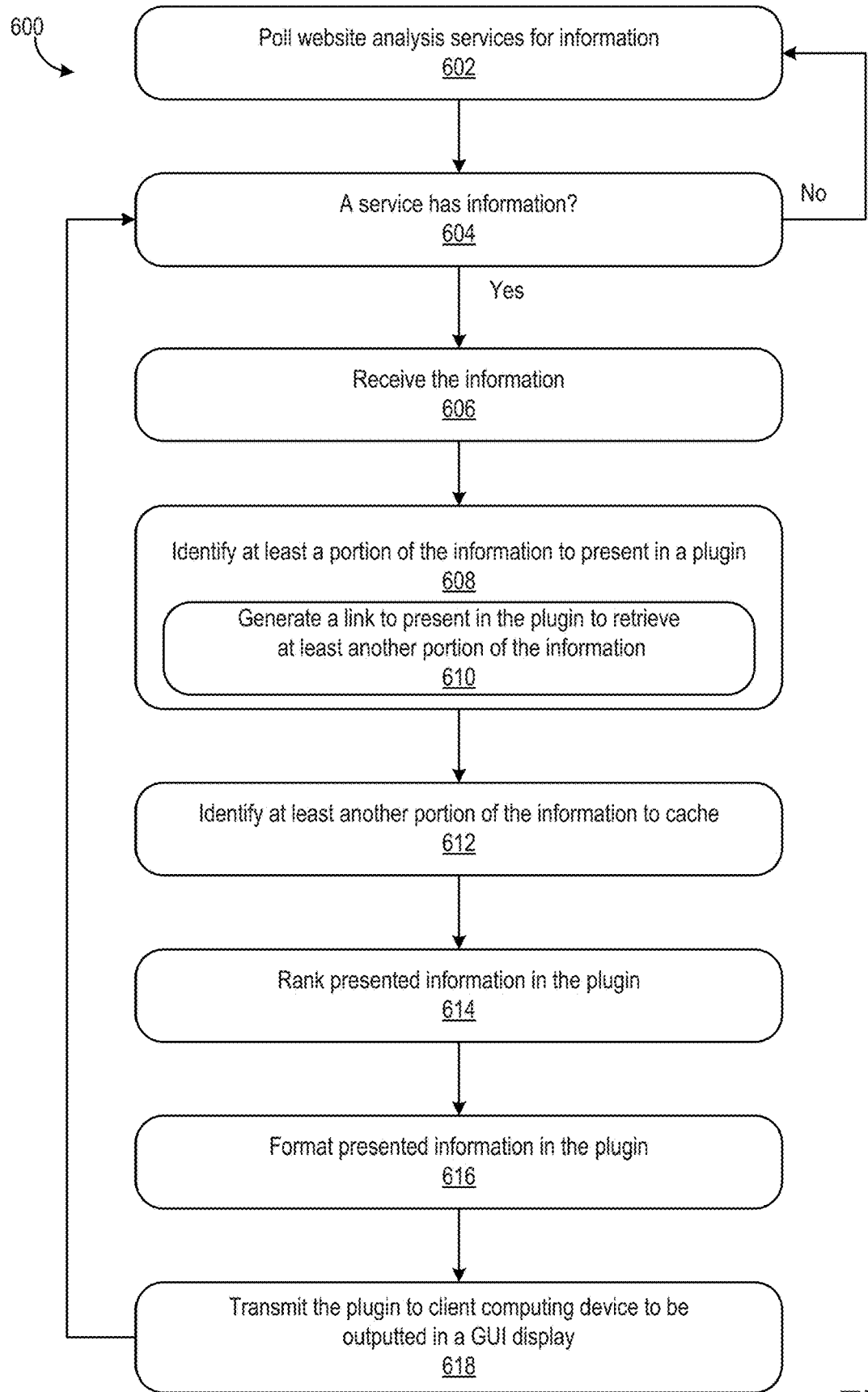
FIG. 6 is a flowchart of a process for determining a CMS plugin framework.

FIG. 6 is a flowchart of a process 600 for determining a CMS plugin framework. The process 600 can be performed to determine how to present results (e.g., information) for different web analysis services 108A-N within the plugin. The process 600 can be used to generate a framework in which every service that is used by a particular website owner can provide relevant information to present in a consistent manner, style, and formatting within the plugin. The framework described herein can provide for dynamic adaptation of the plugin for different website owners. After all, each website owner may subscribe to different web analysis services and/or prefer different web analysis services to be executed during a pre-publish content check. The framework described in the process 600 can provide for adapting the plugin to each website owner's particular needs, thereby making the plugin deployable and customizable for any website owner (or other relevant user/client), across any website.

The process 600 can be performed by the web analysis server system 102. One or more blocks of the process 600 may also be performed by one or more web analysis services 108A-N described throughout this disclosure. The process 600 can also be performed by one or more other computing systems, devices, computers, networks, cloud-based systems, and/or cloud-based services. For illustrative purposes, the process 600 is described from the perspective of a computer system.

Referring to the process 600 in FIG. 6, the computer system can poll website analysis services for information (block 602). As described previously, the website owner may select an option presented in a webpage editing tool at their client computing device to publish webpage content that is also presented in the webpage editing tool. The website owner may also select an option to run a pre-publication check on the webpage content. This user selection can trigger the computer system to begin the pre-publication check, which includes polling one or more web analysis services for information. In other words, the computer system transmits a message to each web analysis service in the website owner's subscription to services that prompts the service for (i) a status update on processing (e.g., analyzing) the webpage content and identifying potential issues and/or accidental errors and (ii) any information, or results, that have already been generated as a result of currently processing the webpage content.

The computer system can determine whether a service has information (block 604). The information can include a processing status and/or results from processing (e.g., analyzing) the webpage content. For example, the service can return an indication to the computer system that the processing status is incomplete (e.g., still processing all of the webpage content) but that the service has identified some accidental errors in the webpage content that has been processed up to the time of polling. As another example, the service can return an indication to the computer system that the processing status is incomplete and that no errors have been identified in the webpage content that has been processed up to the time of polling. As yet another example, the service can return an indication to the computer system that the processing status is complete and that one or more errors have been identified in the webpage (since the service began processing the webpage content and/or between a last time of polling and the current time of polling). The service can also return an indication to the computer system that the processing status is complete and that no errors have been identified in the webpage (since the service began processing the webpage content and/or between a last time of polling and the current time of polling). One or more other indications can be generated by the service and provided to the computer system when the service is polled for information.

If the service does not yet have information, the computer system can return to block 602. This can indicate that (i) the service has not yet completed processing the entire webpage content and/or (ii) the service has not yet identified any potential issues and/or accidental errors in what webpage content the service has processed since the time of a previous polling. The computer system can continue to poll the service until information, such as results, are generated by the service, regardless of whether the service has completed processing all of the webpage content.

If the service has information in block 604 (e.g., since the last time of polling, the service has identified issues and/or errors, regardless of whether the service has completed processing all of the webpage content), then the computer system can receive the information in block 606. The service can provide that information translated down into a package of information that can be easily formatted and presented in a predefined section of the plugin. The predefined section of the plugin, as described herein, can be allocated or otherwise assigned to the particular service. Therefore, the service can consistently display any of its results or other information within that predefined section of the plugin.

Accordingly, once the information is received, the computer system can identify at least a portion of the information to present in a plugin (block 608). Not all the information generated by the service may be presented at a time in the plugin. For example, the processing status may not be presented in the plugin, but issues and/or errors that are identified by the service since the last time of polling may be presented in the plugin. As another example, the service may provide additional information about an issue that is identified, such as links to portions of HTML and/or CSS where the issue can be found in the rendered webpage. This information, although beneficial for the computer system to locate the issue and highlight the issue in a rendered version of the webpage content, may not be presented to the website owner in the plugin. Instead, distilled information can be presented in the plugin to provide a user-friendly, easy, and quick interface for reviewing issues and addressing those issues before publishing the webpage content.

The computer system can generate a link to present in the plugin to retrieve at least another portion of the information (block 610). Therefore, information that may not be presented in the plugin at a present time can be retrieved and displayed at a later time within the plugin. The another portion of the information can be cached (block 612) and thus retrieved using the link. As an illustrative example, a first quantity of accessibility issues, identified by an accessibility service, can be presented in the plugin (e.g., within a predefined section of the plugin that is designated for the accessibility service). Each of the accessibility issues can be presented with a selectable option (e.g., button) to view more information about the issue. The selectable option can link to the another portion of the information associated with the issue that has been cached. The another portion of the information can be retrieved, by the computer system and based on receiving user input indicating selection of the selectable option, to then be presented in the plugin. Caching and retrieving the another portion of the information using the link can use few compute resources and can increase processing efficiency of the computer system.

The computer system can rank the presented information in the plugin (block 614). The same ranking can be used every time that information is presented in the plugin for the particular website owner. Moreover, each website owner can have a different ranking of information based on the services they subscribe to and/or their preferences. This allows for the plugin framework to be dynamically adapted to the needs of different clients, even though the plugin itself is deployed to client computing devices of all the website owners for presentation in the webpage editing tool.

The presented information can be ranked based on the website owner's preferences. For example, the website owner may decide that results (e.g., information) from an accessibility service is most important to the website owner, results from an SEO service are the second most important, and results from a policy service are the third most important. The computer system can receive these preferences from the client computing device (e.g., the website owner can provide user input at the webpage editing tool that indicates an order of preference) and use them to rank the presented information in the plugin. In this example, the computer system can present a predefined section of the plugin that is allocated to the accessibility service at a top of the plugin, followed by the section that is allocated to the SEO service, and lastly followed by the section that is allocated to the policy service. In some implementations, the computer system can determine which services may provide more insight for the website owner to improve their webpage content. The computer system can accordingly rank the presented information from the various services in the plugin.

The computer system can also format the presented information in the plugin in block 616. The information can be formatted and/or styled for presentation in a consistent manner, regardless of how the presented information is ranked and how many services provide information to be presented in the plugin. In the example above, where information is ranked from accessibility to SEO to policy, information from each of these services can be presented in uniform tables that identify any potential issues or accidental errors and include a selectable option to view the respective issue or error. Sometimes, if the SEO service does not return information at a time of polling but the accessibility and policy services return information, the computer system can present the information for accessibility, followed by an empty section that is designated for SEO, and then followed by the information for policy. This can provide for consistent presentation of information in the plugin as well as consistent allocation of space in the plugin to each of the services. Once the SEO service provides information, the computer system can populate the empty section with the SEO information without disrupting presentation of the accessibility information or the policy information.

Consistent allocation of plugin space, ranking, formatting, and styling can beneficially maintain a user-friendly interface that makes it easy and quick for the website owner to review potential issues and/or accidental errors. This is especially true since the website owner may be accustomed to seeing information from particular services in one or more particular sections in the plugin. If the computer system presents information from the services in different sections each time that that the computer system receives information from the services (which can happen frequently since the computer system continuously polls the services for information as they process the webpage content), then the website owner may be confused reviewing issues and/or errors and thus may have difficulty to quickly address issues and/or errors before publishing the webpage content. Consistent display of information in the plugin can help streamline a process for reviewing and responding to issues and/or errors so that the website owner may not be delayed in publishing their webpage content.

The computer system can transmit the plugin to the client computing device to be presented in a GUI display (block 618). As described herein, the plugin can be presented concurrently with the rendered webpage content in a webpage editing tool presented at the client computing device. Every time the plugin is updated with additional/new information from one or more services, the computer system can transmit the updated plugin to the client computing device for presentation. The plugin can be updated and presented in real-time as issues and/or errors are identified by the one or more services.

After transmitting the plugin to the client computing device in block 618, the computer system may return to block 604 and determine whether any more services have information to be presented in the plugin. The computer system can repeat blocks 606-618 to continuously and consistently update the plugin and present the updated plugin at the client computing device.

Refer to FIGS. 8A-C for additional discussion about presenting information in the plugin and updating the plugin in real-time.

Figure 7:
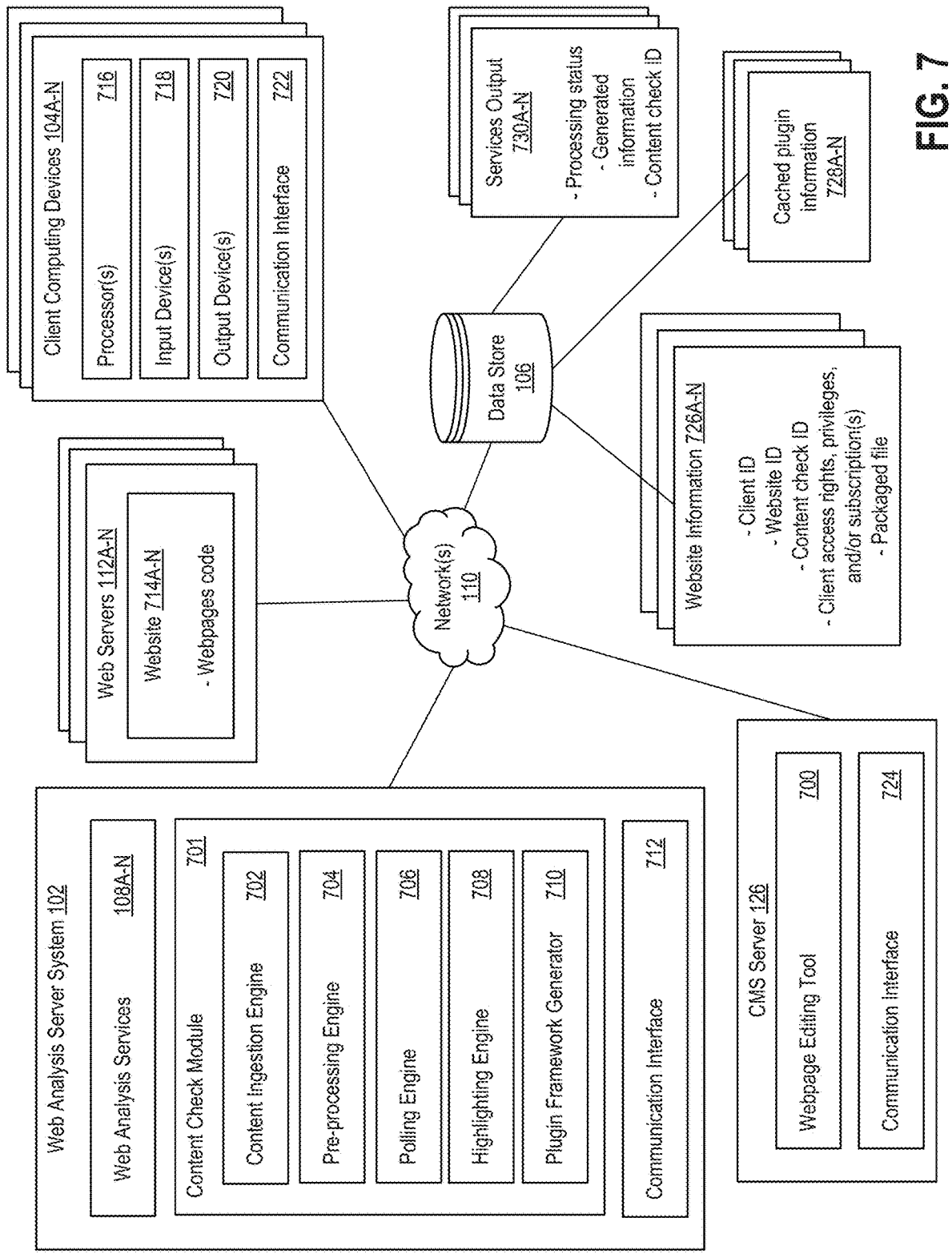
FIG. 7 is a system diagram depicting one or more components that can perform the techniques described herein.

FIG. 7 is a system diagram depicting one or more components that can perform the techniques described herein. As described herein, the web analysis server system 102, the client computing devices 104A-N, data store 106, the web servers 112A-N, and the CMS server 126 can be in communication via the network(s) 110.

In brief, the web analysis server system 102 can be any type of computing system, such as a computer or network of computers, and/or a cloud-based computing system and/or service. The client computing devices 104A-N can be any type of user device or computing device, including but not limited to a computer, laptop, tablet, cellphone, mobile phone, and/or smartphone. Each client computing device 104A-N can be operated and used by a website owner, client, website operator, or other relevant user. The data store 106 can be any type of storage device, including but not limited to cloud storage, a data lake, and/or a data base. The data store 106 can maintain information about webpage content, such as results/information from assessments performed by the web analysis services 108A-N during pre-publish content checks.

The web servers 112A-N can be any type of server system, such as a cloud-based server system that host websites. The web servers 112A-N can maintain code for webpages of a website, to be transmitted to a user device of an end user and/or the client computing devices 104A-N. The webpage can then be rendered at the respective device, using the code from one or more of the web servers 112A-N. As described herein, the code can also be transmitted to the web analysis server system 102, and used by the web analysis server system 102 to locally render and execute the webpage as if it were presented at a user device, such as the client computing devices 104A-N. The web analysis server system 102 can then use the rendered webpage to perform analytics, including but not limited to assessing and identifying issues in the webpage and determining overall quality of the webpage (and the website of the webpage).

The CMS server 126, as described herein, can be configured to provide webpage editing tools and content management services to the website owner at the client computing devices 104A-N. The CMS server 126 can include a webpage editing tool 700 and a communication interface 124.

The webpage editing tool 700 can be configured to present the webpage editing tool in a web browser at the client computing devices 104A-N. The tool 700 can include multiple iFrames for presenting different information about the webpage. One iFrame can be used to present a rendered version of the website owner's webpage content. For example, the website owner can input a website ID (e.g., URL) at the client computing devices 104A-N (e.g., using input device(s) 718). The website ID can be transmitted to the CMS server 126 and used by the tool 700 to retrieve webpage code for that website 714A-N from the web servers 112A-N. The tool 700 can use the code to render particular webpage content in the iFrame and present that rendered webpage content at the client computing device 104A-N.

The tool 700 can also include another iFrame that can be used to present the CMS plugin described throughout this disclosure. Finally, the tool 700 can include multiple selectable options (e.g., buttons) that can be selected by the website owner at the client computing devices 104A-N to edit, review, and/or publish the webpage content that is presented in the iFrame.

The communication interface 124 can provide for communication with one or more other components described herein. Although depicted as separate systems, the CMS server 126 can be part of the web analysis server system 102 in some implementations.

The web analysis server system 102 can provide one or more services to website owners and other relevant users that allow for analysis, editing, and generation of content for websites. The web analysis server system 102 can include one or more services that can be purchased or selected by the website owner for use in assessing webpage content before and/or after publishing. The web analysis server system 102 can also populate a CMS plugin with information from the one or more web analysis services 108A-N. The system 102 can therefore provide a customizable, dynamic CMS plugin to each client computing device 104A-N to be presented concurrently with the webpage editing tool 700, which can be provided by the CMS server 126. The web analysis server system 102 can include the web analysis services 108A-N, a content check module 701, and a communication interface 712. Although not depicted, the web analysis server system 102 may also include one or more processors that are configured to execute instructions to perform one or more of the techniques described throughout this disclosure.

The web analysis services 108A-N, as described throughout this disclosure, can be configured to provide one or more website analytic services to the website owner. One or more of the services 108A-N can be provided by the web analysis server system 102. In some implementations, one or more of the services 108A-N can be provided by third party providers. Each of the services 108A-N can be configured to assess different aspects of webpage content quality. For example, the services 108A-N can be configured to identify different types of potential issues and/or accidental errors in the webpage content that may affect quality of the webpage or compliance with one or more standards. The services 108A-N can include but are not limited to accessibility, policy, misspellings, SEO, ads, and readability services. One or more other services 108A-N can also be included in the web analysis server system 102 or provided by a third party provider.

Although multiple different services 108A-N can be provided, a particular website owner may only select (or have a subscription for) a smaller portion (e.g., subset) of the multiple different services 108A-N. For example, the web analysis server system 102 can include accessibility, policy, misspelling, SEO, ads, and readability services 108A-N. However, a first website owner may only have a subscription for the accessibility and misspelling services 108A-N while a second website owner may have a subscription for the accessibility, SEO, ads, and readability services 108A-N. When performing the pre-publish content checks described herein, the web analysis server system 102 can determine which of the services 108A-N to poll based on the respective website owner's subscription(s). The website owner's subscription(s), access rights, and/or privileges can be associated with a client ID and stored in website information 726A-N in the data store 106. The web analysis server system 102 can retrieve the subscription(s) from the website information 726A-N in the data store 106 using the client ID to identify which of the services 108A-N are included in the respective website owner's subscription.

The content check module 701 can be configured to perform pre-publication as well as post-publication checks on webpage content. As described herein, the website owner can provide user input at the client computing device 104A-N that indicates selection of an option to publish webpage content and/or perform a content check on the webpage content before publishing. The webpage content and the option can be presented in the webpage editing tool 700 at the client computing device 104A-N. The content check module 701 can receive indication of the user input from the client computing device 104A-N, which can prompt the module 701 to begin the content checking process described throughout this disclosure.

The content check module 701 can include a content ingestion engine 702, a pre-processing engine 704, a polling engine 706, a highlighting engine 708, and a plugin framework generator 710. The content ingestion engine 702 can be configured to receive the rendered webpage content from the client computing device 104A-N and package that content into a file that can be provided to each of the web analysis services 108A-N for processing. The packaged file can be stored in the website information 726A-N in the data store 106. The content ingestion engine 702 can also be configured to determine whether a content check ID has been assigned to the received webpage content. The engine 702 can poll the data store 106 to check the website information 726A-N for the content check ID. If the content check ID is not identified in the website information 726A-N, then the engine 702 can generate a content check ID for the received webpage content. As described herein, the content check ID can be used by the components described herein when polling the services 108A-N for information, presenting that information in the CMS plugin, and otherwise associating different aspects of the website information 726A-N during the content check process.

The pre-processing engine 704 can receive the packaged file and the content check ID from the content ingestion engine 702. The engine 704 can be configured to unpackage the file and verify contents of the file. The engine 704 can also prepare the contents of the file to be processed by the services 108A-N. Once the contents of the file are pre-processed, the pre-processing engine 704 can transmit the pre-processed content to the services 108A-N that are designated/selected for the content check of the particular webpage content presented in the webpage editing tool 700 at the client computing device 104A-N. The services 108A-N can then analyze the pre-processed content to identify any potential issues and/or accidental errors in the rendered webpage content.

As the services 108A-N analyze the pre-processed content, the polling engine 706 can transmit update requests to the services 108A-N. The engine 706, for example, can poll the services 108A-N at predetermined time intervals, requesting a processing status update and any generated information from the service 108A-N's analysis of the pre-processed content.

The services 108A-N can store their respective processing statuses and generated information (e.g., results) along with the associated content check ID as services output 730A-N in the data store 106. Therefore, all output from the services 108A-N can be stored in a centralized location for easy and fast retrieval, by the web analysis server system 102, that can use minimal compute resources and processing power.

The services 108A-N can respond to the polling engine 706 with an indication of the processing status and/or generated information that is associated with a particular content check ID. For example, one of the services 108A-N can respond with an indication that information has been generated since a last time that the service was polled by the engine 706. The engine 706 can then use the content check ID to identify and access the generated information in the services output 730A-N in the data store 106. The engine 706 can retrieve this information and provide it to the plugin framework generator 710. In some implementations, the engine 706 can send a notification to the plugin framework generator 710 indicating that information has been generated by one or more of the services 108A-N and that information can be presented in the plugin.

The plugin framework generator 710 can receive the generated information from the services output 730A-N in the data store 106 and/or directly from the respective web analysis services 108A-N. The generator 710 can be configured to populate predefined sections of the CMS plugin with the generated information. The generator 710 can also cache at least portions of the generated information 728A-N. The generator 710 can then link the cached information 728A-N in the plugin so that this information can be retrieved and presented in the CMS plugin at another time. The generator 710 can populate the CMS plugin with the generated information using consistent formatting, styling, and ranking, as described throughout this disclosure. The generator 710 can also consistently allocate the same predefined sections of the CMS plugin to the same services 108A-N for the particular website owner.

The generator 710 may continuously update what information is presented in the predefined sections of the CMS plugin as the polling engine 706 continues polling the services 108A-N and the services 108A-N continue to analyze the webpage content. Every time the CMS plugin is populated or otherwise updated, the generator 710 can transmit the CMS plugin to the client computing device 104A-N to be presented in the webpage editing tool 700 concurrently with the rendered webpage content. The website owner can view, in the plugin, information as it is generated by the services 108A-N while also viewing and editing the rendered webpage content in the webpage editing tool 700. This display can be beneficial to assist the website owner in quickly and easily reviewing potential issues and/or accidental errors as they are identified by the services 108A-N and resolving those issues and/or errors before publishing the webpage content. In some implementations, the plugin framework generator 710 can be part of the CMS server 126.

The highlighting engine 708 can be configured to receive an indication of user input form the client computing devices 104A-N indicating selection of an issue or error that is presented in the plugin. The website owner can select an issue or error that they desire to focus on in the rendered webpage content. By selecting the issue or error, the highlighting engine 708 can identify a section in the rendered webpage content that includes the issue or error and highlight that section. The engine 708 can also use one or more other visual techniques to emphasize the section in the rendered webpage content that includes the issue or error. The highlighting or other visual emphasis that is performed by the engine 708 can be beneficial to assist the website owner in quickly identifying the issue or error and resolving the issue or error directly within the rendered webpage content. Once the section with the issue or error is highlighted or otherwise visually emphasized, the engine 708 can transmit instructions to the client computing device 104A-N to present the highlighted section in the rendered webpage content. The engine 708 can also transmit similar instructions to the plugin framework generator 710 and/or the webpage editing tool 700 so that the highlighted section appears in the rendered webpage content when the webpage editing tool 700 is presented in the web browser of the client computing device 104A-N.

Finally, the communication interface 712 can be configured to provide communication between the web analysis server system 102 and components described herein.

The client computing devices 104A-N can be used by the website owner (or other relevant user) to review information about their website that is determined by the web analysis server system 102. This information can be used to identify issues in the website, assess quality of the website, and improve the website. The client computing devices 104A-N can deploy the webpage editing tool 700 that is provided by the web analysis server system 102 to be used by the website owner in analyzing and editing their website(s).

The client computing devices 104A-N can each include a processor(s) 716, input device(s) 718, output device(s) 720, and communication interface 722. The processor(s) 716 can execute instructions that cause the client computing devices 104A-N to perform one or more of the techniques described herein. The input device(s) 718 can include any type of device that can be used to provide input, by the website owners, to the client computing devices 104A-N. The input device(s) 718 can include but are not limited to keyboards, microphones, mice, and/or touchscreen displays.

The website owner can provide input via the input device(s) 718 such as selection of an option to publish webpage content that is rendered in the webpage editing tool 700. The website owner can also provide input via the input device(s) 718 indicating selection of an option to run a pre-publish (or post-publish) check on the rendered webpage content. Moreover, the website owner can provide input via the input device(s) 718 indicating one or more edits, modifications, and/or changes that are made to elements in the rendered webpage content. Such edits, modifications, and/or changes can be made by the website owner directly in the webpage content that is rendered in the webpage editing tool 700. The website owner can also provide input via the input device(s) 718 including selection of an issue or error presented in the plugin to (i) view additional information about the issue or error and/or (ii) highlight the issue or error in the rendered webpage content.

The output devices(s) 720 can include any type of device that may provide output or otherwise display information to the website owner at the client computing devices 104A-N. The output device(s) 720 can include but is not limited to touchscreens, other types of display screens, speakers, headphones, and/or other types of devices for presenting information. The output device(s) 720 can display content, in a GUI display, such as the webpage editing tool 700.

Finally, the communication interface 722 can be configured to provide communication between the user devices 104A-N and the components described herein.

FIGS. 8A-1 and 8A-2 are an example GUI for displaying information to run a pre-publication check for a webpage. Referring to both FIGS. 8A-1 and 8A-2, a webpage editing tool 800 can be presented in a web browser of a website owner's client computing device. The webpage editing tool 800 can be provided by the CMS server 126, as described throughout this disclosure. The webpage editing tool 800 can include iFrames 801 and 803, which can concurrently present different information to the website owner. For example, the iFrame 801 can be used to present a rendered webpage 810 of the website owner. The iFrame 803 can be used to present a CMS plugin 804. Also, the webpage editing tool 800 can include one or more selectable options that can be used by the website owner to review, modify, and/or create content in the website owner's website (not depicted).

The website owner can input a webpage ID (e.g., URL) in an input field at the editing tool 800 for the webpage 810. The client computing device can transmit the webpage ID to the CMS server 126) to render the webpage 810 in the iFrame 801. Refer to FIG. 1A for additional discussion. The webpage 810 can be rendered as it would appear in a web browser at a device of an end user. The webpage 810 can include webpage content 828-830. The webpage 810 can also include image data, titles, selectable links or other options, menus, etc. As described herein, the website owner may directly modify, edit, add, and/or delete any content that appears in the webpage 810 as it is rendered in the iFrame 801.

Once the website owner reviews the webpage 810 presented in the webpage editing tool 800, the website owner can select an option 802 to publish the webpage 810. The option 802 may also include an indication of whether changes have been made to the webpage 810. In some implementations, if changes have not been made to the webpage 810 since a last time a pre-publication content check was executed for the webpage 810, then selecting the option 802 to publish the webpage 810 may not invoke another pre-publication content check. If changes have been made to the webpage 810 (which can be represented by an indication stating "Changes to be published"), then selecting the option 802 can cause the web analysis server system 102 to begin a pre-publication content check of the webpage 810, as described throughout this disclosure. After all, the moment a change is made to the webpage 810, the webpage 810 is no longer the same as a previous version of the webpage 810 and new issues or errors may exist.

Selecting the option 802 can cause the CMS plugin 804 to be presented in the iFrame 803. In some implementations, the CMS plugin 804 can also be presented in the iFrame 803 if the website owner selects another button, icon, or option that is presented in the webpage editing tool 800. The CMS plugin 804 can be presented concurrently with the webpage 810 but in different iFrames. As shown in FIGS. 8A-1 and 8A-2, the iFrame 803 can overlap with a portion of the iFrame 801. As a result, the CMS plugin 804 may cover a portion of the webpage 810. In some implementations, the iFrames 801 and 803 may not overlap. Therefore, the CMS plugin 804 can be presented next to the webpage 810.

The CMS plugin 804 can include information about the particular webpage 810 displayed in the webpage editing tool 800. A selectable option 806 can be presented in the CMS plugin 804 to "Re-check page." The website owner can select this option to re-check content in the webpage 810 that has already been published. Thus, the web analysis server system 104 can run a content check on content in an already-published version of the webpage 810. Re-checking the webpage 810 can be beneficial to identify whether any potential errors have slipped through and been published. The website owner can respond by resolving those errors.

A status bar 808 can also be presented in the CMS plugin 804 to indicate progress of the pre-publication check. In the example of FIGS. 8A-1 and 8A-2, the status bar 808 indicates that "Some results are not available. This might take a few moments." The status bar 808 can also include a selectable option to "See results." By selecting this option, the CMS plugin 804 can be updated to include results within sections 820A-N that have been generated up to a present time by the web analysis services 108A-N that are analyzing content of the webpage 810. The status bar 808 can be updated every time that the services 108A-N are polled, by the web analysis server system 102, for progress status and generated information.

The results from each of the services 108A-N can be presented in the sections 820A-N. As described herein, each service can be allocated a particular section 820A-N. The service can present any of its results or other information from analyzing the content of the webpage 810 in its respective section 820A-N. This framework is beneficial to ensure consistent ranking, formatting, styling, and allocation of space in the CMS plugin 804.

In the example of FIGS. 8A-1 and 8A-2, six types of page content issues are identified during the pre-publication content check by the services. The types of page content issues include "Broken links," "Misspellings," "Level A issues," "WAI-ARIA authoring practices," "Accessibility best practices," and "Find alloy." Each of these issues are allocated a section of the sections 820A-N in the CMS plugin 804. Therefore, whenever results are generated by the services for any of these issues, the sections 820A-N that correspond to the issues can be populated with the respective results.

As described herein, the sections 820A-N are populated with information as the information is generated by the services that analyze content of the webpage 810. At a present time of the pre-publication check being performed, each of the sections 820A-N include a name of an issue category associated with the section 820A-N (e.g., "Broken Links" in section 820A), a quantity of certain issues for the issue category of the section 820A-N (e.g., a large and bold "1" in the section 820A below the "Broken Links" title), a name of a product category (e.g., web analysis service) in the web analysis server system 102 to which the particular issue category of the section 820A-N belongs (e.g., "Quality Assurance" in the sections 820A and 820B, "Accessibility" in the sections 820C-E, and "Policy" in the section 820N), and a quantity of potential issues found on the webpage 810 that should be verified or rejected by the website owner (e.g., "2 potential misspellings" in the section 820B and "0 potential issue" in the section 820D).

The website owner can adjust how information is presented in the CMS plugin 804. For example, the website owner can select a display option for presenting information in the sections 820A-N from a dropdown menu 812. The dropdown menu 812 can include selectable options for content issues, SEO, and analytics. One or more other options can also be presented in the dropdown menu 812. In the example of FIGS. 8A-1 and 8A-2, the website owner has selected "page content issues" from the dropdown menu 812, which causes the sections 820A-N to be populated with results based on the six issue types mentioned above.

The CMS plugin 804 can include webpage quality information 816 along with the results from the pre-publication content check. The quality information 816 can indicate a current quality score of the webpage 810. The current quality score of the webpage 810 can be determined by the web analysis server system 102. The current quality score can be visually depicted in the quality information 816. For example, the current quality score can be depicted as a circle with a bar along a distance of the circle's circumference that represents the current quality score. The bar can be represented in an indicia, such as a color of pattern. For example, the bar can be represented in a green color when the current quality score is within a first range, which indicates a good score. The bar can be in a yellow or orange color when the current quality score is within a second range, which indicates an okay score, and the bar can be in a red color when the current quality score is within a third range, which indicates a poor score. The quality score can also be represented as a numeric value within the circle. Moreover, the quality information 816 can indicate a total amount of points that the quality score can be. In the example of FIGS. 8A-1 and 8A-2, the current quality score for the webpage 810 is 85.8 out of 100 points. The circle is represented with a green bar that extends a distance around the circumference of the circle that equates to approximately 85.8% of the total circumference. The visual depiction of the current quality score for the webpage 810 as shown in the webpage quality information 816 can help the website owner easily and quickly assess quality of the webpage 810 and prioritize which issues or errors to address before publishing the webpage 810.

The CMS plugin 810 can also include readability information 818. The readability information 818 can be determined by one or more of the services 108A-N during the pre-publication content check of the webpage 810. Readability can be considered a most important factor in the pre-publication content check and thus can be allocated space above the other issues presented in the sections 820A-N. Therefore, the website owner can focus on the readability of the webpage 810 before publishing. In the example here, the readability of the webpage 810 is a score of 34-44. The score can be determined based on a readability test that is set up for the particular webpage 810. Different geographic regions may use different readability tests since one test may not fit all languages. Therefore, a readability test that is suitable for the particular webpage 810 can be selected and performed by the web analysis server system 102 and output from that test can be presented as the readability of the webpage 810. Although a numeric score is depicted as the readability of the webpage 810, one or more readability tests can generate other output, such as a description of readability. The web analysis server system 102 can perform one or more readability tests including but not limited to automated readability index (ARI), Coleman-Liau, Flesch-Kincaid Grade Level, Flesch-Kincaid Reading Ease, Gunning Fog, LIX, and SMOG. One or more other readability tests may also be performed depending on the webpage 810.

The CMS plugin 804 can include one or more additional selectable options 822, 824, and 826. When the website owner selects any of the options 822, 824, and/or 826, the web analysis server system 102 may update the CMS plugin 804 to present corresponding information. For example, the selectable options 822, 824, and 826 can be tabs that, when selected by the website owner, can expand in the CMS plugin 804 and present associated information therein.

Option 822 can allow the website owner to view "My history." "My history" can include information about previous changes (e.g., edits) that have been made to the webpage 810, issues that have been identified during prior pre-publication content checks of the webpage 810, issues that have been results in the webpage 810, and/or changes to the webpage quality score over time.

Option 824 can allow the website owner to view "Site overview." "Site overview" can include information about multiple webpages of the website. For example, "Site overview" can include an overall quality score for the website, one or more issues that have been identified across the website, and selectable options to view and/or address any of the issues that have been identified.

Option 826 can allow the website owner to view "This page." "This page" can include all the information presented in the CMS plugin 804 in the FIGS. 8A-1 and 8A-2. As shown, the user has selected the option 826. Therefore, the webpage quality information 816, readability information 818, and information presented in the section blocks 820A-N are all associated with the webpage 810 that is rendered in the iFrame 801.

In some implementations, as shown in FIG. 8A-1, a selectable option can be presented in the CMS plugin 804 to view an unpublish impact for the particular webpage 810. Selecting this option can cause another element or tab to appear in the CMS plugin 804, which can present information about potential impacts that un-publishing the webpage 810 may have on the entire website. This information can include issues that may arise and/or changes that may be made to other webpages in the website if the webpage 810 is removed from the website (e.g., un-published). Some of the information presented can include potential issues in the webpage 810 (or other associated webpages) if the customer decides to un-publish, delete, or remove the webpage 810. Example information can also include, but is not limited to, documents linked to the webpage 810, documents that are only linked to the webpage 810 and no other webpages associated with the webpage 810 (in which case end users may lose access to those documents if the linking webpage 810 is deleted), internal referring webpages, external referring webpages, whether the webpage 810 is a landing page for a campaign, whether the webpage 810 has a short URL linked (which may indicate that the webpage 810 is being used in a campaign or linked from some written content/material), and/or whether the webpage 810 is tagged (which can indicate that the webpage 810 is being used or owned with other webpage content). One or more other information can also be presented in the CMS plugin 804 by selecting the option to view the unpublish impact of the particular webpage 810.

FIGS. 8B-1 and 8B-2 are an example GUI for displaying results while the pre-publication check of FIGS. 8A-1 and 8A-2 is running. When the website owner selects "See results" in the status bar 808 of the CMS plugin 804 in FIGS. 8A-1 and 8A-2, the CMS plugin 804 can be updated, as shown here. The CMS plugin 804 can depict results that have been generated by the web analysis services as they analyze the content of the webpage 810. Therefore, the CMS plugin 804 may not present all the results because the pre-publication content check for the webpage 810 has not yet been completed.

The CMS plugin 804 can include "Issues to review" information 832. The information 832 can indicate that "Publishing this page will affect the following areas." The information 832 can then list one or more quality aspects for which the services are identifying issues as they analyze the content of the webpage 810. In the example of FIGS. 8A-1 and 8A-2, the services have identified accessibility issues 834, quality assurance issues 836, and readability information 818. The services can identify one or more additional or fewer quality aspects and associated issues as the services continue to analyze the webpage 810.

Here, the accessibility issues 834 section indicates that five accessibility issues have so far been identified during the pre-publication content check. A numeric indication can be depicted in the accessibility issues 834 section to indicate a quantity of accessibility issues that have been found. The numeric indication can be updated in real-time as more accessibility issues are identified. The website owner can select a dropdown arrow in the accessibility issues 834 section to view additional information about the five identified issues. The accessibility issues 834 section can then be expanded and updated to include an issues table 840. This section can also include selectable option for sorting and/or ranking the issues presented in the table 840. For example, the issues can be sorted and/or ranked based on "Conformance" and/or "Responsibility."

The table 840 can include columns for attributes that include "Issue," "Conformance," "Responsibility," and "Highlight." The "Issue" attribute can include a short textual description of the type of accessibility issue that has been identified. The "Conformance" attribute can indicate what accessibility standard(s) a particular issue is associated with. For example, the issue can be associated with A, AA, AAA, and/or ARIA level conformance standards. The "Responsibility" attribute can indicate a type of role or responsibility that is associated with a particular issue. For example, the issue can be associated with "Development," "Visual design," or "Content writing" roles. The table 840 can be continuously updated with additional issues and/or quantity of occurrences per issue as the pre-publication check continues.

The "Highlight" attribute can provide a selectable option to view a particular issue in the rendered webpage 810 that is concurrently presented in the webpage editing tool 800. Where a particular issue in the table 840 has multiple instances/occurrences in the webpage 810, the "Highlight" attribute can include (i) an indication of how many instances/occurrences there are and (ii) additional selectable options to navigate between the instances/occurrences and select one of them. For example, the first issue in the table 840 is "Text not included in an ARIA landmark." This issue appears fifty-one times in the webpage 810. The website owner can select left and right arrows in the "Highlight" attribute to navigate between the fifty-one occurrences. The website owner can then select the eye icon to view a particular occurrence of this issue in the rendered webpage 810. Where a particular issue in the table 840 has a single occurrence in the webpage, the "Highlight" attribute may simply include a selectable option with an eye icon. The website owner can select the option with the eye icon to cause the particular issue to be highlighted in the rendered webpage 810. Refer to FIG. 8C for additional discussion about highlighting issues in the webpage 810.

The information presented in the table 840 can assist the website owner to quickly review and address the accessibility issues that are being identified during the pre-publication content check of the webpage 810. The website owner can use the "Conformance" and "Responsibility" attributes to determine whether a particular issue should be addressed before publishing the webpage 810 and how to prioritize correcting the accessibility issues 834. The website owner can also use the "Highlight" attribute to view any of the issues in real-time in the rendered webpage 810 while also viewing the information in the CMS plugin 804. Once a particular issue is highlighted, the website owner can quickly and easily fix/resolve the issue directly in the rendered webpage 810. The website owner can fix/resolve issues directly in the rendered webpage 810 as the pre-publication content check is still running. This is beneficial to reduce an amount of time that may be needed to finalize the webpage 810 before publishing.

Here, the quality assurance issues 836 section indicates that three potential misspelling issues have so far been identified during the pre-publication content check. A numeric indication can be depicted in the quality assurance issues 836 section to indicate a quantity of potential misspellings issues 838 that have been found. If other types of quality assurance issues are identified, those can be categorized and listed along with the potential misspellings issues 838. Each of the listed issue types can include a numeric indication indicating a quantity of the respective issue type that has been found. The numeric indication can be updated in real-time as more issues are identified. The website owner can also select a dropdown arrow in the next to any of the issues in the quality assurance issues 836 section to view additional information about the identified issues. For example, the website owner can select a dropdown arrow for the potential misspellings issues 838, which can cause the potential misspellings issues 838 section to expand and become populated with information about the three identified potential misspellings. Refer to FIG. 8C for additional discussion about the potential misspellings issues 838 section.

Moreover, the CMS plugin 804 can include an element 840, which can indicate status of the pre-publication content check. Here, the element 840 is a rectangle with text that states, "Check in progress . . . " The text in the element 840 can be updated in real-time as the web analysis server system 102 polls the services for their respective processing status updates. For example, when all of the services have completed their respective assessments of the webpage 810 content, text in the element 840 can be updated to read, "Check completed." So long as the element 840 indicates that the pre-publication check is still in progress, the information presented in the CMS plugin 804 can be updated to include additional issues and/or more information about one or more particular issues and/or types of issues.

FIG. 8C is an example GUI for highlighting user-selected results from the pre-publication check of FIGS. 8A-1 and 8A-2. Here, the website owner has selected the potential misspellings issues 838 section. For example, the website owner can click on the dropdown arrow for the potential misspellings issues 838 section to view additional information about such issues 838. The CMS plugin 804 is updated as shown here. The CMS plugin 804 now includes the potential misspellings issues 838 section expanded to include a table 842 and additional information 844. The table 842 can output information about all potential misspellings that have been identified so far in the webpage 810. The table 842 can include columns for attributes that include "Potential misspelling," "Spelling suggestions," and "Highlight."

Similar to the table 840, the website owner can select an option having an eye icon in the "Highlight" column to view the associated potential misspelling in the rendered webpage 810. The particular word that is identified as a potential misspelling can be highlighted or otherwise visually emphasized in the rendered webpage 810. A particular content section in the rendered webpage 810 can also be highlighted or otherwise visually emphasized to demonstrate where the potential misspelling is located in the webpage 810. The highlighting feature described herein can be beneficial to assist the website owner in quickly and easily identifying the potential misspelling and addressing/fixing that misspelling. After all, the website owner can correct the misspelling directly in the rendered webpage 810 instead of having to navigate between different GUIs and/or editing tools to correct the misspelling in HTML of the webpage 810. This can provide for quick and efficient resolution of issues that may impact quality of the webpage 810 when the webpage 810 is published.

In the example of FIG. 8C, the website owner has selected option 846 for the first potential misspelling listed in the table 842. The first potential misspelling is "captred," which has a suggested spelling of "captured." Selecting the option 846 causes the rendered webpage 810 to be updated with highlighting 848 around a section of the webpage 810 that includes the potential misspelling. The website owner can review the highlighted section 848 and realize that the last sentence states "We captred it for you in this service." "Captred" is spelt incorrectly. The website owner can quickly and easily edit "captred" in the highlighted section 848 to "captured." This edit can be saved (e.g., automatically and/or by pressing an option to save changes made to the webpage 810).

If the pre-publication content check is still being executed for the webpage 810, a service that identified misspellings may identify that "captred" is no longer a potential misspelling. The table 842 can therefore be updated by removing the first potential misspelling from the table 842. If the pre-publication content check has completed for the webpage 810, the website owner can select the publish option 802 to automatically run the pre-publication content check again. The pre-publication content check may then be run on any content in the webpage 810 that has been changed/edited/modified. Therefore, if the website owner did not correct any of the other misspellings, the service that checks for misspellings may only check for the "captred" misspelling. The website owner can also select another option to run the pre-publication check again, such as option 806 in FIGS. 8A-1 and 8A-2, in order to check whether the "captred" misspelling has been correctly addressed and resolved. In some implementations, if this issue is resolved, the quality score for the webpage 810 can also be updated and presented in the quality information 816 of the CMS plugin 804 shown in FIGS. 8A-1 and 8A-2.

Finally, the additional information 844 in the potential misspellings issues 838 section can include a brief summary of what the potential misspellings issue 838 is and why it may be important for the website owner to fix before publishing the webpage 810.

Figures 1, 8D:
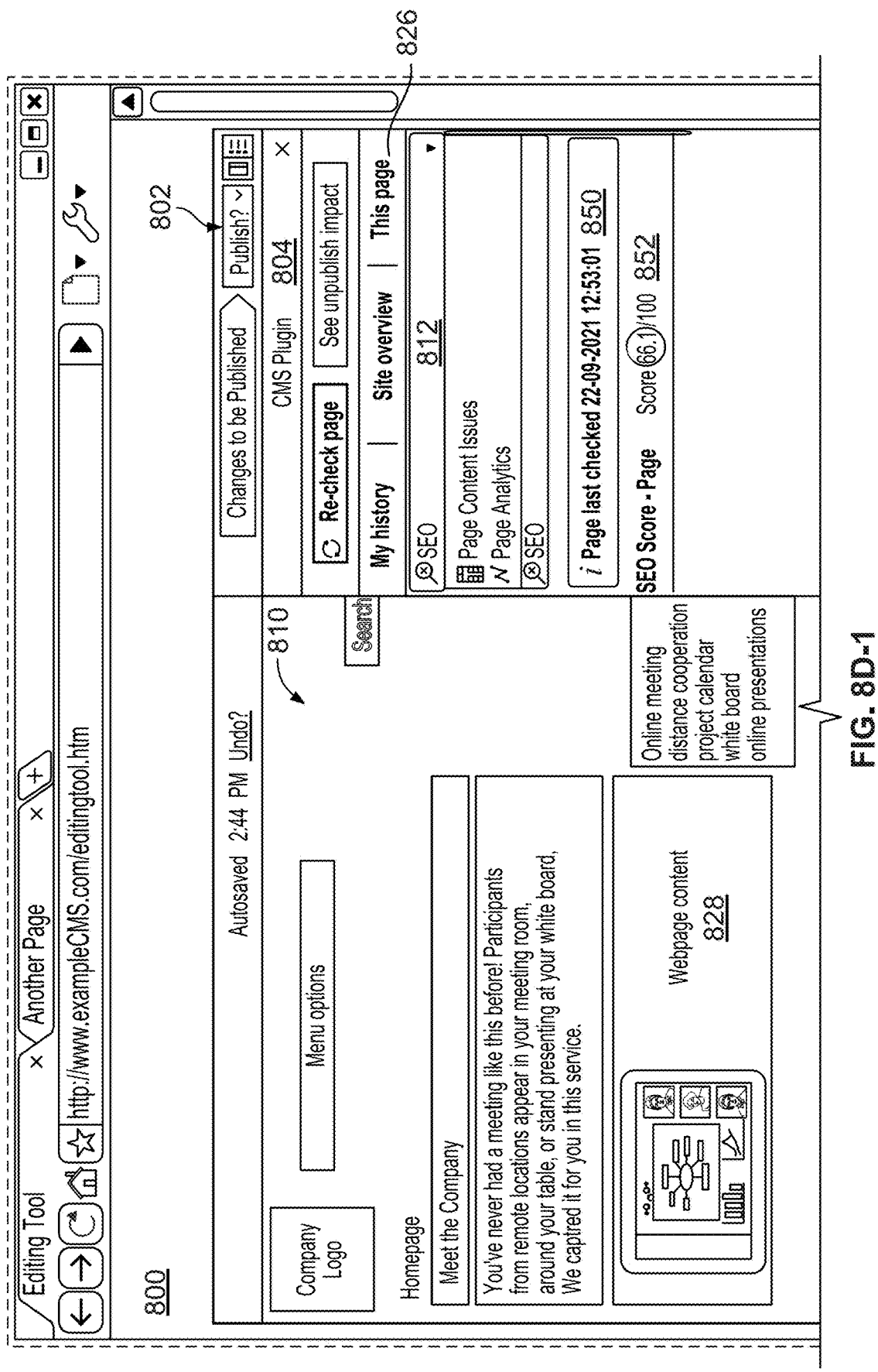

FIGS. 8D-1, 8D-2, 8E-1, 8E-2, and 8F are example GUIs for displaying identified SEO issues for a webpage. In FIGS. 8D-1 and 8D-2, the website owner or other relevant user has selected "SEO" from the dropdown menu 812. As shown, the website owner can select options including but not limited to "Page Content Issues," "Page Analytics," and "SEO." By selecting "SEO," the information presented in the CMS plugin 804 under "This Page" option 826 is automatically updated to reflect identified SEO issues in the webpage 810.

The CMS plugin 804 can present element 850, which indicates when last the webpage 810 was checked for SEO issues. The CMS plugin 804 can also include a section 852 indicating an SEO quality score for the webpage 810. The SEO quality score can be represented by a graphical element such as a circle element that is shaded in some indicia, such as a color, that indicates a numeric value of the SEO quality score. The SEO quality score can also be represented by the numeric value. Here, the webpage 810 has an SEO quality score of 86.1 out of 100, which was determined by a service of the web analysis server system 102 that analyzed the webpage 810 for SEO issues. A distance around a circumference of the circle element is shaded in a green color, where that distance represents the SEO quality score of 86.1.

Moreover, the CMS plugin 804 includes multiple sections, where each section represents a different category of SEO issues that have been identified by a service of the web analysis server system 102. For example, the CMS plugin 804 includes a "Technical Issues" section 854. The section 854 includes a table indicating the issue, a difficulty level of fixing the issue, and a quantity of points by which the quality score can be increased if the issue is fixed. The website owner can select any of the issues in the table in the section 854 to be directed to another page in the webpage editing tool 800 for addressing the selected issue.

The CMS plugin 804 also includes a "Content Issues" section 856. The section 856 includes a table indicating an issue, a difficulty level of fixing the issue, and an amount of points by which the SEO quality score can increase by fixing the issue. As mentioned above, the website owner can select any of the issues in the section 856 to load a page in the webpage editing tool 800 for the website owner to address the selected issue.

Figures 1, 8E:
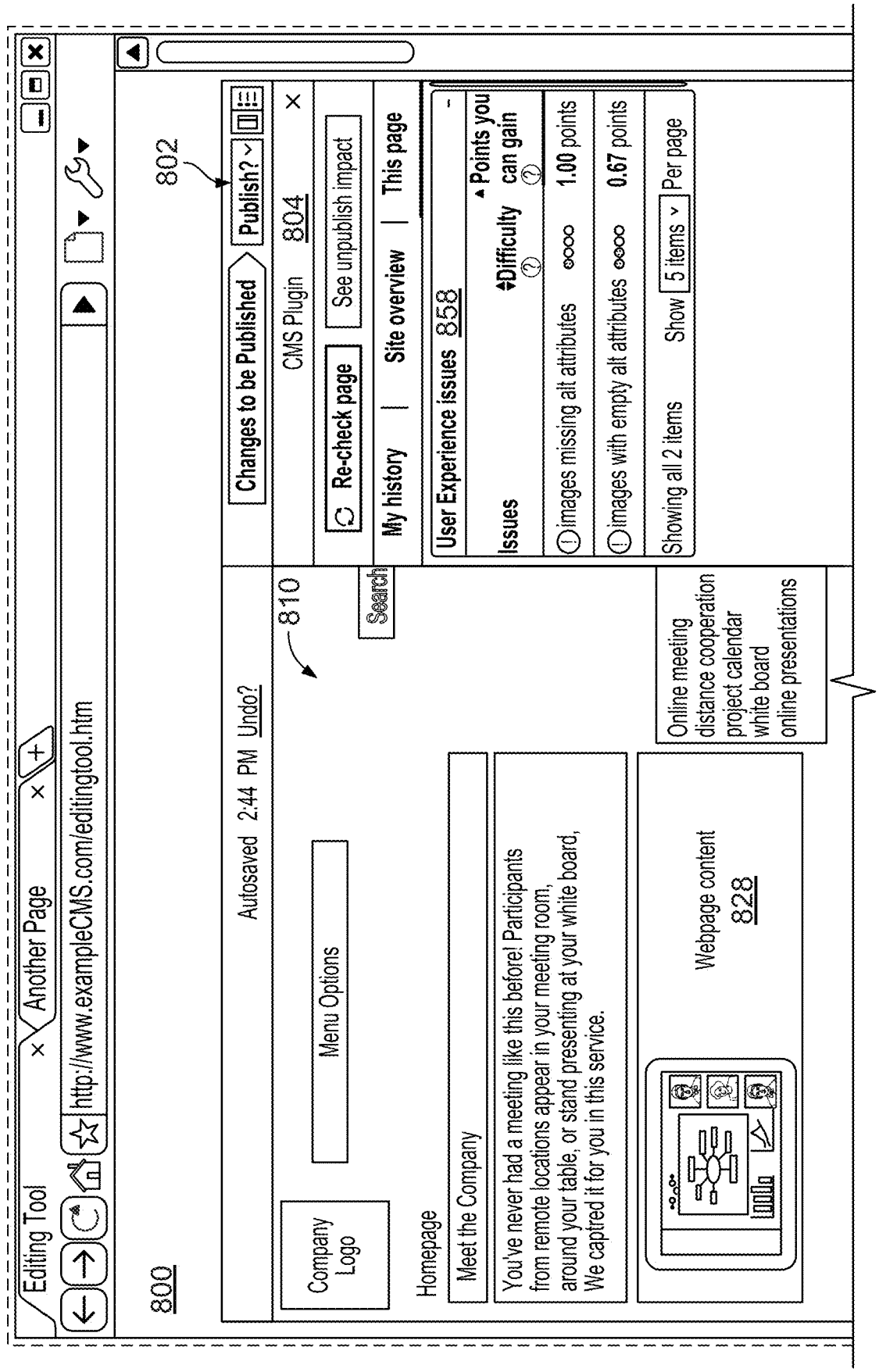

As shown in FIGS. 8E-1 and 8E-2, the website owner can scroll within the CMS plugin 804 to view additional sections of SEO issues in the CMS plugin 804. In FIGS. 8E-1 and 8E-2, the website owner has scrolled past the element 850 and the sections 852, 854, and 856, which are no longer visible in the CMS plugin 804 (unless the website owner scrolls back up in the CMS plugin 804). Scrolling within the CMS plugin 804 does not cause the webpage 810 to be scrolled. To scroll through the webpage 810, the website owner may hover over a portion of the webpage 810 and then scroll. By scrolling within the CMS plugin 804, the website owner can easily view a variety of information about the webpage 804 in a user friendly interface. Now, the website owner is able to view additional sections 858, 860, and 862 in the CMS plugin 804.

Section 858 is for "User Experience issues". The section 858 includes a table indicating an issue, a difficulty level for fixing the issue, and an amount of points by which the SEO quality score can be increased by fixing the issue.

Section 860 is for "Search snippet preview." Here, the website owner can view what the webpage 810 would look like as a search result in a search engine. The section 860 can also include a list of one or more issues with regards to the search result for the webpage 810. Here, for example, the identified issue is that "Meta description is too long." As described above, the website owner can select the identified issue to load another page in the webpage editing tool 800 provided by the web analysis server system 102 for addressing the selected issue.

Section 862 is for "Keywords related to this page." The section 862 can present information about mapped keywords for the webpage 810. The section 862 also includes selectable options (e.g., buttons) to "Start monitoring keywords." For example, the website owner can select, from within the CMS plugin 804, an option 863 to "Discover keywords" and/or an option 865 to "Monitor keywords." Selecting either of the options 863 and 865 can cause new GUIs to be presented to the website owner, the new GUIs being provided by the web analysis server system 102 described herein. For example, a GUI can be presented to the website owner in which the website owner can make selections to identify and/or discover new keywords. Another GUI can be presented to the website owner in which the website owner can make selections to monitor one or more particular keywords.

Figure 8F:
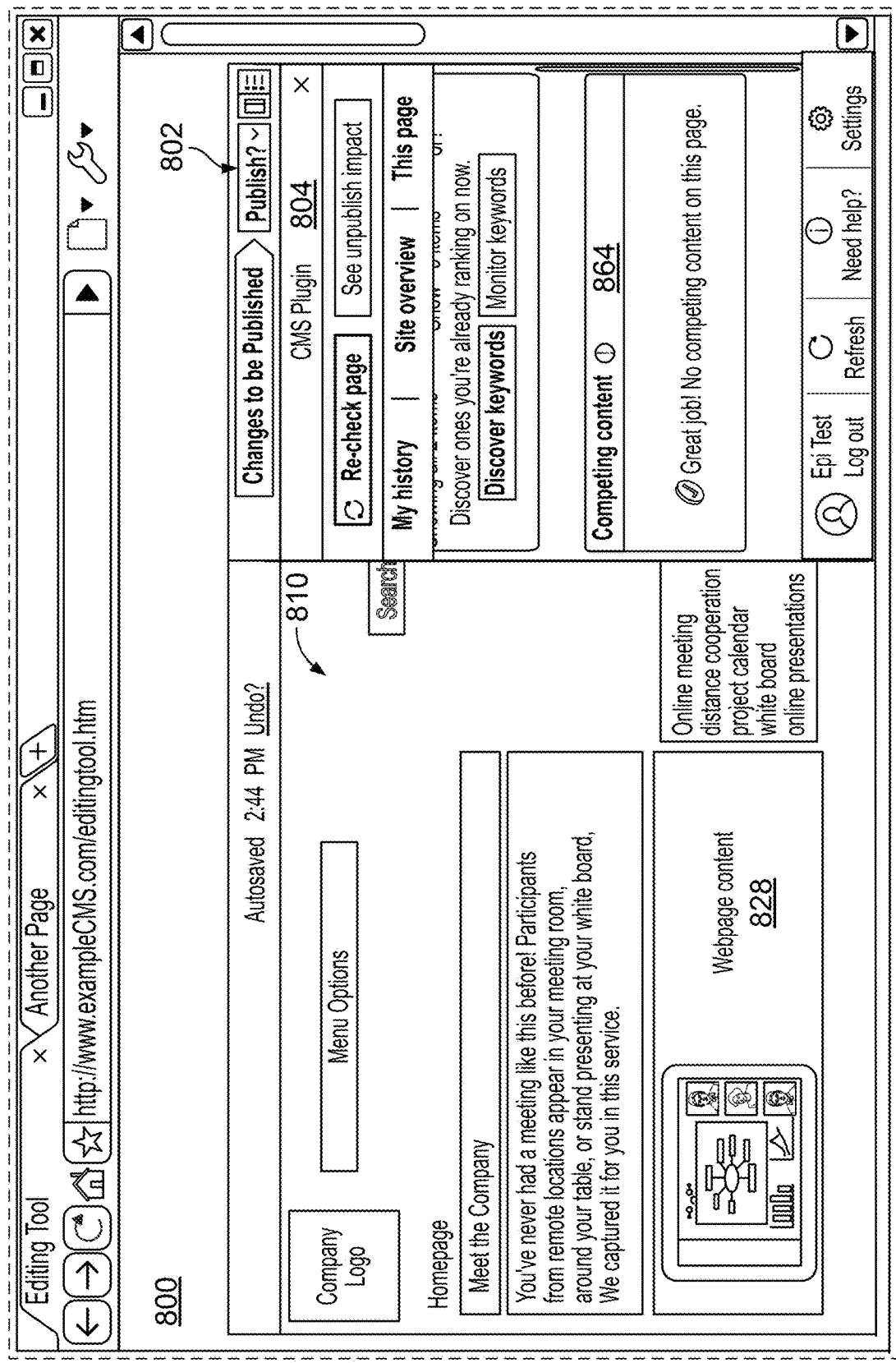

As shown in FIG. 8F, the website owner has scrolled within the CMS plugin 804 to a bottom of the CMS plug in 804. The website owner can view additional sections of SEO issues in the CMS plugin 804. In FIG. 8F, the website owner has scrolled past the element 850 and the sections 852, 854, 856, and 858, which are no longer visible in the CMS plugin 804 (unless the website owner scrolls back up in the CMS plugin 804). Now, the website owner can view the sections 860, 862, and 864 in the CMS plugin 804.

Section 864 is for "Competing content," which can refer to duplicate content on the website owner's website. The duplicate content may be content that competes internally for searching rankings. As shown in FIG. 8F, competing content has not been identified for the webpage 810.

FIG. 9A is a conceptual diagram depicting generation and presentation of a CMS plugin 904 with webpage content in a webpage editing tool 900. As described throughout this disclosure, the web analysis server system 102 can generate a preview of a webpage and present the preview in the webpage editing tool 900 to a relevant user, such as a website owner. The web analysis server system 102 can also generate the preview of the webpage to be editable at the same time that the preview is presented in the webpage editing tool 900. Therefore, the relevant user can view their webpage as it would appear to an end user and concurrently edit the webpage to resolve issues in the webpage or otherwise improve the webpage.

The webpage editing tool 900 can include a menu bar 914. The menu bar 914 can be positioned at a top of the webpage editing tool 900, as shown. The menu bar 914 can also be presented in one or more other locations in the webpage editing tool 900, such as on a left or right side of the webpage editing tool 900 and/or at a bottom of the webpage editing tool 900. The menu bar 914 can include a selectable option (e.g., button) 916. When the option 916 is selected by the relevant user, the process described below can be performed.

When the relevant user selects the option 916, the web analysis server system 102 can receive webpage content from an uneditable frame of the webpage presented in the webpage editing tool 900 (block A). Here, the webpage editing tool 900 includes two frames: 902 and 906. The frame 902, as shown in FIG. 9A, is an editable frame and the frame 906 is an uneditable frame. Webpage content 908 presented in the frame 902 can be modified by the relevant user while webpage content 910 presented in the frame 906 may remain static and thus may not be edited by the relevant user in the webpage editing tool 900.

In block A, the web analysis sever system 102 may receive the webpage content 910 presented in the uneditable frame 906. The webpage content can include HTML, CSS, Javascript, and other relevant code, as described throughout this disclosure. This content can be packaged (e.g., zipped) and transmitted to the web analysis server system 102. In some implementations, only webpage content that has not yet been published may be received by the webpage analysis server system 102 in block A. Therefore, the web analysis server system 102 can perform pre-publication content checks on the webpage content 910.

Although not depicted, in some implementations, when the user selects the option 916, only the uneditable frame 906 and the webpage content 910 therein may be presented in the webpage editing tool 900. Once the web analysis server system 102 generates the CMS plugin 904 and the editable webpage content 908, the webpage editing tool 900 can be updated to include the editable frame 902 and the uneditable frame 906, as shown in FIG. 9A.

The web analysis server system 102 can preprocess the received webpage content 910 in block B. Refer to FIG. 3 for additional discussion about ingestion and pre-processing (314) of the webpage content 910. For example, the web analysis server system 102 can check that the received webpage content 910 is valid. The validation process can include checking that the HTML, CSS, and/or JavaScript of the webpage content 910 is in valid formats to then execute the content check(s). The web analysis server system 102 may also discard any of the received webpage content 910 that is not necessary to perform the content checks. For example, content, such as images or videos, that are not relevant for execution of any of the checks and/or not relevant to the webpage can be discarded. Content can be assessed and discarded before the webpage content 910 is unpackaged/unzipped by the web analysis server system 102.

Next, the web analysis server system 102 can generate an editable preview of the preprocessed webpage content in block C. As described herein, the web analysis server system 102 can generate a dynamic rendering of the webpage content 910, such as an object model. The object model can be generated using any of the techniques described in the Object Model Patent Application.

The web analysis server system 102 can also perform one or more content checks on the editable webpage content, as described throughout this disclosure (block D). For example, the web analysis server system 102 can execute all of the web analysis services 108A-N depicted and described in FIG. 3. The web analysis server system 102 may not perform certain checks on the webpage content.

For example, the web analysis server system 102 may not determine a quality score for the particular webpage content or a website that includes the webpage content. This is because determining the quality score can require additional processing power and time and the content checks are intended to be performed quickly and efficiently to identify relevant issues in the webpage content that can be easily fixed by the relevant user before publishing the webpage content.

As another example, the web analysis server system 102 may not perform a content check for broken links, even though the relevant user can check for broken links using other features of the webpage editing tool 900 that do not include the CMS plugin 904. This is because the content checks that are performed and presented in the CMS plugin 904 relate to only the webpage content 910 being previewed in the webpage editing tool 900. When the web analysis server system 102 receives the webpage content in block A, the web analysis server system 102 is only receiving the webpage content 910 presented in the webpage editing tool 900, not content for other webpages that are linked to the webpage content 910 or a website including the webpage content 910. Therefore, the web analysis server system 102 is only checking the particular webpage content 910 when performing the pre-publication content checks and updating the CMS plugin 904, not content of other webpages or an entire website.

The web analysis server system 102 can update the CMS plugin 904 with results from the executed content check(s) (block E). The CMS plugin 904 can be same/similar as the CMS plugin 804 described in reference to FIGS. 8A-F.

The web analysis server system 102 can then output the editable preview of the webpage content and the CMS plugin 904 in the webpage editing tool 900 (block F). In so doing, the web analysis server system 102 can identify and link elements of the editable webpage content with results in the CMS plugin 904. The web analysis server system 102 can also correlate the static webpage content 910 with the dynamic, editable webpage content 908.

As shown in FIG. 9A, the uneditable frame 906 can take up a smaller portion of the webpage editing tool 900 than the editable frame 902. The menu bar 914 can expand across both frames 902 and 906. The CMS plugin 904 can overlay at least a portion of the uneditable frame 906. The uneditable frame 906 can present/output a grayed out version of the webpage content 910, thereby indicating to the relevant user that the webpage content 910 may not be edited by the relevant user. The webpage content 910 can also be adjusted in size/configuration such that the entire webpage content 910 can be presented within the smaller uneditable frame 906. Therefore, the webpage content 910 presented in the uneditable frame 906 is a static version of the webpage, which can be pushed/sent to the web analysis server system 102 for performing the techniques described herein. In some implementations, as shown and described in FIGS. 8A-F, the webpage content 910 in the uneditable frame 906 may not be presented in the webpage editing tool 900. Instead, the relevant user can view the CMS plugin 904 overlaying a portion of the webpage content 908 in the editable frame 902.

The webpage content 908 can be the editable preview of the webpage content 910. Therefore, when presented in the editable frame 902, the webpage content 910 can be modified by the relevant user.

One or more of the blocks A-F can also be performed by other computing systems, including but not limited to the client computing device 104 and/or the CMS server 126 described in FIG. 1A. For example, the client computing device 104 can publish and/or preview the static webpage content 910 and send that content to the web analysis server system 102 and/or the CMS server 126. The client computing device 104 can then poll the web analysis server system 102 for results from executing one or more content checks on the static webpage content 910. The client computing device 104 can then receive the results from the web analysis server system 102, present the editable webpage content 908 in the editable frame 902, present the static webpage content 910 in the uneditable frame 906, and output the CMS plugin 904 with the results over at least a portion of the editable frame 902 and/or the uneditable frame 906.

As another example, the client computing device 104 may generate an object model based on the HTML, CSS, Javascript, and other code of the webpage content 910. The client computing device 104 can generate the object model using any of the techniques described in the Object Model Patent Application. In some implementations, as described above, the web analysis server system 102 can generate the object model for the webpage content 910.

In some implementations, the web analysis server system 102 can dynamically generate the editable webpage content 908, execute content checks, update the CMS plugin 904, and output the CMS plugin 904 with the editable webpage content 908 and the static webpage content 910. In some implementations, the web analysis server system 102 can perform the techniques described above based on receiving a snippet or portion of the webpage content 910. For example, the relevant user may change "Featured products" in the editable webpage content 908 to "Favourite products." Instead of selecting the option 916 to check the updated webpage content 908, the web analysis server system 102 can automatically determine that the webpage content 908 has been updated and that the one or more content checks should be performed again. The web analysis server system 102 can receive all of the webpage content 908 and perform the one or more content checks on all of the webpage content 908. In some implementations, the web analysis server system 102 can identify a portion of the webpage content 908 that was updated/edited and receive only that identified portion of the webpage content 908. In this example, the web analysis server system 102 may only receive HTML, CSS, Javascript and other code for the text element "Favourite products." When performing the content checks on this text element, the web analysis server system 102 may identify that "Favourite" is spelt incorrectly. The web analysis server system 102 can update the CMS plugin 904 to present information about this misspelling along with any other issues that had been previously identified for the webpage content 908 and not resolved/addressed.

Figure 9B:
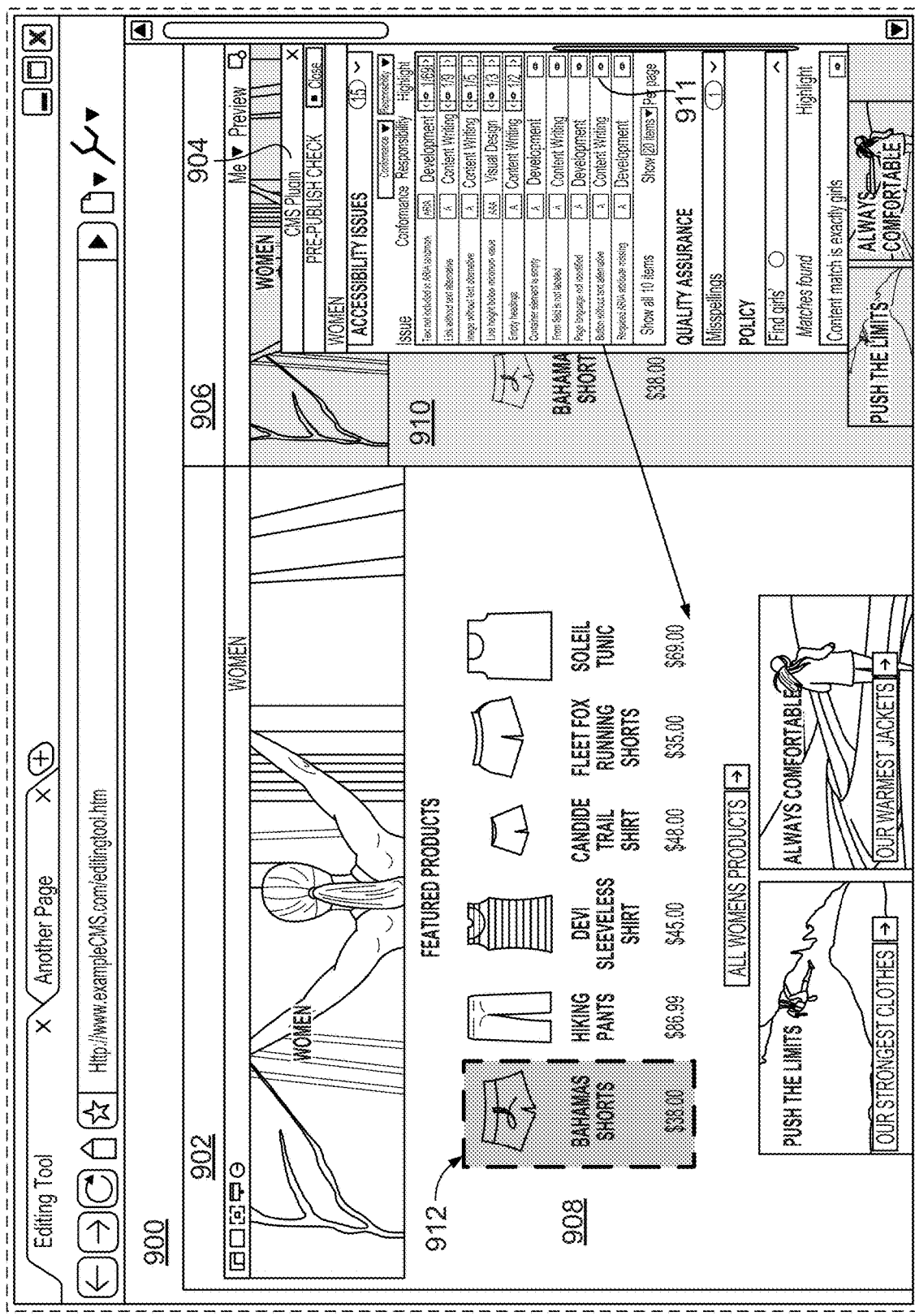
FIG. 9B is an example GUI highlighting an accessibility issue in an editable frame of the webpage content of FIG. 9A.

FIG. 9B is an example GUI highlighting an accessibility issue in the editable frame 902 of the webpage content 908 of FIG. 9A. Here, the relevant user has selected to view "Accessibility issues" in the CMS plugin 904. By selecting an eye icon 911 for an issue presented in the CMS plugin 904, the web analysis server system 102 can highlight an element in the editable webpage content 908 having that issue. In the example of FIG. 9B, the relevant user selected the eye icon 911 for "Button without a text alternative" issue. Since the web analysis server system 102 was able to identify and link elements in the editable webpage content 908 with the issues in the CMS plugin 904, the webpage content 908 is updated in the editable frame 902 to include a flashing box 912 around the element having the selected issue. Instead of the flashing box 912, the element having the selected issue can be represented in a different indicia, including but not limited to a static box, an outline, and/or a highlighting color (e.g., yellow, green, red, etc.). The relevant user can then directly modify/update the element in the flashing box 912 within the editable frame 902.

In some implementations, when the relevant user selects the eye icon 911, the webpage editing tool 900 can be updated to present another page that includes the particular element having the selected issue. Therefore, the editable webpage content 908 may not be dynamically updated with the flashing box 912.

Figure 10:
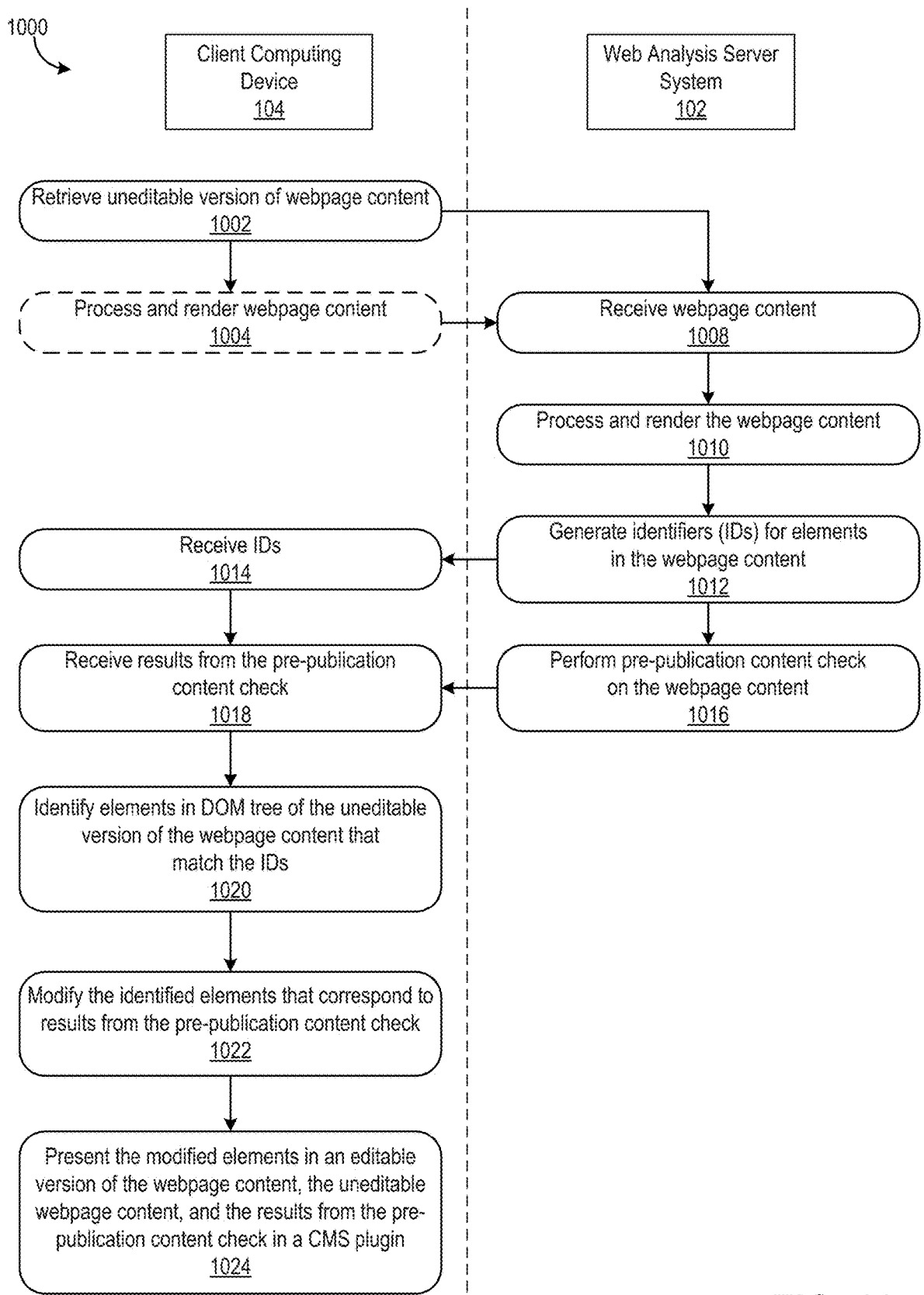
FIG. 10 is a swimlane diagram of a process for presenting an uneditable version of webpage content, an editable version of webpage content, and a CMS plugin in a webpage editing tool.

FIG. 10 is a swimlane diagram of a process 1000 for presenting an uneditable version of webpage content, an editable version of webpage content, and a CMS plugin in a webpage editing tool. The process 1000 can be performed by the client computing device 104 and the web analysis server system 102 described throughout this disclosure. In some implementations, one or more blocks in the process 1000 can be performed by the CMS server 126. In some implementations, the CMS server 126 can be in communication with the client computing device 104 and configured to perform one or more blocks that the client computing device 104 performs in the process 1000.

Referring to the process 1000, the client computing device 104 can retrieve an uneditable version of webpage content in block 1002. As shown in FIGS. 9A-B, a relevant user, such as a website owner, can load webpage content in the webpage editing tool. The webpage content can be a webpage of the user's website that has not yet been published. In some implementations, the webpage content can include some elements that have been published and some elements that have not been published yet. The webpage content can be previewed and presented in the webpage editing tool as an uneditable version. The client computing device can transmit the uneditable version of the webpage content to the web analysis server system 102, which can receive the webpage content in block 1008. The client computing device 104 can transmit HTML, CSS, and JavaScript for the uneditable version of the webpage content.

In some implementations, the client computing device 104 can optionally process and render the webpage content in block 1004. For example, the client computing device 104 can validate the HTML, CSS, and Javascript files of the webpage content, discard elements of the webpage content that may not be checked during a pre-publication content check, and render the webpage content into a dynamic and editable version of the webpage content, as described throughout this disclosure. The client computing device 104 can then transmit the rendered webpage content to the web analysis server system 104, which can receive the webpage content in 1008.

In implementations in which the client computing device 104 does not process and render the webpage content in block 1004, the web analysis server system 102 can process and render the webpage content as described throughout this disclosure (block 1010).

Next, the web analysis server system 102 can generate unique identifiers (IDs) for elements in the rendered webpage content (block 1012). As a result, elements in the rendered, editable webpage content can be linked or correlated with elements in the static, uneditable version of the webpage content. The web analysis server system 102 can generate the IDs based on processing the rendered webpage content and identifying elements, such as CSS selectors, in a DOM tree of the rendered webpage content. The web analysis server system 102 can transmit the IDs to the client computing device 104, which can receive the IDs in block 1014.

The web analysis server system 102 can also perform the pre-publication content check on the rendered webpage content in block 1016. As described throughout this disclosure, one or more web analysis services can be executed to perform the pre-publication content check. Results from the pre-publication content check can be transmitted to the client computing device 104 and received in block 1018.

In block 1020, the client computing device 104 can identify elements in a DOM tree of the uneditable version of the webpage content that match the IDs. In some implementations, block 1020 can be performed before blocks 1016 and/or 1018.

The client computing device 104 can modify the identified elements that correspond to results from the pre-publication content check (block 1022). For example, the client computing device 104 can highlight any of the elements that were identified during the pre-publication content check as having one or more issues. In some implementations, the client computing device 104 may only highlight or otherwise modify one element at a time (e.g., the client computing device 104 may only highlight an element that corresponds to a user-selected issue presented in the CMS plugin).

The client computing device 104 can then present the modified elements in an editable version of the webpage content along with the uneditable version of the webpage content, and the results from the pre-publication content check in the CMS plugin (block 1024). As shown and described in FIGS. 9A-B, the CMS plugin can overlay a portion of the uneditable version of the webpage content. The uneditable version of the webpage content can be presented adjacent to the editable version of the webpage content. The results presented in the CMS plugin can correlate to elements in the editable version of the webpage content. Therefore, the user can select and modify any of the elements in the editable version of the webpage content to fix any issues that are identified as results in the CMS plugin. One or more elements that are identified as having issues can be highlighted, such as in a red box, as shown and described in FIG. 9B.

In some implementations, the CMS server 126 described throughout this disclosure can transmit plugin code to be executed at the client computing device 104. Once executed, the plugin code can allow for the client computing device 104 to perform one or more blocks described herein, such as blocks 1002, 1004, 1018, 1020, and 1022. As an illustrative example, the plugin code can be executed at the client computing device 104 to locate relevant elements in the DOM tree of the uneditable version of the webpage content and highlight those elements that are associated with one or more of the results from the pre-publication content check.

Figure 11:
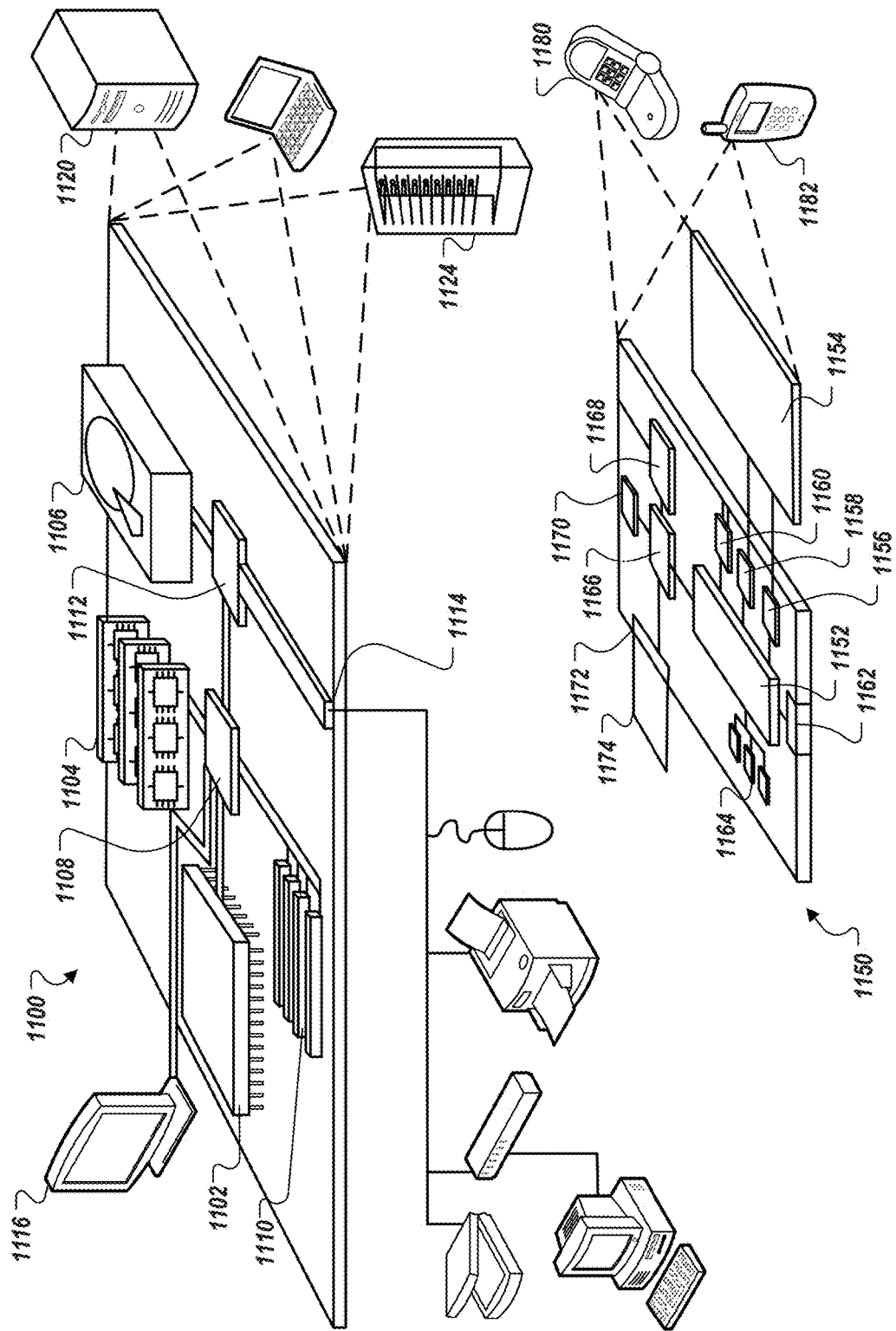
FIG. 11 is a schematic diagram that shows an example of a computing device and a mobile computing device.

FIG. 11 shows an example of a computing device 1100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 can also be another form of computer-readable medium, such as a magnetic or optical disk.

The storage device 1106 is capable of providing mass storage for the computing device 1100. In some implementations, the storage device 1106 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. In some implementations, the high-speed interface 1108 is coupled to the memory 1104, the display 1116 (e.g., through a graphics processor or accelerator), and to the high-speed expansion ports 1110, which can accept various expansion cards (not shown). In the implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. In addition, it can be implemented in a personal computer such as a laptop computer 1122. It can also be implemented as part of a rack server system 1124. Alternatively, components from the computing device 1100 can be combined with other components in a mobile device (not shown), such as a mobile computing device 1150. Each of such devices can contain one or more of the computing device 1100 and the mobile computing device 1150, and an entire system can be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 can also be provided with a storage device, such as a micro-drive or other device, to provide additional storage. Each of the processor 1152, the memory 1164, the display 1154, the communication interface 1166, and the transceiver 1168, are interconnected using various buses, and several of the components can be mounted on a common motherboard or in other manners as appropriate.

The processor 1152 can execute instructions within the mobile computing device 1150, including instructions stored in the memory 1164. The processor 1152 can be implemented as a chipset of chips that include separate and multiple analog and digital processors. The processor 1152 can provide, for example, for coordination of the other components of the mobile computing device 1150, such as control of user interfaces, applications run by the mobile computing device 1150, and wireless communication by the mobile computing device 1150.

The processor 1152 can communicate with a user through a control interface 1158 and a display interface 1156 coupled to the display 1154. The display 1154 can be, for example, a TFT (Thin-Film-Transistor Liquid Crystal Display) display or an OLED (Organic Light Emitting Diode) display, or other appropriate display technology. The display interface 1156 can comprise appropriate circuitry for driving the display 1154 to present graphical and other information to a user. The control interface 1158 can receive commands from a user and convert them for submission to the processor 1152. In addition, an external interface 1162 can provide communication with the processor 1152, so as to enable near area communication of the mobile computing device 1150 with other devices. The external interface 1162 can provide, for example, for wired communication in some implementations, or for wireless communication in other implementations, and multiple interfaces can also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 can also be provided and connected to the mobile computing device 1150 through an expansion interface 1172, which can include, for example, a SIMM (Single In Line Memory Module) card interface. The expansion memory 1174 can provide extra storage space for the mobile computing device 1150, or can also store applications or other information for the mobile computing device 1150. Specifically, the expansion memory 1174 can include instructions to carry out or supplement the processes described above, and can include secure information also. Thus, for example, the expansion memory 1174 can be provide as a security module for the mobile computing device 1150, and can be programmed with instructions that permit secure use of the mobile computing device 1150. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1164, the expansion memory 1174, or memory on the processor 1152. In some implementations, the computer program product can be received in a propagated signal, for example, over the transceiver 1168 or the external interface 1162.

The mobile computing device 1150 can communicate wirelessly through the communication interface 1166, which can include digital signal processing circuitry where necessary. The communication interface 1166 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1168 using a radio-frequency. In addition, short-range communication can occur, such as using a Bluetooth, WiFi, or other such transceiver (not shown). In addition, a GPS (Global Positioning System) receiver module 1170 can provide additional navigation- and location-related wireless data to the mobile computing device 1150, which can be used as appropriate by applications running on the mobile computing device 1150.

The mobile computing device 1150 can also communicate audibly using an audio codec 1160, which can receive spoken information from a user and convert it to usable digital information. The audio codec 1160 can likewise generate audible sound for a user, such as through a speaker, e.g., in a handset of the mobile computing device 1150. Such sound can include sound from voice telephone calls, can include recorded sound (e.g., voice messages, music files, etc.) and can also include sound generated by applications operating on the mobile computing device 1150.

The mobile computing device 1150 can be implemented in a number of different forms, as shown in the figure. For example, it can be implemented as a cellular telephone 1180. It can also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method for checking content in a webpage, the computer-implemented method comprising:

receiving, by a computing system, a static version of webpage content that is rendered in a webpage editing tool that is provided by a content management services (CMS) server and presented in a graphical user interface (GUI) display at a client computing device, wherein the webpage content is ready to be published and is dynamic and editable by a user at the client computing device;

generating, by the computing system, a content ID for the static version of the webpage content, wherein the content ID establishes a relationship between the static version of the webpage content and an owner of the webpage content, wherein the content ID persists in memory of the computing system for a threshold period of time; and during the threshold period of time:

pre-processing, by the computing system, the static version of the webpage content, wherein pre-processing comprises:

validating file formats of at least one of HTML and CSS of the static version of the webpage content that correspond to elements presented in the webpage content when the webpage content is rendered in a web browser at an end user device, retrieving, from a data store, user information associated with the content ID, wherein the user information identifies one or more user-desired web analysis services to execute respective pre-publication content checks, discarding one or more elements in the static version of the webpage content that are not analyzed as part of the pre-publication content checks executed by the one or more web analysis services identified in the user information, and rendering, using an object model, the static version of the webpage content internally at the computing system without the discarded elements;

transmitting, by the computing system, the rendered webpage content without the discarded elements to the one or more web analysis services that are configured to (i) analyze the rendered webpage content as part of the respective pre-publication content checks, (ii) generate information about the rendered webpage content based on performing the respective pre-publication content checks, and (iii) store the generated information in association with the content ID in the data store;

polling, by the computing system and using the content ID while analysis by the one or more web analysis services is in progress, the one or more web analysis services for processing status updates and the generated information associated with the content ID ready at the time of request, wherein polling, by the computing system using the content ID, the one or more web analysis services comprises providing the content ID to each of the one or more web analysis services with a request for retrieving, from the data store, a packaged file of the generated information associated with the content ID that is ready at the time of the request;

receiving, by the computing system and based on the polling, the packaged file of the generated information that is ready at the time of the request from at least one of the one or more web analysis services;

retrieving, by the computing system and from the data store, a CMS plugin associated with the content ID;

populating, by the computing system, one or more predefined sections in the CMS plugin with at least a portion of the received information from the at least one of the one or more web analysis services;

generating, by the computing system, instructions for presenting the webpage editing tool and the CMS plugin at the client computing device; and returning, by the computing system and using the content ID, the instructions for presenting the webpage editing tool and the CMS plugin, at the client computing device, concurrently with the webpage content that is rendered and provided by the CMS server, wherein the webpage content that is rendered by the CMS server is presented in a first inline frame (iFrame) and the CMS plugin is presented in a second iFrame, the first iFrame being concurrently presented adjacent to the second iFrame in the webpage editing tool, wherein the webpage content that is rendered by the CMS server and presented in the first iFrame is editable, by the user at the client computing device, while the CMS plugin is being populated and presented in the second iFrame, by the computing system, with the at least portion of the received information from the one or more web analysis services.

2. The computer-implemented method of claim 1, further comprising receiving, by the computing system, an indication of user input at the client computing device indicating selection of an option to perform the pre-publication content check on the webpage content that is rendered and provided by the CMS server, wherein the pre-publication content check is performed before the webpage content is published.

3. The computer-implemented method of claim 1, further comprising receiving, by the computing system, an indication of user input at the client computing device indicating one or more changes to elements that are displayed in the webpage content that is rendered and provided by the CMS server within the first iFrame of the webpage editing tool based on at least a subset of the information presented in the CMS plugin.

4. The computer-implemented method of claim 3, wherein the one or more changes include adding text to at least one element in the webpage content that is rendered and provided by the CMS server, removing text from at least one element in the webpage content that is rendered and provided by the CMS server, modifying spelling of text in at least one element in the webpage content that is rendered and provided by the CMS server, and replacing a broken link in at least one element in the webpage content that is rendered and provided by the CMS server.

5. The computer-implemented method of claim 1, further comprising:
   determining, by the computing system, whether the webpage content that is rendered and provided by the CMS server 1*s* assigned the content ID within a predetermined period of time; and
   generating, by the computing system, the content ID for the static version of the webpage content based on a determination that the webpage content that is rendered and provided by the CMS server has not been assigned the content ID within the predetermined period of time.

6. The computer-implemented method of claim 1, further comprising returning, by the computing system, the static version of the webpage content to be presented in a third iFrame,
   wherein the third iFrame is presented concurrently with the first and second iFrames, the third iFrame being presented adjacent to the first iFrame and the second iFrame overlaying a portion of the third iFrame, wherein the static version of the webpage content is uneditable and greyed out in the third iFrame.

7. The computer-implemented method of claim 1, wherein the web analysis services include at least one of a readability service, a search engine optimization (SEO) service, a policy service, an accessibility service, and a misspelling service.

8. The computer-implemented method of claim 1, further comprising:
   receiving, by the computing system and based on user input, updated webpage content from the client computing device;
   pre-processing, by the computing system, a static version of the updated webpage content; and
   transmitting, by the computing system, the pre-processed static version of the webpage content to the one or more user-desired web analysis services that are configured to analyze the pre-processed static version of the webpage content as part of the respective pre-publication content checks.

9. The computer-implemented method of claim 1, wherein the information presented in the CMS plugin includes one or more issues that are identified by the web analysis services while the web analysis services analyze the rendered webpage content without the discarded elements.

10. The computer-implemented method of claim 1, wherein each of the web analysis services are assigned at least one of the predefined sections of the CMS plugin to present the generated information from analyzing the rendered webpage content without the discarded elements.

11. The computer-implemented method of claim 1, further comprising: continuously updating, by the computing system, the one or more predefined sections in the CMS plugin with at least a portion of information received from the one or more web analysis services as the one or more web analysis services analyze the rendered webpage content without the discarded elements; and returning, by the computing system, the updated CMS plugin to be presented, at the client computing device, in the second iFrame within the webpage editing tool concurrently with the webpage content that is rendered and provided by the CMS server in the first iFrame within the webpage editing tool.

12. The computer-implemented method of claim 1, further comprising providing, by the computing system, instructions to the client computing device to present the webpage content that is rendered and provided by the CMS server in the first iFrame concurrently with the CMS plugin in the second iFrame within the webpage editing tool.

13. The computer-implemented method of claim 1, further comprising: receiving, by the computing system and from the client computing device, a request for the generated information of at least one of the web analysis services; retrieving, by the computing system, the generated information from the data store based on the content ID that is associated with the webpage content; and returning, by the computing system and to the client computing device, the generated information to be presented in a predefined section in the CMS plugin that is associated with the webpage content.

14. The computer-implemented method of claim 1, further comprising: receiving, by the computing system, user input indicating selection of a portion of information presented in the CMS plugin, wherein the selected portion of information is an issue that was identified by one of the web analysis services when analyzing the webpage content that is rendered and provided by the CMS server; generating, by the computing system, a CSS selector for identifying a section of the webpage content that corresponds to the selected portion of information in the CMS plugin; identifying, by the computing system, the section of the webpage content based on analyzing HTML of the webpage content with the CSS selector; applying, by the computing system, a rule to modify the identified section of the webpage content with a visual emphasis; and returning, by the computing system, instructions to the client computing device to present the identified section of the webpage content with the visual emphasis.

15. The computer-implemented method of claim 1, further comprising:
   caching, by the computing system, at least a second portion of the received information from the one or more web analysis services; and
   retrieving, by the computing system, the cached information at a later time to be presented in the one or more predefined sections of the CMS plugin at the client computing device.

16. A system for checking content in a webpage, the system comprising:
   a computing system having processors and memory, the computing system configured to perform operations comprising:
      receiving a static version of webpage content that is rendered in a webpage editing tool that is provided by a content management services (CMS) server and presented in a graphical user interface (GUI) display at a client computing device, wherein the webpage content is ready to be published and is dynamic and editable by a user at the client computing device;
      generating a content ID for the static version of the webpage content, wherein the content ID establishes a relationship between the static version of the webpage content and an owner of the webpage content, wherein the content ID persists in memory of the computing system for a threshold period of time; and
      during the threshold period of time:
         pre-processing the static version of the webpage content, wherein pre-processing comprises:
            validating file formats of at least one of HTML and CSS of the static version of the webpage content that correspond to elements presented in the webpage content when the webpage content is rendered in a web browser at an end user device, retrieving, from a data store, user information associated with the content ID, wherein the user information identifies one or more user-desired web analysis services to execute respective pre-publication content checks, discarding one or more elements in the static version of the webpage content that are not analyzed as part of the pre-publication content checks executed by the one or more web analysis services identified in the user information, and rendering, using an object model, the static version of the webpage content internally at the computing system without the discarded elements; transmitting the rendered webpage content without the discarded elements to the one or more web analysis services that are configured to (i) analyze the rendered webpage content as part of the respective pre-publication content checks, (ii) generate information about the rendered webpage content based on performing the respective pre-publication content checks, and (iii) store the information in association with the content ID in the data store;

polling, using the content ID while analysis by the one or more web analysis services is in progress, the one or more web analysis services for processing status updates and the generated information associated with the content ID ready at the time of request, wherein polling, by the computing system using the content ID, the one or more web analysis services comprises providing the content ID to each of the one or more web analysis services with a request for retrieving, from the data store, a packaged file of the generated information associated with the content ID that is ready at the time of the request;

receiving, based on the polling, the packaged file of the generated information that is ready at the time of the request from at least one of the one or more web analysis services;

retrieving, from the data store, a CMS plugin associated with the content ID:

populating one or more predefined sections in the CMS plugin with at least a portion of the received information from the at least one of the one or more web analysis services; and generating instructions for presenting the webpage editing tool and the CMS plugin at the client computing device; and returning, using the content ID, the instructions for presenting the webpage editing tool and the CMS plugin, at the client computing device, concurrently with the webpage content that is rendered and provided by the CMS server, wherein the webpage content that is rendered by the CMS server is presented in a first inline frame (iFrame) and the CMS plugin is presented in a second iFrame, the first iFrame being concurrently presented adjacent to the second iFrame in the webpage editing tool, wherein the webpage content that is rendered by the CMS server and presented in the first iFrame is editable, by the user at the client computing device, while the CMS plugin is being populated and presented in the second iFrame, by the computing system, with the at least portion of the received information from the one or more web analysis services.

17. The system of claim 16, wherein the operations further comprise receiving an indication of user input at the client computing device indicating selection of an option to perform the pre-publication content check on the webpage content that is rendered and provided by the CMS server, wherein the pre-publication content check is performed before the webpage content is published.

18. The system of claim 16, wherein the operations further comprise receiving an indication of user input at the client computing device indicating one or more changes to elements that are displayed in the webpage content that is rendered and provided by the CMS server within the first iFrame of the webpage editing tool based on at least a subset of the information presented in the CMS plugin.

19. The system of claim 16, wherein the operations further comprise:

determining whether the webpage content that is rendered and provided by the CMS server is assigned the content ID within a predetermined period of time; and generating the content ID for the static version of the webpage content based on a determination that the webpage content that is rendered and provided by the CMS server has not been assigned the content ID within the predetermined period of time.

20. The system of claim 1, wherein the operations further comprise returning the static version of the webpage content to be presented in a third iFrame.

* * * * *